US012725200B2

(12) United States Patent
Bowles et al.

(10) Patent No.: US 12,725,200 B2
(45) Date of Patent: Sep. 1, 2026

(54) KIOSKS FOR EVALUATING AND PURCHASING USED ELECTRONIC DEVICES AND RELATED TECHNOLOGY

(71) Applicant: ecoATM, LLC, San Diego, CA (US)

(72) Inventors: Mark Vincent Bowles, San Diego, CA (US); Thomas L. Tullie, Rancho Santa Fe, CA (US); Eric Rosser, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

(21) Appl. No.: 18/051,512

(22) Filed: Oct. 31, 2022

(65) Prior Publication Data

US 2023/0274346 A1 Aug. 31, 2023

Related U.S. Application Data

(60) Continuation of application No. 17/072,012, filed on Oct. 15, 2020, now Pat. No. 11,526,932, which is a (Continued)

(51) Int. Cl.
*G06Q 30/02* (2023.01)
*G06K 7/10* (2006.01)
(Continued)

(52) U.S. Cl.
CPC ......... *G06Q 30/08* (2013.01); *G06K 7/10861* (2013.01); *G06K 19/0776* (2013.01); (Continued)

(58) Field of Classification Search
CPC ........ G06Q 30/08; G06Q 10/30; G06Q 20/18; G06Q 30/0237; G06Q 30/0278; (Continued)

(56) References Cited

U.S. PATENT DOCUMENTS 1,327,315 A 1/1920 Davies
1,730,015 A 10/1929 Rooke
(Continued)

FOREIGN PATENT DOCUMENTS

CA 2760863 11/2010
CA 3039716 9/2011
(Continued)

OTHER PUBLICATIONS

2006 Florida Statutes Title XXXIII, Chapter 538, Sections 538.03 and 538.04, 7 pages.
(Continued)

*Primary Examiner* — Breffni Baggot
(74) *Attorney, Agent, or Firm* — Perkins Coie LLP

(57) ABSTRACT

A process for a pre-acquisition auction for recycled electronic devices is disclosed herein. A plurality of pre-acquisition purchase prices are established with each of the plurality of pre-acquisition purchase prices established for a recycled electronic device in a predetermined condition, and each of the pre-acquisition purchase prices established by a winning bid from a bidder of a plurality of bidders for a recycled electronic device.

29 Claims, 21 Drawing Sheets

Related U.S. Application Data division of application No. 15/091,487, filed on Apr. 5, 2016, now Pat. No. 10,853,873, which is a continuation-in-part of application No. 13/705,252, filed on Dec. 5, 2012, now abandoned, which is a continuation-in-part of application No. 13/438,924, filed on Apr. 4, 2012, now Pat. No. 10,055,798, which is a continuation-in-part of application No. 12/785,465, filed on May 23, 2010, now Pat. No. 8,200,533, said application No. 15/091,487 is a continuation-in-part of application No. 13/753,539, filed on Jan. 30, 2013, now abandoned, which is a continuation-in-part of application No. 13/438,924, filed on Apr. 4, 2012, now Pat. No. 10,055,798, said application No. 15/091,487 is a continuation-in-part of application No. 13/658,825, filed on Oct. 24, 2012, now abandoned, which is a continuation-in-part of application No. 13/492,835, filed on Jun. 9, 2012, now abandoned, which is a continuation of application No. 12/785,465, filed on May 23, 2010, now Pat. No. 8,200,533, which is a continuation-in-part of application No. 12/727,624, filed on Mar. 19, 2010, now Pat. No. 7,881,965, which is a continuation-in-part of application No. 12/573,089, filed on Oct. 2, 2009, now Pat. No. 8,195,511, said application No. 15/091,487 is a continuation-in-part of application No. 13/733,984, filed on Jan. 4, 2013, now abandoned, which is a continuation-in-part of application No. 13/438,924, filed on Apr. 4, 2012, now Pat. No. 10,055,798, said application No. 15/091,487 is a continuation-in-part of application No. 13/658,828, filed on Oct. 24, 2012, now abandoned, which is a continuation-in-part of application No. 13/492,835, filed on Jun. 9, 2012, now abandoned, said application No. 15/091,487 is a continuation-in-part of application No. 13/693,032, filed on Dec. 3, 2012, now abandoned, which is a continuation-in-part of application No. 13/438,924, filed on Apr. 4, 2012, now Pat. No. 10,055,798, said application No. 15/091,487 is a continuation-in-part of application No. 13/792,030, filed on Mar. 9, 2013, now Pat. No. 9,881,284, which is a continuation-in-part of application No. 13/438,924, filed on Apr. 4, 2012, now Pat. No. 10,055,798, said application No. 15/091,487 is a continuation-in-part of application No. 13/794,814, filed on Mar. 12, 2013, now abandoned, which is a continuation-in-part of application No. 13/693,032, filed on Dec. 3, 2012, now abandoned, said application No. 15/091,487 is a continuation-in-part of application No. 13/794,816, filed on Mar. 12, 2013, now abandoned, which is a continuation-in-part of application No. 13/693,032, filed on Dec. 3, 2012, now abandoned.

(60) Provisional application No. 61/570,309, filed on Dec. 14, 2011, provisional application No. 61/595,154, filed on Feb. 6, 2012, provisional application No. 61/472,611, filed on Apr. 6, 2011, provisional application No. 61/102,304, filed on Oct. 2, 2008, provisional application No. 61/183,510, filed on Jun. 2, 2009, provisional application No. 61/607,548, filed on Mar. 6, 2012, provisional application No. 61/607,572, filed on Mar. 6, 2012, provisional application No. 61/593,358, filed on Feb. 1, 2012, provisional application No. 61/551,410, filed on Oct. 25, 2011, provisional application No. 61/606,997, filed on Mar. 6, 2012, provisional application No. 61/607,001, filed on Mar. 6, 2012, provisional application No. 61/583,232, filed on Jan. 5, 2012.

(51) Int. Cl.

| | |
|---|---|
| ***G06K 19/077*** | (2006.01) |
| ***G06Q 10/30*** | (2023.01) |
| ***G06Q 20/18*** | (2012.01) |
| ***G06Q 30/0207*** | (2023.01) |
| ***G06Q 30/0283*** | (2023.01) |
| ***G06Q 30/08*** | (2012.01) |
| ***G06T 7/00*** | (2017.01) |
| ***G07F 7/06*** | (2006.01) |
| ***H04M 1/02*** | (2006.01) |
| ***H04M 1/24*** | (2006.01) |

(52) U.S. Cl.

CPC ............ *G06Q 10/30* (2013.01); *G06Q 20/18* (2013.01); *G06Q 30/0237* (2013.01); *G06Q 30/0278* (2013.01); *G06Q 30/0283* (2013.01); *G06T 7/0002* (2013.01); *G07F 7/06* (2013.01); *H04M 1/0287* (2013.01); *H04M 1/24* (2013.01); *G06V 2201/02* (2022.01); *Y02W 30/82* (2015.05); *Y02W 90/00* (2015.05); *Y02W 90/10* (2015.05)

(58) Field of Classification Search

CPC ........... G06Q 30/0283; G06K 7/10861; G06K 19/0776; G06T 7/0002; G07F 7/06; H04M 1/0287; H04M 1/24; G06V 2201/02; Y02W 30/82; Y02W 90/00; Y02W 90/10

See application file for complete search history.

(56) References Cited

U.S. PATENT DOCUMENTS

| | | | |
|---|---|---|---|
| 2,817,725 | A | 12/1957 | Rochfort |
| 3,808,439 | A | 4/1974 | Renius |
| 4,248,334 | A | 2/1981 | Hanley et al. |
| 4,272,757 | A | 6/1981 | McLaughlin et al. |
| 4,519,522 | A | 5/1985 | McElwee |
| 4,593,820 | A | 6/1986 | Antonie |
| 4,715,709 | A | 12/1987 | Sekine et al. |
| 4,821,118 | A | 4/1989 | Lafreniere |
| 4,845,636 | A | 7/1989 | Walker |
| 4,870,357 | A | 9/1989 | Young et al. |
| 4,878,736 | A | 11/1989 | Hekker et al. |
| 4,893,789 | A | 1/1990 | Novorsky |
| 4,927,051 | A | 5/1990 | Falk et al. |
| 4,951,308 | A | 8/1990 | Bishop et al. |
| 5,025,344 | A | 6/1991 | Maly et al. |
| 5,027,074 | A | 6/1991 | Haferstat |
| 5,077,462 | A | 12/1991 | Newell et al. |
| 5,091,773 | A | 2/1992 | Fouche et al. |
| 5,105,149 | A | 4/1992 | Tokura |
| 5,159,560 | A | 10/1992 | Newell et al. |
| 5,216,502 | A | 6/1993 | Katz |
| 5,280,170 | A | 1/1994 | Baldwin |
| 5,319,459 | A | 6/1994 | Mochizuki et al. |
| 5,339,096 | A | 8/1994 | Beaufort et al. |
| 5,413,454 | A | 5/1995 | Movesian |
| 5,419,438 | A | 5/1995 | Squyres et al. |
| 5,436,554 | A | 7/1995 | Decker |
| 5,482,140 | A | 1/1996 | Moore |
| 5,533,645 | A | 7/1996 | Wittern |
| 5,570,920 | A | 11/1996 | Crisman et al. |
| 5,572,444 | A | 11/1996 | Lentz et al. |
| 5,610,710 | A | 3/1997 | Canfield et al. |
| 5,711,530 | A | 1/1998 | Lewis |
| 5,717,780 | A | 2/1998 | Mitsumune et al. |
| 5,747,784 | A | 5/1998 | Walter et al. |
| 5,748,084 | A | 5/1998 | Isikoff |

(56) References Cited

U.S. PATENT DOCUMENTS 5,775,806 A 7/1998 Allred
5,839,058 A 11/1998 Phillips et al.
5,871,371 A 2/1999 Rothenberger et al.
5,920,338 A 7/1999 Katz
5,937,396 A 8/1999 Konya
5,949,901 A 9/1999 Nichani et al.
5,965,858 A 10/1999 Suzuki et al.
5,966,654 A 10/1999 Croughwell et al.
5,987,159 A 11/1999 Nichani
5,988,431 A 11/1999 Roe
5,988,971 A 11/1999 Fossey et al.
6,029,851 A 2/2000 Jenkins et al.
6,041,229 A 3/2000 Turner
6,055,512 A 4/2000 Dean et al.
6,100,986 A 8/2000 Rydningen
6,170,702 B1 1/2001 Zettler et al.
6,181,805 B1 1/2001 Koike et al.
6,216,890 B1 4/2001 Rathmer
6,228,008 B1 5/2001 Pollington et al.
6,234,812 B1 5/2001 Ivers et al.
6,259,827 B1 7/2001 Nichani
6,264,104 B1 7/2001 Jenkins et al.
6,283,475 B1 9/2001 Stubben
6,323,782 B1 11/2001 Stephens et al.
6,330,354 B1 12/2001 Companion et al.
6,330,958 B1 12/2001 Ruskin et al.
6,393,095 B1 5/2002 Robinson
6,412,654 B1 7/2002 Cleeve
6,462,644 B1 10/2002 Howell et al.
6,529,837 B1 3/2003 Kang
6,535,637 B1 3/2003 Wootton et al.
6,573,886 B1 6/2003 Lehtinen et al.
6,575,363 B1 6/2003 Leason et al.
6,587,581 B1 7/2003 Matsuyama et al.
6,595,684 B1 7/2003 Casagrande et al.
6,597,552 B1 7/2003 Griepentrog et al.
6,606,154 B1 8/2003 Oda
6,633,377 B1 10/2003 Weiss et al.
6,667,800 B1 12/2003 Larsson et al.
6,679,499 B2 1/2004 Jeon
6,687,679 B1 * 2/2004 Van Luchene ..... G06Q 30/0601 705/16
6,741,731 B1 5/2004 Yamamoto et al.
6,748,296 B2 6/2004 Banerjee et al.
6,754,637 B1 6/2004 Stenz
6,758,370 B2 7/2004 Cooke et al.
6,758,394 B2 7/2004 Maskatiya et al.
6,795,201 B2 9/2004 Rangarajan et al.
6,798,528 B1 9/2004 Hartman
6,822,422 B2 11/2004 Sagawa
6,842,596 B2 1/2005 Morii et al.
6,847,393 B2 1/2005 Ashe
6,854,656 B2 2/2005 Matsumori
6,874,932 B2 4/2005 Devitt et al.
6,882,269 B2 4/2005 Moreno
6,886,744 B2 5/2005 Ichihara et al.
6,947,941 B1 9/2005 Koon
D512,964 S 12/2005 Kissinger et al.
6,983,067 B2 1/2006 Cox
7,001,038 B2 2/2006 Bock et al.
7,027,031 B2 4/2006 Kawasaki et al.
7,062,454 B1 6/2006 Giannini et al.
7,066,767 B2 6/2006 Liao
7,069,236 B1 6/2006 Tsunenari
7,076,449 B2 7/2006 Tsunenari et al.
7,086,592 B2 8/2006 Wagner et al.
7,109,293 B2 9/2006 Hwang et al.
7,142,335 B2 11/2006 Tesavis
7,153,086 B2 12/2006 Kauppila et al.
7,158,170 B2 1/2007 Gustavsson
7,164,518 B2 1/2007 Yang
7,166,856 B2 1/2007 Cho et al.
7,178,720 B1 2/2007 Strubbe et al.
7,200,497 B2 4/2007 Wang et al.
7,201,125 B2 4/2007 Evans
7,205,529 B2 4/2007 Andersen et al.
7,213,754 B2 5/2007 Eglen et al.
7,213,766 B2 5/2007 Ryan et al.
7,234,609 B2 6/2007 DeLazzer et al.
7,251,458 B2 7/2007 O'Connell
7,268,345 B2 9/2007 Schultz
7,334,729 B2 2/2008 Brewington
7,343,319 B1 * 3/2008 Walker .................. G06Q 30/02 705/21
7,348,884 B2 3/2008 Higham
7,388,977 B2 6/2008 Wang et al.
7,398,921 B2 7/2008 Zito, Jr.
7,407,392 B1 8/2008 Cooke et al.
7,408,674 B2 8/2008 Moro et al.
7,431,158 B2 10/2008 Yamada et al.
7,455,226 B1 11/2008 Hammond et al.
7,520,666 B2 4/2009 Pevzner et al.
7,529,687 B1 5/2009 Phan
7,567,344 B2 7/2009 LeBlanc et al.
7,577,496 B2 8/2009 Walker et al.
7,584,269 B2 9/2009 Moore et al.
7,588,165 B2 9/2009 Prichard et al.
7,635,131 B2 12/2009 Fukazawa
7,642,687 B2 1/2010 Kageyama et al.
7,646,193 B2 1/2010 Suzuki et al.
7,649,450 B2 1/2010 Campion et al.
7,702,108 B2 4/2010 Amon et al.
7,735,125 B1 6/2010 Alvarez et al.
7,761,331 B2 7/2010 Low et al.
7,783,379 B2 8/2010 Beane et al.
7,848,833 B2 12/2010 Li
7,881,965 B2 * 2/2011 Bowles .................. G06Q 10/30 705/308
7,890,373 B2 2/2011 Junger
D640,199 S 6/2011 Wilson
8,010,402 B1 8/2011 Sharma et al.
8,019,588 B1 9/2011 Wohlberg et al.
8,025,229 B2 9/2011 Hammond et al.
8,031,930 B2 10/2011 Wang et al.
8,107,243 B2 1/2012 Guccione et al.
8,112,325 B2 2/2012 Foy et al.
8,142,199 B1 3/2012 Almouli
8,156,008 B2 4/2012 Bae et al.
8,195,511 B2 6/2012 Bowles et al.
8,200,533 B2 6/2012 Librizzi et al.
8,200,736 B2 6/2012 Shi
8,215,546 B2 7/2012 Lin et al.
8,234,185 B2 7/2012 Davis
8,239,262 B2 8/2012 Bowles et al.
8,254,883 B2 8/2012 Uchida
8,266,008 B1 9/2012 Siegel et al.
8,340,815 B2 12/2012 Peters et al.
8,369,987 B2 2/2013 Claessen
8,401,914 B1 3/2013 Kim
8,417,234 B2 4/2013 Sanding et al.
8,423,404 B2 4/2013 Bowles et al.
8,429,021 B2 4/2013 Kraft et al.
8,463,646 B2 6/2013 Bowles et al.
8,482,413 B2 7/2013 Douglas
8,536,472 B2 9/2013 Wu et al.
8,543,358 B2 9/2013 Trabona
8,566,183 B1 10/2013 Bonar et al.
8,606,633 B2 12/2013 Tarbert et al.
8,712,893 B1 4/2014 Brandmaier et al.
8,718,717 B2 5/2014 Vaknin et al.
8,743,215 B1 6/2014 Lee
8,755,783 B2 6/2014 Brahami et al.
8,781,622 B2 7/2014 Mockus
8,806,280 B2 8/2014 Stephenson
8,823,794 B2 9/2014 Suzuki et al.
8,824,136 B1 9/2014 Interian et al.
8,922,643 B2 12/2014 Ji et al.
9,010,627 B1 4/2015 Prasad et al.
9,043,026 B2 5/2015 Lien et al.
9,075,781 B2 7/2015 Matthews
9,081,477 B2 7/2015 Kang
9,124,056 B1 9/2015 Lewis, Jr.
9,147,063 B1 9/2015 Florissi
9,153,089 B1 10/2015 Hewett

(56) References Cited

U.S. PATENT DOCUMENTS

| | | | |
|---|---|---|---|
| 9,189,911 B2 | 11/2015 | Kavli et al. | |
| 9,195,979 B2 | 11/2015 | Geller | |
| 9,256,863 B2 | 2/2016 | Chayon et al. | |
| 9,283,672 B1 | 3/2016 | Matthews | |
| 9,317,989 B2 | 4/2016 | Grow et al. | |
| 9,355,515 B2 | 5/2016 | Brahami et al. | |
| 9,367,436 B2 | 6/2016 | Matthews | |
| 9,367,982 B2 | 6/2016 | Chayon et al. | |
| 9,378,606 B2 | 6/2016 | Chayun et al. | |
| 9,390,442 B2 | 7/2016 | Lyle | |
| 9,469,037 B2 | 10/2016 | Matthews | |
| 9,497,563 B2 | 11/2016 | Hornung et al. | |
| 9,549,316 B2 | 1/2017 | Ben-Harosh et al. | |
| 9,578,133 B2 | 2/2017 | Matthews | |
| 9,582,101 B2 | 2/2017 | Chang et al. | |
| 9,595,238 B2 | 3/2017 | Won | |
| 9,621,947 B1 * | 4/2017 | Oztaskent | H04N 21/4345 |
| 9,641,997 B2 | 5/2017 | Vratskides | |
| 9,668,298 B1 | 5/2017 | Pearl et al. | |
| 9,697,548 B1 | 7/2017 | Jaff et al. | |
| 9,704,142 B2 | 7/2017 | Ahn | |
| 9,718,196 B2 | 8/2017 | Matthews | |
| 9,792,597 B1 * | 10/2017 | Jen | G06Q 20/201 |
| 9,818,160 B2 | 11/2017 | Bowles et al. | |
| 9,858,178 B2 | 1/2018 | Matthews | |
| 9,866,664 B2 | 1/2018 | Sinha et al. | |
| 9,881,284 B2 | 1/2018 | Bowles | |
| 9,885,672 B2 | 2/2018 | Forutanpour et al. | |
| 9,904,911 B2 | 2/2018 | Bowles et al. | |
| 9,911,102 B2 | 3/2018 | Bowles et al. | |
| 9,934,644 B2 | 4/2018 | Chayun et al. | |
| 9,936,331 B2 | 4/2018 | Matthews | |
| 9,972,046 B2 | 5/2018 | Ackerman | |
| 10,032,140 B2 | 7/2018 | Bowles | |
| 10,043,339 B2 | 8/2018 | Walker et al. | |
| 10,044,843 B2 | 8/2018 | Sinha et al. | |
| 10,055,798 B2 | 8/2018 | Bowles et al. | |
| 10,127,647 B2 | 11/2018 | Forutanpour et al. | |
| 10,157,379 B2 | 12/2018 | Singh | |
| 10,157,427 B2 | 12/2018 | Bowles et al. | |
| 10,261,611 B2 | 4/2019 | Matthews | |
| 10,264,426 B2 | 4/2019 | Matthews | |
| 10,269,110 B2 | 4/2019 | Forutanpour et al. | |
| 10,275,813 B2 | 4/2019 | Fu | |
| 10,304,057 B1 | 5/2019 | Powell | |
| 10,325,440 B2 | 6/2019 | Abdelmalak et al. | |
| 10,339,509 B2 | 7/2019 | Bordeleau et al. | |
| 10,401,411 B2 | 9/2019 | Snook et al. | |
| 10,417,615 B2 | 9/2019 | Bowles et al. | |
| 10,438,174 B2 | 10/2019 | Bowles et al. | |
| 10,445,708 B2 | 10/2019 | Hunt et al. | |
| 10,452,527 B2 | 10/2019 | Matthews | |
| 10,475,002 B2 | 11/2019 | Silva et al. | |
| 10,496,963 B2 | 12/2019 | Silva et al. | |
| 10,528,992 B2 | 1/2020 | Yost | |
| 10,529,008 B1 | 1/2020 | Pritchard | |
| 10,565,629 B2 | 2/2020 | Hartman | |
| 10,572,946 B2 | 2/2020 | Bowles et al. | |
| 10,600,095 B2 | 3/2020 | Ackerman | |
| 10,671,367 B2 | 6/2020 | Matthews | |
| 10,679,279 B2 | 6/2020 | Ward | |
| 10,726,542 B2 | 7/2020 | Nguyen | |
| 10,740,891 B1 | 8/2020 | Chen et al. | |
| 10,755,401 B2 | 8/2020 | Bian et al. | |
| 10,803,527 B1 | 10/2020 | Zankat et al. | |
| 10,810,732 B2 | 10/2020 | Dwivedi et al. | |
| 10,824,942 B1 | 11/2020 | Bhotika et al. | |
| 10,825,082 B2 | 11/2020 | Librizzi et al. | |
| 10,834,555 B2 | 11/2020 | Matthews | |
| 10,839,651 B2 | 11/2020 | Smart | |
| 10,846,672 B2 | 11/2020 | Dion et al. | |
| 10,853,873 B2 | 12/2020 | Bowles et al. | |
| 10,860,122 B2 | 12/2020 | Matthews | |
| 10,860,990 B2 | 12/2020 | Bowles et al. | |
| 10,891,669 B2 | 1/2021 | Glickman et al. | |
| 10,909,673 B2 | 2/2021 | Forutanpour et al. | |
| 10,965,862 B2 | 3/2021 | Weir et al. | |
| 10,970,786 B1 | 4/2021 | Matheson et al. | |
| 10,977,700 B2 | 4/2021 | Bordeleau et al. | |
| 10,991,093 B2 | 4/2021 | Do et al. | |
| 11,004,126 B1 | 5/2021 | Jacobs, II | |
| 11,010,841 B2 | 5/2021 | Bowles et al. | |
| 11,014,093 B1 | 5/2021 | Drexler | |
| 11,024,111 B2 | 6/2021 | Abdelmalak et al. | |
| 11,069,141 B2 | 7/2021 | Wurmfeld et al. | |
| 11,079,753 B1 | 8/2021 | Roy | |
| 11,080,662 B2 | 8/2021 | Bowles et al. | |
| 11,080,672 B2 | 8/2021 | Bowles | |
| 11,107,046 B2 | 8/2021 | Bowles | |
| 11,122,034 B2 | 9/2021 | Cicchitto | |
| 11,126,973 B2 | 9/2021 | Silva et al. | |
| 11,164,000 B2 | 11/2021 | Lee et al. | |
| 11,232,412 B2 | 1/2022 | Hunt et al. | |
| 11,249,769 B2 | 2/2022 | Li et al. | |
| 11,257,057 B1 | 2/2022 | Asmi et al. | |
| 11,288,789 B1 | 3/2022 | Chen et al. | |
| 11,302,038 B2 | 4/2022 | Muendel et al. | |
| 11,315,093 B2 | 4/2022 | Bowles | |
| 11,321,768 B2 | 5/2022 | Beauchamp | |
| 11,328,562 B2 | 5/2022 | Smart | |
| 11,341,471 B2 | 5/2022 | Dion et al. | |
| 11,361,599 B2 | 6/2022 | Herman et al. | |
| 11,379,886 B1 | 7/2022 | Fields et al. | |
| 11,386,740 B2 | 7/2022 | Shah | |
| 11,417,068 B1 | 8/2022 | Burris et al. | |
| 11,436,570 B2 | 9/2022 | Bowles et al. | |
| 11,443,289 B2 | 9/2022 | Bowles et al. | |
| 11,462,868 B2 | 10/2022 | Forutanpour et al. | |
| 11,481,754 B2 | 10/2022 | Priebatsch | |
| 11,482,067 B2 | 10/2022 | Forutanpour et al. | |
| 11,526,932 B2 | 12/2022 | Bowles et al. | |
| 11,574,182 B2 | 2/2023 | Matthews | |
| 11,580,627 B2 | 2/2023 | Johnson et al. | |
| 11,599,796 B2 | 3/2023 | Boa et al. | |
| 11,623,823 B1 | 4/2023 | Hoshino | |
| 11,631,096 B2 | 4/2023 | Schubert et al. | |
| 11,657,631 B2 | 5/2023 | Sagnoas | |
| 11,687,900 B2 | 6/2023 | Dion et al. | |
| 11,688,149 B1 | 6/2023 | Mascarin et al. | |
| 11,688,222 B2 | 6/2023 | Dion et al. | |
| 11,720,871 B2 | 8/2023 | Dion et al. | |
| 11,734,654 B2 | 8/2023 | Silva et al. | |
| 11,790,327 B2 | 10/2023 | Bowles et al. | |
| 11,790,328 B2 | 10/2023 | Forutanpour et al. | |
| 11,798,250 B2 | 10/2023 | Forutanpour et al. | |
| 11,803,954 B2 | 10/2023 | Forutanpour et al. | |
| 11,836,867 B2 | 12/2023 | Sadalgi | |
| 11,843,206 B2 | 12/2023 | Forutanpour et al. | |
| D1,010,271 S | 1/2024 | Hammes et al. | |
| 11,900,553 B2 | 2/2024 | Ha | |
| 11,907,915 B2 | 2/2024 | Bowles et al. | |
| 11,922,467 B2 | 3/2024 | Forutanpour et al. | |
| 11,935,138 B2 | 3/2024 | Bowles et al. | |
| 11,989,701 B2 | 5/2024 | Hunt et al. | |
| 11,989,710 B2 | 5/2024 | Forutanpour et al. | |
| 12,008,520 B2 | 6/2024 | Bowles | |
| 12,033,454 B2 | 7/2024 | Forutanpour et al. | |
| 12,045,973 B2 | 7/2024 | Johnson et al. | |
| 12,182,773 B2 | 12/2024 | Bowles | |
| 12,198,108 B2 | 1/2025 | Bowles | |
| 12,205,081 B2 | 1/2025 | Bowles et al. | |
| 12,217,221 B2 | 2/2025 | Silva et al. | |
| 12,223,684 B2 | 2/2025 | Silva et al. | |
| 12,271,929 B2 | 4/2025 | Forutanpour et al. | |
| 12,300,059 B2 | 5/2025 | Forutanpour et al. | |
| 12,321,965 B2 | 6/2025 | Forutanpour et al. | |
| 12,322,259 B2 | 6/2025 | Forutanpour et al. | |
| 2001/0025883 A1 | 10/2001 | Ichihara et al. | |
| 2001/0035425 A1 | 11/2001 | Rocco et al. | |
| 2001/0039531 A1 | 11/2001 | Aoki | |
| 2002/0014577 A1 | 2/2002 | Ulrich et al. | |
| 2002/0035515 A1 | 3/2002 | Moreno | |
| 2002/0046122 A1 | 4/2002 | Barber | |
| 2002/0067184 A1 | 6/2002 | Smith et al. | |

(56) References Cited

U.S. PATENT DOCUMENTS

2002/0087413 A1 7/2002 Mahaffy et al.
2002/0112177 A1 8/2002 Voltmer
2002/0129170 A1 9/2002 Moore et al.
2002/0147656 A1* 10/2002 Tam .................. G06Q 30/0613 705/26.81
2002/0157033 A1 10/2002 Cox
2002/0162966 A1 11/2002 Yoder
2002/0186878 A1 12/2002 Hoon et al.
2003/0006277 A1 1/2003 Maskatiya et al.
2003/0018897 A1 1/2003 Bellis, Jr. et al.
2003/0025476 A1 2/2003 Trela
2003/0036866 A1 2/2003 Nair et al.
2003/0061150 A1 3/2003 Kocher et al.
2003/0063527 A1 4/2003 Ostwald
2003/0083983 A1 5/2003 Fisher
2003/0100707 A1 5/2003 Hwang et al.
2003/0146898 A1 8/2003 Kawasaki et al.
2003/0158789 A1 8/2003 Miura et al.
2003/0170529 A1 9/2003 Sagawa
2003/0179371 A1 9/2003 Rangarajan et al.
2003/0191675 A1 10/2003 Murashita
2003/0197782 A1 10/2003 Ashe
2003/0204289 A1 10/2003 Banerjee et al.
2004/0012825 A1 1/2004 Tesavis
2004/0039639 A1* 2/2004 Walker ............... G06Q 30/0235 705/14.35
2004/0088231 A1 5/2004 Davis
2004/0114153 A1 6/2004 Andersen et al.
2004/0141320 A1 7/2004 Bock et al.
2004/0150815 A1 8/2004 Sones et al.
2004/0156557 A1 8/2004 Van Der Weij
2004/0156667 A1 8/2004 Van Der Weij et al.
2004/0184651 A1 9/2004 Nordbryhn
2004/0186744 A1 9/2004 Lux
2004/0189812 A1 9/2004 Gustavsson
2004/0200902 A1 10/2004 Ishioroshi
2004/0205015 A1 10/2004 DeLaCruz
2004/0235513 A1 11/2004 O'Connell
2004/0242216 A1 12/2004 Boutsikakis
2004/0243478 A1 12/2004 Walker et al.
2004/0262521 A1 12/2004 Devitt et al.
2005/0022699 A1 2/2005 Goza
2005/0027622 A1 2/2005 Walker et al.
2005/0035311 A1 2/2005 Asakawa et al.
2005/0043897 A1 2/2005 Meyer
2005/0088379 A1 4/2005 Tsuchida
2005/0109841 A1* 5/2005 Ryan ..................... G06F 13/385 235/380
2005/0128551 A1 6/2005 Yang
2005/0135917 A1 6/2005 Kauppila et al.
2005/0137942 A1 6/2005 LaFluer
2005/0139661 A1 6/2005 Eglen et al.
2005/0143149 A1 6/2005 Becker et al.
2005/0167620 A1 8/2005 Cho et al.
2005/0187657 A1 8/2005 Hashimoto et al.
2005/0216120 A1 9/2005 Rosenberg et al.
2005/0222690 A1 10/2005 Wang et al.
2005/0231595 A1 10/2005 Wang et al.
2005/0240958 A1 10/2005 Nguyen et al.
2006/0022827 A1 2/2006 Highham
2006/0038114 A9 2/2006 Cofer et al.
2006/0047573 A1* 3/2006 Mitchell ............ G06Q 30/0237 705/14.37
2006/0074756 A1* 4/2006 Boykin ............. G06Q 30/0237 705/14.24
2006/0085158 A1 4/2006 Cakiner
2006/0129411 A1 6/2006 Bhatti et al.
2006/0167580 A1 7/2006 Whittier
2006/0184379 A1 8/2006 Tan et al.
2006/0195384 A1 8/2006 Bauer et al.
2006/0215027 A1 9/2006 Nonoyama et al.
2006/0217152 A1 9/2006 Fok et al.
2006/0219776 A1* 10/2006 Finn ..................... G06K 7/0043 235/380
2006/0229108 A1 10/2006 Cehelnik
2006/0230013 A1 10/2006 Hrle
2006/0235747 A1 10/2006 Hammond et al.
2006/0255940 A1 11/2006 White et al.
2006/0258008 A1 11/2006 Holler et al.
2006/0261931 A1 11/2006 Cheng et al.
2006/0271431 A1 11/2006 Wehr et al.
2006/0279307 A1 12/2006 Wang et al.
2006/0280356 A1 12/2006 Yamagashi
2006/0287929 A1 12/2006 Bae et al.
2007/0012665 A1 1/2007 Nelson
2007/0013124 A1 1/2007 Graef et al.
2007/0013139 A1 1/2007 Kumagai
2007/0032098 A1* 2/2007 Bowles ............. H04M 1/72409 439/11
2007/0050083 A1 3/2007 Signorelli
2007/0057815 A1 3/2007 Foy et al.
2007/0129906 A1 6/2007 Stoecker et al.
2007/0133844 A1 6/2007 Waehner et al.
2007/0140310 A1 6/2007 Rolton et al.
2007/0150403 A1 6/2007 Mock et al.
2007/0205751 A1 9/2007 Suzuki et al.
2007/0258085 A1 11/2007 Robbins
2007/0263099 A1 11/2007 Motta et al.
2007/0269099 A1 11/2007 Nishino et al.
2007/0271194 A1 11/2007 Walker
2007/0276911 A1 11/2007 Bhumkar
2007/0281734 A1 12/2007 Mizrachi
2007/0282999 A1 12/2007 Tu et al.
2008/0004828 A1 1/2008 Mizrachi
2008/0027581 A1 1/2008 Saether et al.
2008/0033596 A1 2/2008 Fausak et al.
2008/0071627 A1 3/2008 Junger
2008/0088833 A1 4/2008 Yokota et al.
2008/0097770 A1 4/2008 Low et al.
2008/0109746 A1 5/2008 Mayer
2008/0111989 A1 5/2008 Dufour et al.
2008/0133432 A1* 6/2008 Ramseyer .............. G06Q 10/02 701/29.6
2008/0149720 A1 6/2008 Colville
2008/0167578 A1 7/2008 Bryer et al.
2008/0177598 A1 7/2008 Davie
2008/0201232 A1* 8/2008 Walker ............... G06Q 30/0202 705/14.35
2008/0207198 A1 8/2008 Juric
2008/0228582 A1* 9/2008 Fordyce ............. G06Q 30/0239 705/14.27
2008/0231113 A1 9/2008 Guccione et al.
2008/0255901 A1 10/2008 Carroll et al.
2008/0256008 A1 10/2008 Kwok
2008/0260235 A1 10/2008 Cai et al.
2008/0277467 A1 11/2008 Carlson
2008/0281691 A1 11/2008 Pearson et al.
2008/0296374 A1 12/2008 Gonen et al.
2008/0303915 A1 12/2008 Omi
2008/0306701 A1 12/2008 Zhong et al.
2009/0051907 A1 2/2009 Li et al.
2009/0078775 A1 3/2009 Giebel et al.
2009/0079388 A1 3/2009 Reddy
2009/0095047 A1 4/2009 Patel et al.
2009/0108015 A1 4/2009 Kreamer
2009/0114716 A1 5/2009 Ramachandran
2009/0132813 A1 5/2009 Schibuk
2009/0145727 A1 6/2009 Johns
2009/0156199 A1 6/2009 Steenstra et al.
2009/0160668 A1 6/2009 Crowley et al.
2009/0177319 A1 7/2009 Garibaldi et al.
2009/0184865 A1 7/2009 Valo et al.
2009/0187491 A1 7/2009 Bull et al.
2009/0190142 A1 7/2009 Taylor et al.
2009/0191931 A1 7/2009 Peck
2009/0207743 A1 8/2009 Huq et al.
2009/0244285 A1 10/2009 Chathukutty
2009/0247133 A1 10/2009 Holmen et al.
2009/0248883 A1 10/2009 Suryanarayana et al.
2009/0251815 A1 10/2009 Wang et al.
2009/0262341 A1 10/2009 Konopa et al.
2009/0265035 A1 10/2009 Jenkinson et al.
2009/0299543 A1 12/2009 Cox et al.

(56) References Cited

U.S. PATENT DOCUMENTS

2009/0312009 A1 12/2009 Fishel
2009/0321511 A1 12/2009 Browne
2009/0322706 A1 12/2009 Austin
2010/0005004 A1 1/2010 Hudak et al.
2010/0051695 A1 3/2010 Yepez et al.
2010/0063894 A1 3/2010 Lundy
2010/0088192 A1* 4/2010 Bowles .............. G06Q 30/0278 348/E5.022
2010/0110174 A1 5/2010 Leconte
2010/0115887 A1 5/2010 Schroeder et al.
2010/0147953 A1 6/2010 Barkan
2010/0157280 A1 6/2010 Kusevic et al.
2010/0161397 A1 6/2010 Gauthier et al.
2010/0162359 A1* 6/2010 Casey ................... H04L 43/106 709/224
2010/0169231 A1 7/2010 Bowles et al.
2010/0174596 A1* 7/2010 Gilman .................... G07G 1/14 705/14.23
2010/0185506 A1 7/2010 Wolff
2010/0219234 A1 9/2010 Forbes
2010/0228676 A1* 9/2010 Librizzi .............. H04M 1/0287 705/306
2010/0235198 A1 9/2010 Fini et al.
2010/0237854 A1 9/2010 Kumhyr et al.
2010/0260271 A1 10/2010 Kapoor
2010/0262481 A1 10/2010 Baker et al.
2010/0268792 A1 10/2010 Butler
2010/0312639 A1 12/2010 Mastronardi
2011/0035322 A1 2/2011 Lively
2011/0043628 A1 2/2011 Yun
2011/0047022 A1* 2/2011 Walker ................. G06Q 10/101 705/14.35
2011/0050164 A1 3/2011 Partovi et al.
2011/0055322 A1* 3/2011 Gregersen ........... H04L 61/4535 709/203
2011/0060641 A1 3/2011 Grossman et al.
2011/0066514 A1 3/2011 Maraz
2011/0067520 A1 3/2011 Ihrke et al.
2011/0082734 A1* 4/2011 Zhang .................. G06Q 10/087 705/28
2011/0099264 A1 4/2011 Chapin et al.
2011/0113479 A1* 5/2011 Ganem ................ G06Q 20/341 709/227
2011/0173576 A1 7/2011 Murphy et al.
2011/0191861 A1* 8/2011 Spears .................... G06F 16/29 726/28
2011/0235853 A1 9/2011 Bowles et al.
2011/0295417 A1 12/2011 Smith, III
2011/0296339 A1 12/2011 Kang
2011/0296508 A1 12/2011 Os et al.
2011/0313840 A1 12/2011 Mason et al.
2012/0004761 A1 1/2012 Madruga
2012/0016518 A1 1/2012 Saario et al.
2012/0022965 A1 1/2012 Seergy
2012/0026582 A1 2/2012 Okabe et al.
2012/0029985 A1 2/2012 Wilson et al.
2012/0030097 A1 2/2012 Hagan et al.
2012/0030399 A1 2/2012 Ben-Harosh
2012/0054113 A1 3/2012 Jayaraman et al.
2012/0063501 A1 3/2012 Aguren
2012/0078413 A1 3/2012 Baker
2012/0095875 A1 4/2012 Guthrie
2012/0116928 A1 5/2012 Gventer
2012/0116929 A1 5/2012 Gventer
2012/0117001 A1 5/2012 Gventer et al.
2012/0127307 A1 5/2012 Hassenzahl
2012/0146956 A1 6/2012 Jenkinson
2012/0191562 A1 7/2012 Bowles et al.
2012/0209783 A1* 8/2012 Smith, Jr. ............ G06Q 20/384 705/308
2012/0235812 A1 9/2012 De Mello et al.
2012/0246083 A1 9/2012 Bowles
2012/0249779 A1 10/2012 Ji et al.
2012/0254046 A1 10/2012 Librizzi et al.
2012/0263394 A1 10/2012 Fujiwara et al.
2012/0280934 A1 11/2012 Ha
2012/0294490 A1 11/2012 Bowles et al.
2012/0301009 A1 11/2012 Dabic
2012/0303431 A1* 11/2012 Phillips .................. G06Q 30/02 705/14.22
2013/0006713 A1 1/2013 Haake
2013/0034305 A1 2/2013 Jahanshahi et al.
2013/0041508 A1 2/2013 Hu et al.
2013/0046611 A1 2/2013 Bowles et al.
2013/0046699 A1 2/2013 Bowles et al.
2013/0073376 A1 3/2013 Heath
2013/0112440 A1 5/2013 Alsaif et al.
2013/0124426 A1 5/2013 Bowles et al.
2013/0126741 A1 5/2013 Srivastava et al.
2013/0137376 A1 5/2013 Fitzgerald et al.
2013/0138528 A1 5/2013 McAlhaney
2013/0144797 A1 6/2013 Bowles et al.
2013/0155061 A1 6/2013 Jahanshahi et al.
2013/0157641 A1 6/2013 Brahami et al.
2013/0159119 A1 6/2013 Henderson et al.
2013/0169413 A1* 7/2013 Schuessler ........... G08B 13/248 340/10.1
2013/0173430 A1 7/2013 Benjamin
2013/0173434 A1 7/2013 Hartman
2013/0181935 A1 7/2013 McKenzie et al.
2013/0191236 A1 7/2013 Bowles
2013/0198089 A1 8/2013 Bowles
2013/0198144 A1 8/2013 Bowles
2013/0200912 A1 8/2013 Panagas
2013/0226679 A1 8/2013 Bowles
2013/0246211 A1* 9/2013 Sullivan ............. G06Q 30/0601 705/26.4
2013/0246212 A1* 9/2013 Sullivan ............. G06Q 30/0611 705/26.4
2013/0246285 A1 9/2013 Chayun et al.
2013/0253700 A1 9/2013 Carson et al.
2013/0275314 A1 10/2013 Bowles
2013/0284805 A1 10/2013 Kraft et al.
2013/0290146 A1 10/2013 West et al.
2013/0297388 A1 11/2013 Kyle, Jr. et al.
2014/0006451 A1 1/2014 Mullis et al.
2014/0012643 A1 1/2014 Behrisch
2014/0028449 A1 1/2014 Sigal et al.
2014/0038556 A1 2/2014 DeSousa
2014/0046748 A1* 2/2014 Nagarajan .............. G06Q 30/02 705/14.1
2014/0046845 A1 2/2014 Dogin et al.
2014/0052329 A1 2/2014 Amirpour
2014/0067710 A1 3/2014 Gventer et al.
2014/0080550 A1 3/2014 Ino et al.
2014/0136351 A1 5/2014 Lennon
2014/0143161 A1 5/2014 Ahn
2014/0147004 A1 5/2014 Uchida
2014/0149201 A1* 5/2014 Abbott ............... G06Q 30/0234 705/14.34
2014/0150100 A1 5/2014 Gupta et al.
2014/0156883 A1 6/2014 Bowles
2014/0178029 A1 6/2014 Raheman et al.
2014/0214505 A1 7/2014 Shuster-Arechiga et al.
2014/0235258 A1 8/2014 Wang et al.
2014/0244315 A1 8/2014 Cahill et al.
2014/0249668 A1 9/2014 Kavli et al.
2014/0267691 A1 9/2014 Humphrey
2014/0273245 A1 9/2014 Ochranek et al.
2014/0278244 A1 9/2014 Humphrey et al.
2014/0295819 A1 10/2014 Chayun et al.
2014/0297368 A1 10/2014 Ferder
2014/0316561 A1 10/2014 Tkachenko
2014/0330685 A1* 11/2014 Nazzari ................ G06Q 10/083 705/28
2014/0346185 A1 11/2014 Chayun et al.
2014/0347473 A1 11/2014 Wolff et al.
2015/0006281 A1 1/2015 Takahashi
2015/0046343 A1 2/2015 Martini
2015/0066677 A1 3/2015 Bowles et al.
2015/0073590 A1 3/2015 Garcia
2015/0088698 A1 3/2015 Ackerman

(56) References Cited

U.S. PATENT DOCUMENTS

2015/0088731 A1* 3/2015 Ackerman ......... G06Q 10/0836 705/39
2015/0105901 A1 4/2015 Joshi
2015/0120485 A1 4/2015 Nash
2015/0161714 A1* 6/2015 Fainshtein ......... G06Q 30/0269 705/26.81
2015/0170237 A1 6/2015 Powell
2015/0177330 A1 6/2015 Morris
2015/0193797 A1 7/2015 Gerrity
2015/0206200 A1 7/2015 Edmondson et al.
2015/0249353 A1 9/2015 Hamilton
2015/0278529 A1 10/2015 Cho et al.
2015/0293860 A9 10/2015 Bowles
2015/0294278 A1 10/2015 Nguyen
2015/0309912 A1* 10/2015 Nguyen ............... G06Q 30/018 702/182
2015/0317619 A1 11/2015 Curtis
2015/0324761 A1 11/2015 Nguyen et al.
2015/0324870 A1 11/2015 Nguyen et al.
2015/0332206 A1* 11/2015 Trew .................... G06Q 10/083 705/330
2015/0356637 A1 12/2015 Graffia et al.
2016/0019607 A1* 1/2016 Burmester ......... G06Q 30/0278 705/306
2016/0019685 A1 1/2016 Nguyen et al.
2016/0055392 A1 2/2016 Nakano
2016/0078434 A1 3/2016 Huxham et al.
2016/0087381 A1 3/2016 Wong et al.
2016/0091549 A1 3/2016 Snook et al.
2016/0092849 A1 3/2016 Cirannek et al.
2016/0098688 A1 4/2016 Hunt et al.
2016/0098689 A1 4/2016 Bowles et al.
2016/0098690 A1 4/2016 Silva et al.
2016/0125367 A1 5/2016 Bowles et al.
2016/0125548 A1 5/2016 Bowles et al.
2016/0125612 A1 5/2016 Seki et al.
2016/0132840 A1 5/2016 Bowles et al.
2016/0171456 A1 6/2016 Bowles et al.
2016/0171544 A1 6/2016 Heminger et al.
2016/0171575 A1 6/2016 Bowles et al.
2016/0180371 A1 6/2016 Lawson
2016/0184990 A1 6/2016 Song et al.
2016/0210648 A1 7/2016 Cirannek
2016/0253861 A1 9/2016 Seo
2016/0269401 A1 9/2016 Saito et al.
2016/0269895 A1 9/2016 Soini et al.
2016/0275460 A1 9/2016 Ploetner et al.
2016/0275518 A1 9/2016 Bowles et al.
2016/0284019 A1 9/2016 Bowles et al.
2016/0292710 A1 10/2016 Casselle
2016/0301786 A1 10/2016 Koltsov et al.
2016/0327383 A1 11/2016 Becker et al.
2016/0328684 A1 11/2016 Bowles et al.
2016/0335616 A1 11/2016 Bordeleau et al.
2016/0364939 A1 12/2016 Chayun et al.
2016/0379287 A1 12/2016 Dabiri
2017/0011374 A1 1/2017 McDivitt
2017/0083886 A1 3/2017 Silva et al.
2017/0091823 A1 3/2017 Adinarayan et al.
2017/0110902 A1 4/2017 Miller
2017/0115235 A1 4/2017 Ohlsson et al.
2017/0123828 A1 5/2017 Ben-Harosh et al.
2017/0142484 A1 5/2017 Jeon
2017/0169401 A1 6/2017 Beane et al.
2017/0221110 A1 8/2017 Sullivan et al.
2017/0249729 A1 8/2017 Greene et al.
2017/0256051 A1 9/2017 Dwivedi et al.
2017/0256119 A1 9/2017 Abdelmalak et al.
2017/0278191 A1 9/2017 Tassone et al.
2017/0286920 A1 10/2017 Silva et al.
2017/0286921 A1 10/2017 Bowles
2017/0301010 A1 10/2017 Bowles et al.
2017/0301035 A1 10/2017 Bowles et al.
2017/0301078 A1 10/2017 Forutanpour et al.
2017/0323279 A1 11/2017 Dion et al.
2017/0330158 A1 11/2017 Librizzi et al.
2017/0343481 A1 11/2017 Jahanshahi et al.
2017/0356857 A1 12/2017 Forutanpour et al.
2017/0372273 A1 12/2017 Bowles et al.
2017/0372465 A1 12/2017 Forutanpour et al.
2018/0084094 A1 3/2018 Sinha et al.
2018/0101810 A1 4/2018 Feng et al.
2018/0122022 A1 5/2018 Kelly
2018/0130136 A1 5/2018 Bowles et al.
2018/0157246 A1 6/2018 Huang et al.
2018/0157820 A1 6/2018 Adams et al.
2018/0160269 A1 6/2018 Baarman et al.
2018/0165655 A1 6/2018 Marcelle et al.
2018/0240144 A1 8/2018 Curtis
2018/0247280 A1 8/2018 Bowles et al.
2018/0255047 A1 9/2018 Cicchitto
2018/0260794 A1 9/2018 Bowles et al.
2018/0293566 A1 10/2018 Engles et al.
2018/0293664 A1 10/2018 Zhang et al.
2018/0300776 A1 10/2018 Yost
2018/0321163 A1 11/2018 Casadio
2018/0322623 A1 11/2018 Memo et al.
2018/0342050 A1 11/2018 Fitzgerald et al.
2018/0350163 A1 12/2018 Pofale et al.
2018/0365744 A1 12/2018 Lennon
2019/0017863 A1 1/2019 Saltzman et al.
2019/0019147 A1 1/2019 McCarty et al.
2019/0051090 A1 2/2019 Goldberg et al.
2019/0066073 A1 2/2019 Yen et al.
2019/0066075 A1 2/2019 Lobo et al.
2019/0066439 A1 2/2019 Pinkus
2019/0073566 A1 3/2019 Brauer
2019/0073568 A1 3/2019 He et al.
2019/0102874 A1 4/2019 Goja
2019/0156611 A1 5/2019 Redhead
2019/0166278 A1 5/2019 Hiyama et al.
2019/0222748 A1 7/2019 Weir et al.
2019/0251777 A1 8/2019 Abdelmalak et al.
2019/0272628 A1 9/2019 Tsou
2019/0279181 A1 9/2019 Kelly
2019/0279431 A1 9/2019 Wurmfeld et al.
2019/0287141 A1 9/2019 Bordeleau et al.
2019/0318465 A1 10/2019 Nguyen
2019/0325530 A1 10/2019 Bowles et al.
2019/0372827 A1 12/2019 Vasseur et al.
2019/0375300 A1 12/2019 Lyon
2020/0020091 A1 1/2020 Forutanpour et al.
2020/0020097 A1 1/2020 Do et al.
2020/0042795 A1 2/2020 Leet et al.
2020/0042969 A1 2/2020 Ray
2020/0066067 A1 2/2020 Herman et al.
2020/0090137 A1 3/2020 Bowles et al.
2020/0104028 A1 4/2020 Vats
2020/0104720 A1 4/2020 Boa et al.
2020/0104868 A1 4/2020 Schubert et al.
2020/0126046 A1 4/2020 Bowles
2020/0151677 A1 5/2020 Bowles et al.
2020/0151678 A1 5/2020 Silva et al.
2020/0151679 A1 5/2020 Hunt et al.
2020/0167748 A1 5/2020 Dion et al.
2020/0175481 A1 6/2020 Pham
2020/0175669 A1 6/2020 Bian et al.
2020/0202319 A1 6/2020 Forutanpour et al.
2020/0202405 A1 6/2020 Glickman et al.
2020/0202419 A1 6/2020 Beauchamp
2020/0241891 A1 7/2020 Li et al.
2020/0258343 A1 8/2020 Forutanpour et al.
2020/0259300 A1 8/2020 Forutanpour et al.
2020/0265487 A1 8/2020 Forutanpour et al.
2020/0265666 A1 8/2020 Yamamiya
2020/0286030 A1 9/2020 Hewett
2020/0342442 A1 10/2020 Curtis
2020/0387881 A1 12/2020 Smith
2020/0393742 A1 12/2020 Dion et al.
2020/0410793 A1 12/2020 Folco
2021/0012315 A1 1/2021 Priebatsch
2021/0035206 A1 2/2021 Bowles et al.
2021/0081698 A1 3/2021 Lindeman et al.

(56) References Cited

U.S. PATENT DOCUMENTS

| | | | |
|---|---|---|---|
| 2021/0081914 | A1 | 3/2021 | Nelms et al. |
| 2021/0110366 | A1 | 4/2021 | Dion et al. |
| 2021/0110440 | A1 | 4/2021 | Dion et al. |
| 2021/0150773 | A1 | 5/2021 | Muendel et al. |
| 2021/0174312 | A1 | 6/2021 | Bowels et al. |
| 2021/0192484 | A1 | 6/2021 | Forutanpour et al. |
| 2021/0209512 | A1 | 7/2021 | Gaddam et al. |
| 2021/0209746 | A1 | 7/2021 | Johnson et al. |
| 2021/0217076 | A1 | 7/2021 | Kruper et al. |
| 2021/0224867 | A1 | 7/2021 | Bordeleau et al. |
| 2021/0247016 | A1 | 8/2021 | Affentranger |
| 2021/0254966 | A1 | 8/2021 | Hur et al. |
| 2021/0255240 | A1 | 8/2021 | McGrath |
| 2021/0264483 | A1 | 8/2021 | Hirata |
| 2021/0272208 | A1 | 9/2021 | Leise et al. |
| 2021/0278338 | A1 | 9/2021 | Jung |
| 2021/0295494 | A1 | 9/2021 | Forutanpour et al. |
| 2021/0327203 | A1 | 10/2021 | Shah |
| 2021/0343030 | A1 | 11/2021 | Sagnoas |
| 2021/0357545 | A1 | 11/2021 | Sugawara et al. |
| 2022/0027879 | A1 | 1/2022 | Bowles et al. |
| 2022/0050897 | A1 | 2/2022 | Gaddam et al. |
| 2022/0051212 | A1 | 2/2022 | Forutanpour et al. |
| 2022/0051300 | A1 | 2/2022 | Forutanpour et al. |
| 2022/0051301 | A1 | 2/2022 | Forutanpour et al. |
| 2022/0051507 | A1 | 2/2022 | Forutanpour et al. |
| 2022/0051514 | A1 | 2/2022 | Schmidt |
| 2022/0067798 | A1 | 3/2022 | Forutanpour et al. |
| 2022/0068076 | A1 | 3/2022 | Forutanpour et al. |
| 2022/0084296 | A1 | 3/2022 | Sadalgi |
| 2022/0114854 | A1 | 4/2022 | Forutanpour et al. |
| 2022/0164833 | A1 | 5/2022 | Dion et al. |
| 2022/0172178 | A1 | 6/2022 | Forutanpour et al. |
| 2022/0187802 | A1 | 6/2022 | Wittenberg et al. |
| 2022/0198407 | A1 | 6/2022 | Beane et al. |
| 2022/0254216 | A1 | 8/2022 | Schwarzli |
| 2022/0262189 | A1 | 8/2022 | Dion et al. |
| 2022/0277281 | A1 | 9/2022 | Dion et al. |
| 2022/0284406 | A1 | 9/2022 | Hunt et al. |
| 2022/0292464 | A1 | 9/2022 | Silva et al. |
| 2022/0318774 | A1 | 10/2022 | Bowles |
| 2023/0007937 | A1 | 1/2023 | Forutanpour et al. |
| 2023/0051060 | A1 | 2/2023 | Nitu |
| 2023/0077844 | A1 | 3/2023 | Bowles et al. |
| 2023/0100849 | A1 | 3/2023 | Bowles et al. |
| 2023/0188998 | A1 | 6/2023 | Zellner et al. |
| 2023/0196865 | A1 | 6/2023 | Forutanpour et al. |
| 2023/0215109 | A1 | 7/2023 | Ha |
| 2023/0238751 | A1 | 7/2023 | Forutanpour et al. |
| 2023/0259910 | A1 | 8/2023 | Forutanpour et al. |
| 2023/0264871 | A1 | 8/2023 | Williams et al. |
| 2023/0274346 | A1 | 8/2023 | Bowles et al. |
| 2023/0297973 | A1 | 9/2023 | Bowles et al. |
| 2023/0297974 | A1 | 9/2023 | Bowles et al. |
| 2023/0306384 | A1 | 9/2023 | Bowles et al. |
| 2023/0371729 | A1 | 11/2023 | Williams et al. |
| 2023/0394904 | A1 | 12/2023 | Forutanpour et al. |
| 2024/0005289 | A1 | 1/2024 | Silva et al. |
| 2024/0087276 | A1 | 3/2024 | Silva et al. |
| 2024/0144461 | A1 | 5/2024 | Forutanpour et al. |
| 2024/0185317 | A1 | 6/2024 | Forutanpour et al. |
| 2024/0249251 | A1 | 7/2024 | Bowles |
| 2024/0249321 | A1 | 7/2024 | Forutanpour et al. |
| 2024/0265364 | A1 | 8/2024 | Forutanpour et al. |
| 2024/0265470 | A1 | 8/2024 | Bowles et al. |
| 2024/0289753 | A1 | 8/2024 | Bowles |
| 2024/0312284 | A1 | 9/2024 | Dion |
| 2024/0321033 | A1 | 9/2024 | Forutanpour et al. |
| 2024/0322599 | A1 | 9/2024 | Bober |
| 2024/0333032 | A1 | 10/2024 | Bober |
| 2024/0346463 | A1 | 10/2024 | Hunt et al. |

FOREIGN PATENT DOCUMENTS

| | | | |
|---|---|---|---|
| CA | 3235982 | | 9/2011 |
| CA | 2818533 | A1 | 5/2012 |
| CA | 2866147 | | 9/2013 |
| CA | 3069888 | | 1/2019 |
| CA | 3069890 | | 1/2019 |
| CA | 2926097 | | 11/2020 |
| CA | 3152907 | | 4/2021 |
| CN | 1365479 | | 8/2002 |
| CN | 1574437 | | 2/2005 |
| CN | 2708415 | | 7/2005 |
| CN | 1864088 | | 11/2006 |
| CN | 1957320 | | 5/2007 |
| CN | 2912132 | | 6/2007 |
| CN | 200965706 | | 10/2007 |
| CN | 101176124 | | 5/2008 |
| CN | 101379488 | | 3/2009 |
| CN | 101542970 | | 9/2009 |
| CN | 201956656 | U | 8/2011 |
| CN | 102246384 | | 11/2011 |
| CN | 102315630 | A | 1/2012 |
| CN | 102467728 | A | 5/2012 |
| CN | 202351953 | | 7/2012 |
| CN | 202353475 | U | 7/2012 |
| CN | 202394296 | | 8/2012 |
| CN | 102654927 | | 9/2012 |
| CN | 102682597 | | 9/2012 |
| CN | 202564711 | U | 11/2012 |
| CN | 102812500 | | 12/2012 |
| CN | 202585951 | U | 12/2012 |
| CN | 202702438 | U | 1/2013 |
| CN | 202711369 | U | 1/2013 |
| CN | 102930642 | | 2/2013 |
| CN | 102976004 | | 3/2013 |
| CN | 103198562 | | 7/2013 |
| CN | 103226870 | | 7/2013 |
| CN | 203242065 | | 10/2013 |
| CN | 103440607 | | 12/2013 |
| CN | 103514641 | | 1/2014 |
| CN | 103544772 | | 1/2014 |
| CN | 203408902 | | 1/2014 |
| CN | 103662541 | | 3/2014 |
| CN | 103679147 | | 3/2014 |
| CN | 103765455 | | 4/2014 |
| CN | 203520502 | | 4/2014 |
| CN | 103824387 | A | 5/2014 |
| CN | 203588366 | | 5/2014 |
| CN | 103843040 | | 6/2014 |
| CN | 103954626 | | 7/2014 |
| CN | 103999053 | | 8/2014 |
| CN | 302944037 | S | 9/2014 |
| CN | 302944252 | S | 9/2014 |
| CN | 302944253 | S | 9/2014 |
| CN | 303042750 | S | 12/2014 |
| CN | 205103926 | U | 3/2016 |
| CN | 105488702 | | 4/2016 |
| CN | 105513201 | | 4/2016 |
| CN | 205129815 | U | 4/2016 |
| CN | 205132514 | U | 4/2016 |
| CN | 205140067 | U | 4/2016 |
| CN | 205247436 | | 5/2016 |
| CN | 106022379 | A | 10/2016 |
| CN | 303896361 | S | 10/2016 |
| CN | 106203643 | A | 12/2016 |
| CN | 106293734 | A | 1/2017 |
| CN | 106372638 | A | 2/2017 |
| CN | 304051346 | S | 2/2017 |
| CN | 304139831 | S | 5/2017 |
| CN | 106911159 | | 6/2017 |
| CN | 304169301 | S | 6/2017 |
| CN | 206440635 | U | 8/2017 |
| CN | 107220640 | A | 9/2017 |
| CN | 206466691 | U | 9/2017 |
| CN | 107514978 | A | 12/2017 |
| CN | 206861374 | U | 1/2018 |
| CN | 207037788 | U | 2/2018 |
| CN | 105444678 | B | 3/2018 |
| CN | 304702339 | S | 6/2018 |

(56) References Cited

FOREIGN PATENT DOCUMENTS

| | | | |
|---|---|---|---|
| CN | 304702340 | S | 6/2018 |
| CN | 304747709 | S | 7/2018 |
| CN | 304795309 | S | 8/2018 |
| CN | 108596658 | A | 9/2018 |
| CN | 207854959 | | 9/2018 |
| CN | 108647588 | A | 10/2018 |
| CN | 207993120 | U | 10/2018 |
| CN | 207993121 | U | 10/2018 |
| CN | 207995226 | U | 10/2018 |
| CN | 304842785 | S | 10/2018 |
| CN | 108764236 | A | 11/2018 |
| CN | 208086545 | U | 11/2018 |
| CN | 208172834 | U | 11/2018 |
| CN | 208176564 | | 12/2018 |
| CN | 304958348 | S | 12/2018 |
| CN | 305014434 | S | 1/2019 |
| CN | 305014435 | S | 1/2019 |
| CN | 208790107 | | 4/2019 |
| CN | 109831575 | A | 5/2019 |
| CN | 208819255 | U | 5/2019 |
| CN | 208819289 | U | 5/2019 |
| CN | 208819290 | U | 5/2019 |
| CN | 208969761 | U | 6/2019 |
| CN | 305275610 | S | 7/2019 |
| CN | 110333876 | A | 10/2019 |
| CN | 110347341 | A | 10/2019 |
| CN | 110595361 | A | 12/2019 |
| CN | 110653162 | A | 1/2020 |
| CN | 110675399 | A | 1/2020 |
| CN | 110751002 | A | 2/2020 |
| CN | 110788015 | A | 2/2020 |
| CN | 110796646 | A | 2/2020 |
| CN | 110796647 | A | 2/2020 |
| CN | 110796669 | A | 2/2020 |
| CN | 110827244 | A | 2/2020 |
| CN | 110827245 | A | 2/2020 |
| CN | 110827246 | A | 2/2020 |
| CN | 110827247 | A | 2/2020 |
| CN | 110827248 | A | 2/2020 |
| CN | 110827249 | A | 2/2020 |
| CN | 110880028 | A | 3/2020 |
| CN | 110928730 | A | 3/2020 |
| CN | 305638504 | S | 3/2020 |
| CN | 11080184 | A | 4/2020 |
| CN | 110976302 | A | 4/2020 |
| CN | 111009073 | A | 4/2020 |
| CN | 210348162 | U | 4/2020 |
| CN | 111175318 | A | 5/2020 |
| CN | 111210473 | A | 5/2020 |
| CN | 305767220 | S | 5/2020 |
| CN | 111238430 | A | 6/2020 |
| CN | 111262987 | A | 6/2020 |
| CN | 111272067 | A | 6/2020 |
| CN | 111272388 | A | 6/2020 |
| CN | 111272393 | A | 6/2020 |
| CN | 111273704 | A | 6/2020 |
| CN | 111277466 | A | 6/2020 |
| CN | 111277659 | A | 6/2020 |
| CN | 111277695 | A | 6/2020 |
| CN | 111277696 | A | 6/2020 |
| CN | 111290660 | A | 6/2020 |
| CN | 111290949 | A | 6/2020 |
| CN | 111291661 | A | 6/2020 |
| CN | 111292302 | A | 6/2020 |
| CN | 111294454 | A | 6/2020 |
| CN | 111294459 | A | 6/2020 |
| CN | 111307429 | A | 6/2020 |
| CN | 111311556 | A | 6/2020 |
| CN | 111311687 | A | 6/2020 |
| CN | 111311749 | A | 6/2020 |
| CN | 111314445 | A | 6/2020 |
| CN | 111314535 | A | 6/2020 |
| CN | 111325715 | A | 6/2020 |
| CN | 111325716 | A | 6/2020 |
| CN | 111325717 | A | 6/2020 |
| CN | 111325901 | A | 6/2020 |
| CN | 210666955 | U | 6/2020 |
| CN | 305818424 | S | 6/2020 |
| CN | 111439560 | A | 7/2020 |
| CN | 211149556 | U | 7/2020 |
| CN | 305955503 | S | 7/2020 |
| CN | 211291337 | U | 8/2020 |
| CN | 211296771 | U | 8/2020 |
| CN | 211402187 | U | 9/2020 |
| CN | 211515235 | U | 9/2020 |
| CN | 211538600 | U | 9/2020 |
| CN | 111830293 | A | 10/2020 |
| CN | 111830354 | A | 10/2020 |
| CN | 111860890 | A | 10/2020 |
| CN | 111860891 | A | 10/2020 |
| CN | 211630227 | U | 10/2020 |
| CN | 306113050 | S | 10/2020 |
| CN | 306113051 | S | 10/2020 |
| CN | 306113052 | S | 10/2020 |
| CN | 212023984 | U | 11/2020 |
| CN | 212031269 | U | 11/2020 |
| CN | 306164092 | S | 11/2020 |
| CN | 306164093 | S | 11/2020 |
| CN | 306164094 | S | 11/2020 |
| CN | 306164095 | S | 11/2020 |
| CN | 112098443 | A | 12/2020 |
| CN | 212084259 | U | 12/2020 |
| CN | 212268703 | U | 1/2021 |
| CN | 212314534 | U | 1/2021 |
| CN | 212322247 | U | 1/2021 |
| CN | 212364464 | | 1/2021 |
| CN | 306272538 | S | 1/2021 |
| CN | 306283626 | S | 1/2021 |
| CN | 112348761 | A | 2/2021 |
| CN | 112348808 | A | 2/2021 |
| CN | 112393880 | A | 2/2021 |
| CN | 112395118 | A | 2/2021 |
| CN | 212460662 | | 2/2021 |
| CN | 212586854 | U | 2/2021 |
| CN | 212597202 | U | 2/2021 |
| CN | 306323627 | S | 2/2021 |
| CN | 112433902 | A | 3/2021 |
| CN | 112452935 | A | 3/2021 |
| CN | 112455988 | A | 3/2021 |
| CN | 112456100 | A | 3/2021 |
| CN | 112565505 | A | 3/2021 |
| CN | 212677296 | U | 3/2021 |
| CN | 212681731 | U | 3/2021 |
| CN | 111314537 | | 4/2021 |
| CN | 112613622 | A | 4/2021 |
| CN | 112613914 | A | 4/2021 |
| CN | 112614117 | A | 4/2021 |
| CN | 112614269 | A | 4/2021 |
| CN | 112633194 | A | 4/2021 |
| CN | 112634245 | A | 4/2021 |
| CN | 112634288 | A | 4/2021 |
| CN | 112634301 | A | 4/2021 |
| CN | 112672145 | A | 4/2021 |
| CN | 112735081 | A | 4/2021 |
| CN | 213001252 | U | 4/2021 |
| CN | 213004872 | U | 4/2021 |
| CN | 112777290 | A | 5/2021 |
| CN | 112783702 | A | 5/2021 |
| CN | 112816490 | A | 5/2021 |
| CN | 112822740 | A | 5/2021 |
| CN | 112828842 | A | 5/2021 |
| CN | 112837076 | A | 5/2021 |
| CN | 112837102 | A | 5/2021 |
| CN | 213149008 | U | 5/2021 |
| CN | 213301455 | U | 5/2021 |
| CN | 213301535 | U | 5/2021 |
| CN | 213305483 | U | 5/2021 |
| CN | 112907182 | A | 6/2021 |
| CN | 112991614 | A | 6/2021 |
| CN | 113032198 | A | 6/2021 |
| CN | 113034481 | A | 6/2021 |
| CN | 113034493 | A | 6/2021 |
| CN | 113034529 | A | 6/2021 |
| CN | 113034530 | A | 6/2021 |

(56) References Cited

FOREIGN PATENT DOCUMENTS

| | | | |
|---|---|---|---|
| CN | 113034531 | A | 6/2021 |
| CN | 113038012 | A | 6/2021 |
| CN | 113052798 | A | 6/2021 |
| CN | 113110806 | A | 7/2021 |
| CN | 113114794 | A | 7/2021 |
| CN | 113132523 | A | 7/2021 |
| CN | 113160494 | A | 7/2021 |
| CN | 113190215 | A | 7/2021 |
| CN | 113191789 | A | 7/2021 |
| CN | 213765490 | U | 7/2021 |
| CN | 213796595 | U | 7/2021 |
| CN | 213807304 | U | 7/2021 |
| CN | 306700330 | S | 7/2021 |
| CN | 113220647 | A | 8/2021 |
| CN | 113220648 | A | 8/2021 |
| CN | 113237473 | A | 8/2021 |
| CN | 113238680 | A | 8/2021 |
| CN | 113238905 | A | 8/2021 |
| CN | 113252678 | A | 8/2021 |
| CN | 113254292 | A | 8/2021 |
| CN | 113254293 | A | 8/2021 |
| CN | 113254294 | A | 8/2021 |
| CN | 113268162 | A | 8/2021 |
| CN | 113298078 | A | 8/2021 |
| CN | 113301202 | A | 8/2021 |
| CN | 113329222 | A | 8/2021 |
| CN | 213917879 | U | 8/2021 |
| CN | 213933659 | U | 8/2021 |
| CN | 306744667 | S | 8/2021 |
| CN | 306744668 | S | 8/2021 |
| CN | 306786433 | S | 8/2021 |
| CN | 306786434 | S | 8/2021 |
| CN | 113422860 | A | 9/2021 |
| CN | 214160736 | U | 9/2021 |
| CN | 214162705 | U | 9/2021 |
| CN | 214427985 | U | 10/2021 |
| CN | 113591066 | A | 11/2021 |
| CN | 113591963 | A | 11/2021 |
| CN | 113808322 | A | 12/2021 |
| CN | 215246545 | U | 12/2021 |
| CN | 215247165 | U | 12/2021 |
| CN | 215247245 | U | 12/2021 |
| CN | 215247426 | U | 12/2021 |
| CN | 215262785 | U | 12/2021 |
| CN | 215262787 | U | 12/2021 |
| CN | 215266884 | U | 12/2021 |
| CN | 215266954 | U | 12/2021 |
| CN | 215325354 | U | 12/2021 |
| CN | 113887609 | A | 1/2022 |
| CN | 113901996 | A | 1/2022 |
| CN | 113947445 | A | 1/2022 |
| CN | 215555043 | U | 1/2022 |
| CN | 215556081 | U | 1/2022 |
| CN | 215575427 | U | 1/2022 |
| CN | 215576764 | U | 1/2022 |
| CN | 215576765 | U | 1/2022 |
| CN | 114038114 | A | 2/2022 |
| CN | 114063364 | A | 2/2022 |
| CN | 114066367 | A | 2/2022 |
| CN | 215703219 | U | 2/2022 |
| CN | 215708961 | U | 2/2022 |
| CN | 114155260 | A | 3/2022 |
| CN | 114170419 | A | 3/2022 |
| CN | 114170435 | A | 3/2022 |
| CN | 114186702 | A | 3/2022 |
| CN | 114219105 | A | 3/2022 |
| CN | 114281627 | A | 4/2022 |
| CN | 114298204 | A | 4/2022 |
| CN | 114298345 | A | 4/2022 |
| CN | 114299293 | A | 4/2022 |
| CN | 114299657 | A | 4/2022 |
| CN | 114328051 | A | 4/2022 |
| CN | 114330533 | A | 4/2022 |
| CN | 114330534 | A | 4/2022 |
| CN | 114332016 | A | 4/2022 |

| | | | |
|---|---|---|---|
| CN | 114371417 | A | 4/2022 |
| CN | 114374795 | A | 4/2022 |
| CN | 114386629 | A | 4/2022 |
| CN | 114494856 | A | 5/2022 |
| CN | 216612155 | U | 5/2022 |
| CN | 216751854 | U | 6/2022 |
| CN | 216751855 | U | 6/2022 |
| CN | 217133280 | U | 8/2022 |
| CN | 217133770 | U | 8/2022 |
| CN | 217550626 | U | 10/2022 |
| CN | 217589621 | U | 10/2022 |
| CN | 307592104 | S | 10/2022 |
| DE | 10031532 | | 10/2001 |
| EP | 0116970 | | 12/1991 |
| EP | 0654003 | | 5/1995 |
| EP | 1168253 | | 1/2002 |
| EP | 1270905 | | 1/2003 |
| EP | 1703436 | | 9/2006 |
| EP | 2701450 | | 2/2014 |
| EP | 2810219 | | 12/2014 |
| EP | 3206194 | A1 | 8/2017 |
| EP | 3255753 | | 12/2017 |
| EP | 2428072 | | 1/2018 |
| ES | 2304327 | | 10/2008 |
| FR | 3047833 | B1 | 3/2018 |
| GB | 2167553 | | 5/1986 |
| GB | 202012494 | | 9/2020 |
| GB | 202209941 | | 7/2022 |
| GR | 20210100761 | | 7/2022 |
| HK | 30014296 | A | 8/2020 |
| JP | H7112801 | | 5/1995 |
| JP | H07334583 | | 12/1995 |
| JP | H11242005 | | 9/1999 |
| JP | H11334851 | | 12/1999 |
| JP | 2000121564 | | 4/2000 |
| JP | 2000171409 | A | 6/2000 |
| JP | 2000180371 | | 6/2000 |
| JP | 3123095 | | 1/2001 |
| JP | 2001312766 | | 11/2001 |
| JP | 2002019147 | | 1/2002 |
| JP | 2002183286 | | 6/2002 |
| JP | 2002259528 | | 9/2002 |
| JP | 2002302252 | | 10/2002 |
| JP | 2002324264 | | 11/2002 |
| JP | 2002358354 | | 12/2002 |
| JP | 2003016179 | | 1/2003 |
| JP | 2003139516 | | 5/2003 |
| JP | 2003230229 | | 8/2003 |
| JP | 2003242243 | | 8/2003 |
| JP | 2003264007 | | 9/2003 |
| JP | 2003267509 | | 9/2003 |
| JP | 2004021569 | | 1/2004 |
| JP | 2004191496 | | 7/2004 |
| JP | 2004226129 | | 8/2004 |
| JP | 2004226328 | | 8/2004 |
| JP | 2004239850 | | 8/2004 |
| JP | 2004288143 | | 10/2004 |
| JP | 2004303102 | | 10/2004 |
| JP | 2004341681 | | 12/2004 |
| JP | 2005063203 | | 3/2005 |
| JP | 2005122059 | | 5/2005 |
| JP | 2005308476 | | 11/2005 |
| JP | 2006127308 | | 5/2006 |
| JP | 2006195814 | | 7/2006 |
| JP | 2006203451 | | 8/2006 |
| JP | 2006227764 | | 8/2006 |
| JP | 2006260246 | | 9/2006 |
| JP | 2007141266 | | 6/2007 |
| JP | 2007155455 | | 6/2007 |
| JP | 2007179516 | | 7/2007 |
| JP | 2007265340 | | 10/2007 |
| JP | 2008045959 | | 2/2008 |
| JP | 2008059403 | | 3/2008 |
| JP | 2008522299 | | 6/2008 |
| JP | 2008293391 | | 12/2008 |
| JP | 2007086725 | | 4/2009 |
| JP | 2009175035 | | 8/2009 |
| JP | 2009245058 | | 10/2009 |
| JP | 2009250971 | | 10/2009 |

(56) References Cited

FOREIGN PATENT DOCUMENTS

| | | | |
|---|---|---|---|
| JP | 2009290852 | | 12/2009 |
| JP | 2010177720 | | 8/2010 |
| JP | 2010276896 | | 12/2010 |
| JP | 2011518387 | | 6/2011 |
| JP | 2012032370 | | 2/2012 |
| JP | 2012504832 | | 2/2012 |
| JP | 2012058932 | | 3/2012 |
| JP | 2013033361 | | 2/2013 |
| JP | 2013037441 | | 2/2013 |
| JP | 2013531823 | | 8/2013 |
| JP | 2014513829 | | 6/2014 |
| JP | 2015505999 | | 2/2015 |
| JP | 2015513135 | | 4/2015 |
| JP | 2016504900 | | 2/2016 |
| JP | 6050922 | | 12/2016 |
| JP | 2017040957 | | 2/2017 |
| JP | 2017093938 | | 6/2017 |
| JP | 2017142781 | | 8/2017 |
| JP | 2017173902 | | 9/2017 |
| JP | 2017201559 | | 11/2017 |
| JP | 6266065 | | 3/2018 |
| JP | 2018520453 | | 7/2018 |
| JP | 2019012474 | | 1/2019 |
| JP | 2019513262 | | 5/2019 |
| JP | 3223233 | U | 9/2019 |
| JP | 2020526847 | | 8/2020 |
| JP | 2021530786 | | 11/2021 |
| JP | 2022539909 | A | 9/2022 |
| JP | 2022539910 | A | 9/2022 |
| JP | 2022539912 | A | 9/2022 |
| JP | 2022545336 | A | 9/2022 |
| KR | 20000064168 | | 11/2000 |
| KR | 20010074614 | | 8/2001 |
| KR | 20010097567 | | 11/2001 |
| KR | 100581234 | | 5/2006 |
| KR | 100766860 | | 10/2007 |
| KR | 20130085255 | | 7/2013 |
| KR | 101326680 | | 11/2013 |
| KR | 101329949 | | 11/2013 |
| KR | 20140037543 | | 3/2014 |
| KR | 101599251 | | 3/2016 |
| KR | 20180086617 | | 8/2018 |
| KR | 20180088062 | | 8/2018 |
| KR | 20180088063 | | 8/2018 |
| KR | 20180117278 | | 10/2018 |
| KR | 20190026131 | | 3/2019 |
| KR | 20190107593 | | 9/2019 |
| KR | 20190107594 | | 9/2019 |
| KR | 20190107595 | | 9/2019 |
| KR | 20190107596 | | 9/2019 |
| KR | 20200115308 | | 10/2020 |
| KR | 20210020717 | | 2/2021 |
| KR | 20210059148 | | 5/2021 |
| KR | 20210107515 | | 9/2021 |
| WO | 8503790 | | 8/1985 |
| WO | WO200115096 | | 3/2001 |
| WO | WO0205176 | | 1/2002 |
| WO | WO0221090 | | 3/2002 |
| WO | WO2002225613 | | 3/2002 |
| WO | WO0239357 | | 5/2002 |
| WO | WO03012717 | | 2/2003 |
| WO | WO03014994 | | 2/2003 |
| WO | WO2004021114 | | 3/2004 |
| WO | WO2004114490 | | 12/2004 |
| WO | WO2005008566 | | 1/2005 |
| WO | 2005054877 | | 6/2005 |
| WO | WO2005101346 | | 10/2005 |
| WO | WO2006021825 | | 3/2006 |
| WO | WO2006058601 | | 6/2006 |
| WO | WO2006080851 | | 8/2006 |
| WO | WO2007066166 | | 6/2007 |
| WO | 2009089607 | | 7/2009 |
| WO | WO2009128173 | | 10/2009 |
| WO | WO2009128176 | | 10/2009 |
| WO | WO2009129526 | | 10/2009 |
| WO | WO2010040116 | | 4/2010 |
| WO | WO2010128267 | | 11/2010 |
| WO | WO2010128315 | | 11/2010 |
| WO | 2011115857 | | 9/2011 |
| WO | WO2011131016 | | 10/2011 |
| WO | 2012073126 | | 6/2012 |
| WO | 2012138679 | | 10/2012 |
| WO | WO2013002748 | | 1/2013 |
| WO | 2013063042 | | 5/2013 |
| WO | WO2013074819 | | 5/2013 |
| WO | 2013116256 | | 8/2013 |
| WO | 2014033350 | | 3/2014 |
| WO | WO2014075055 | | 5/2014 |
| WO | 2014088978 | | 6/2014 |
| WO | 2014141180 | | 9/2014 |
| WO | WO2015022409 | | 2/2015 |
| WO | WO2015093676 | | 6/2015 |
| WO | 2015108864 | | 7/2015 |
| WO | 2015146026 | | 10/2015 |
| WO | WO2016181224 | | 11/2016 |
| WO | 2015196175 | | 12/2016 |
| WO | 2016196175 | | 12/2016 |
| WO | 2017052684 | | 3/2017 |
| WO | WO2017034441 | | 3/2017 |
| WO | WO2017081527 | | 5/2017 |
| WO | 2017156046 | | 9/2017 |
| WO | 2018003026 | | 1/2018 |
| WO | 2018124669 | | 7/2018 |
| WO | 2018133068 | | 7/2018 |
| WO | 2018146374 | | 8/2018 |
| WO | 2019012305 | | 1/2019 |
| WO | 2019012505 | | 1/2019 |
| WO | 2019012506 | | 1/2019 |
| WO | 2019212513 | | 11/2019 |
| WO | 2019212515 | | 11/2019 |
| WO | 2019008943 | | 4/2020 |
| WO | 2020082991 | | 4/2020 |
| WO | 2020204503 | | 10/2020 |
| WO | 2020226637 | | 11/2020 |
| WO | 2021019286 | | 2/2021 |
| WO | 2021082918 | | 5/2021 |
| WO | 2021082919 | | 5/2021 |
| WO | 2021082920 | | 5/2021 |
| WO | 2021082921 | | 5/2021 |
| WO | 2021082922 | | 5/2021 |
| WO | 2021082923 | | 5/2021 |
| WO | 2021142009 | | 7/2021 |
| WO | 2021147385 | | 7/2021 |
| WO | 2021147386 | | 7/2021 |
| WO | 2021147387 | | 7/2021 |
| WO | 2021147388 | | 7/2021 |
| WO | 2021172803 | | 9/2021 |
| WO | 2022034298 | | 2/2022 |
| WO | 2022090999 | | 5/2022 |
| WO | 2022091000 | | 5/2022 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

(56) References Cited

OTHER PUBLICATIONS

Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Cybercom Group Europe AB, "The OMSI 2.0 Interface Supports," OMSI 2.0 Description, available at least before Oct. 2008, 1 page.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group, "Leading Telecom Organisations Address Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4): 493-504.
Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
International Numbering Plan, www.numberingplans.com, 2 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT Panel Auto-Inspection", Journal of the Chinese Institute of Industrial Engineers, vol. 24, No. 5, pp. 341-350 (2007).
Phifer, "How to Use your 3G Phone as a Wireless Broad Band Modem," Comptuer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" Pylmage Search, Sep. 2014, 19 pages.
SimplySellular, "Get Cash for your Old Cell Phone", published Apr. 2, 2010, retrieved from http://simplysellular.com/conditions.php on Jan. 6, 2015, 2 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Sony Ericsoon Mobile Communications AB, "T68i/T68ie," White Paper, 2002, 71 pages.
Sony Ericsoon Mobile Communications AB, "P800/P802," White Paper, 2003, 128 pages.
Tecace Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Tech Spurt, "Sandisk iXpand Review | Wireless Charger & Auto Photo Backup!" https://www.youtube.com/watch?v=zemKQ6xIJLww, Aug. 21, 2019, 1 page.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
PCT International Search Report for PCT Application No. PCT/2009/059461, filed Feb. 3, 2010.
PCT International Search Report for PCT Application No. PCT/2011/028251, filed Mar. 13, 2011.
PCT International Search Report and Written Opinion mailed Jul. 18, 2014 for PCT Application No. PCT/US2014/024551, filed Mar. 12, 2014, 11 pages.
PCT International Search Report and Written Opinionmailed Apr. 3, 2014 for PCT Application No. PCT/US2013/072697, filed Dec. 2, 2013, 7 pages.
PCT International Search Report for PCT Application No. PCT/US2012/032042, filed Apr. 4, 2012.
PCT International Search Report for PCT Application No. PCT/US2012/061587, filed Oct. 24, 2012.
PCT International Search Report for PCT Application No. PCT/US2013/023717, filed Jan. 30, 2013.
Notice of Allowance mailed Sep. 27, 2017 in U.S. Appl. No. 15/641,122, 5 pages.
Office Action mailed Sep. 1, 2017 in U.S. Appl. No. 15/630,460, 23 pages.
Office Action mailed Sep. 5, 2017 in U.S. Appl. No. 15/641,122, 7 pages.

(56) References Cited

OTHER PUBLICATIONS

Office Action mailed Sep. 1, 2017 in U.S. Appl. No. 15/641,145, 20 pages.
Non-Final Office Action mailed Oct. 10, 2017 in U.S. Appl. No. 15/672,157, 18 pages.
Final Office Action mailed Jul. 11, 2017 in U.S. Appl. No. 13/438,924, 19 pages.
Notice of Allowance mailed Jul. 13, 2017 in U.S. Appl. No. 13/792,030, 9 pages.
Notice of Allowance mailed Jul. 5, 2017 in U.S. Appl. No. 13/862,395, 9 pages.
Final Office Action mailed Apr. 9, 2014 in U.S. Appl. No. 13/862,395, 26 pages.
Office Action mailed Feb. 25, 2016 in U.S. Appl. No. 13/794,816, 76 pages.
Office Action mailed Jul. 11, 2016 in U.S. Appl. No. 13/794,814, 21 pages.
Non-Final Office Action mailed Jul. 29, 2013 in U.S. Appl. No. 13/862,395, 19 pages.
Non-Office Action mailed Mar. 3, 2017 in U.S. Appl. No. 13/913,408, 29 pages.
Non-Final Office Action mailed Mar. 6, 2015 in U.S. Appl. No. 13/862,395, 29 pages.
Office Action mailed May 31, 2016 in U.S. Appl. No. 13/658,828, 63 pages.
Final Office Action mailed Sep. 18, 2015 in U.S. Appl. No. 13/862,395, 29 pages.
Notice of Allowance mailed Dec. 14, 2017 in U.S. Appl. No. 13/792,030, 5 pages.
Final Office Action mailed Nov. 2, 2017 in U.S. Appl. No. 13/794,816, 75 pages.
Office Action mailed Feb. 1, 2018 in U.S. Appl. No. 15/630,460, 24 pages.
Non-Final Office Action mailed Apr. 8, 2019 in U.S. Appl. No. 15/214,791, 31 pages.
Non-Final Office Action mailed Jul. 8, 2019 in U.S. Appl. No. 15/091,487, 31 pages.
Non-Final Office Action mailed Oct. 2, 2019 in U.S. Appl. No. 15/672,157, 14 pages.
Non-Final Office Action mailed Oct. 25, 2019 in U.S. Appl. No. 16/195,785, 6 pages.
Final Office Action mailed Jan. 29, 2020 in U.S. Appl. No. 15/091,487, 24 pages.
Non-Final Office Action mailed Oct. 11, 2011 in U.S. Appl. No. 12/573,089, 17 pages.
Non-Final Office Action response filed Jan. 11, 2012 in U.S. Appl. No. 12/573,089, 11 pages.
Final Office Action mailed Jan. 24, 2012 in U.S. Appl. No. 12/573,089, 17 pages.
Final Office Action response filed Mar. 28, 2012 in U.S. Appl. No. 12/573,089, 12 pages.
Notice of Allowance mailed Apr. 12, 2012 in U.S. Appl. No. 12/573,089, 10 pages.
Non-Final Office Action mailed Jan. 8, 2013 in U.S. Appl. No. 13/487,299, 15 pages.
Non-Final Office Action response filed Apr. 8, 2013 in U.S. Appl. No. 13/487,299, 12 pages.
Notice of Allowance mailed May 6, 2013 in U.S. Appl. No. 13/487,299, 9 pages.
Non-Final Office Action response filed Aug. 11, 2017 in U.S. Appl. No. 13/913,408, 25 pages.
Notice of Allowance mailed Apr. 12, 2018 in U.S. Appl. No. 13/913,408, 21 pages.
Non-Final Office Action response filed Jan. 10, 2018 in U.S. Appl. No. 15/672,157, 32 pages.
Non-Final Office Action Response as Appeal Brief filed Jul. 2, 2020 in U.S. Appl. No. 15/672,157, 33 pages.
Notice of Allowance mailed Oct. 15, 2020 in U.S. Appl. No. 15/672,157, 13 pages.
Notice of Allowance mailed Mar. 31, 2021 in U.S. Appl. No. 15/672,157, 13 pages.
Non-Final Office Action mailed Jan. 7, 2021 in U.S. Appl. No. 15/977,729, 15 pages.
Non-Final Office Action response filed Jun. 7, 2021 in U.S. Appl. No. 15/977,729, 16 pages.
Final Office Action mailed Sep. 28, 2021 in U.S. Appl. No. 15/977,729, 31 pages.
Final Office Action response filed Jan. 27, 2022 U.S. Appl. No. 15/977,729, 16 pages.
Notice of Allowance, mailed Mar. 21, 2022 in U.S. Appl. No. 15/977,729, 11 pages.
Notice of Allowance, mailed Jul. 7, 2022, in U.S. Appl. No. 15/977,729, 7 pages.
Non-Final Office Action mailed Aug. 17, 2023 in U.S. Appl. No. 18/323,303, 28 pages.
Non-Final Office Action mailed Aug. 12, 2013 in U.S. Appl. No. 13/733,984, 31 pages.
Non-Final Office Action response filed Jan. 12, 2014 in U.S. Appl. No. 13/733,984, 15 pages.
Non-Final Office Action mailed May 6, 2014 in U.S. Appl. No. 13/733,984, 33 pages.
Non-Final Office Action response filed Oct. 6, 2014 in U.S. Appl. No. 13/733,984, 20 pages.
Final Office Action mailed Jan. 30, 2015 in U.S. Appl. No. 13/733,984, 35 pages.
Final Office Action response filed Jul. 30, 2015 in U.S. Appl. No. 13/733,984, 21 pages.
Non-Final Office Action mailed Jul. 15, 2013 in U.S. Appl. No. 13/705,252, 29 pages.
Non-Final Office Action response filed Dec. 13, 2013 in U.S. Appl. No. 13/705,252, 20 pages.
Non-Final Office Action mailed Jan. 5, 2016 in U.S. Appl. No. 13/705,252, 37 pages.
Non-Final Office Action response filed Nov. 6, 2019 in U.S. Appl. No. 15/091,487, 20 pages.
Non-Final Office Action mailed Oct. 15, 2021 in U.S. Appl. No. 17/072,012, 25 pages.
Non-Final Office Action response filed Feb. 15, 2022 in U.S. Appl. No. 17/072,012, 13 pages.
Notice of Allowance, mailed May 20, 2022 in U.S. Appl. No. 17/072,012, 9 pages.
Notice of Allowance, mailed Oct. 20, 2022 in U.S. Appl. No. 17/072,012, 10 pages.
Non-Final Office Action mailed Apr. 13, 2015 in U.S. Appl. No. 13/693,032, 15 pages.
Non-Final Office Action response filed Aug. 11, 2015 in U.S. Appl. No. 13/693,032, 18 pages.
Non-Final Office Action mailed Nov. 30, 2016 in U.S. Appl. No. 13/693,032, 14 pages.
Non-Final Office Action mailed Aug. 28, 2015 in U.S. Appl. No. 13/792,030, 19 pages.
Non-Final Office Action response filed Dec. 28, 2015 in U.S. Appl. No. 13/792,030, 18 pages.
Non-Final Office Action mailed Dec. 4, 2014 in U.S. Appl. No. 13/794,814, 22 pages.
Non-Final Office Action response filed Mar. 4, 2015 in U.S. Appl. No. 13/794,814, 17 pages.
Non-Final Office Action Response as Appeal Brief Dec. 2, 2016 in U.S. Appl. No. 13/794,814, 9 pages.
Non-Final Office Action response filed Aug. 5, 2016 in U.S. Appl. No. 13/794,816, 38 pages.
Final Office Action response filed Jun. 29, 2020 in U.S. Appl. No. 15/091,487, 15 pages.
Notice of Allowance mailed Aug. 3, 2020 in U.S. Appl. No. 15/091,487, 20 pages.
Non-Final Office Action mailed Aug. 2, 2010 in U.S. Appl. No. 12/727,624, 10 pages.
Non-Final Office Action response filed Aug. 23, 2010 in U.S. Appl. No. 12/727,624, 19 pages.
Final Office Action mailed Oct. 1, 2010 in U.S. Appl. No. 12/727,624, 11 pages.

(56) References Cited

OTHER PUBLICATIONS

Final Office Action response filed Nov. 2, 2010 in U.S. Appl. No. 12/727,624, 7 pages.
Notice of Allowance mailed Dec. 20, 2010 in U.S. Appl. No. 12/727,624, 80 pages.
Non-Final Office Action mailed Mar. 26, 2012 in U.S. Appl. No. 13/017,560, 10 pages.
Non-Final Office Action response filed Mar. 29, 2012 in U.S. Appl. No. 13/017,560, 14 pages.
Notice of Allowance mailed Jul. 5, 2012 in U.S. Appl. No. 13/017,560, 7 pages.
Non-Final Office Action mailed Dec. 10, 2012 in U.S. Appl. No. 13/562,292, 8 pages.
Non-Final Office Action response filed Dec. 29, 2012 in U.S. Appl. No. 13/562,292, 16 pages.
Notice of Allowance mailed Jan. 24, 2013 in U.S. Appl. No. 13/562,292, 8 pages.
Non-Final Office Action response filed Dec. 27, 2013 in U.S. Appl. No. 13/862,395, 14 pages.
Final Office Action response filed Oct. 9, 2014 in U.S. Appl. No. 13/862,395, 18 pages.
Non-Final Office Action response filed Jun. 8, 2015 in U.S. Appl. No. 13/862,395, 16 pages.
Final Office Action response filed Jan. 19, 2016 in U.S. Appl. No. 13/862,395, 24 pages.
Notice of Allowance mailed Jan. 11, 2018 in U.S. Appl. No. 13/862,395, 6 pages.
Non-Final Office Action mailed Oct. 1, 2020 in U.S. Appl. No. 15/901,526, 24 pages.
Notice of Allowance mailed May 27, 2021 in U.S. Appl. No. 15/901,526, 8 pages.
Non-Final Office Action mailed Dec. 23, 2022 in U.S. Appl. No. 17/394,255, 24 pages.
Non-Final Office Action response filed Jun. 22, 2023 in U.S. Appl. No. 17/394,255, 17 pages.
Notice of Allowane mailed Aug. 14, 2023 in U.S. Appl. No. 17/394,255, 10 pages.
Non-Final Office Action mailed Mar. 27, 2012 in U.S. Appl. No. 12/785,465, 15 pages.
Non-Final Office Action response filed Mar. 29, 2012 in U.S. Appl. No. 12/785,465, 16 pages.
Notice of Allowance mailed Apr. 11, 2012 in U.S. Appl. No. 12/785,465, 18 pages.
Non-Final Office Action mailed Jan. 15, 2013 in U.S. Appl. No. 13/492,835, 17 pages.
Non-Final Office Action response filed May 15, 2013 in U.S. Appl. No. 13/492,835, 14 pages.
Final Office Action mailed May 31, 2013 in U.S. Appl. No. 13/492,835, 18 pages.
Non-Final Office Action mailed Jan. 23, 2015 in U.S. Appl. No. 13/492,835, 22 pages.
Non-Final Office Action response filed May 26, 2015 in U.S. Appl. No. 13/492,835, 16 pages.
Non-Final Office Action mailed Sep. 10, 2015 in U.S. Appl. No. 13/492,835, 43 pages.
Non-Final Office Action response filed Jan. 11, 2016 in U.S. Appl. No. 13/492,835, 26 pages.
Final Office Action mailed May 6, 2016 in U.S. Appl. No. 13/492,835, 32 pages.
Non-Final Office Action mailed Sep. 1, 2017 in U.S. Appl. No. 15/630,460, 23 pages.
Non-Final Office Action response filed Nov. 29, 2017 in U.S. Appl. No. 15/630,460, 16 pages.
Final Office Action mailed Feb. 1, 2018 in U.S. Appl. No. 15/630,460, 47 pages.
Final Office Action Response as Appeal Brief filed Jun. 19, 2018 in U.S. Appl. No. 15/630,460, 24pages.
Examiner's Answer to Appeal Brief mailed Sep. 28, 2018 in U.S. Appl. No. 15/630,460, 16 pages.
Supplemental Appeal Brief filed Apr. 9, 2020 in U.S. Appl. No. 15/630,460, 4 pages.
Notice of Allowance mailed Jul. 6, 2020 in U.S. Appl. No. 15/630,460, 8 pages.
Non-Final Office Action mailed Mar. 28, 2013 in U.S. Appl. No. 13/438,924, 20 pages.
Non-Final Office Action response filed Aug. 28, 2013 in U.S. Appl. No. 13/438,924, 20 pages.
Final Office Action mailed Mar. 24, 2014 in U.S. Appl. No. 13/438,924, 32 pages.
Final Office Action response filed Aug. 21, 2014 in U.S. Appl. No. 13/438,924, 26 pages.
Non-Final Office Action mailed Sep. 24, 2015 in U.S. Appl. No. 13/438,924, 56 pages.
Non-Final Office Action response filed Mar. 24, 2016 in U.S. Appl. No. 13/438,924, 36 pages.
Notice of Allowance mailed May 2, 2018 in U.S. Appl. No. 13/438,924, 11 pages.
Non-Final Office Action mailed Sep. 5, 2017 in U.S. Appl. No. 15/641,122, 7 pages.
Non-Final Office Action response filed Sep. 6, 2017 in U.S. Appl. No. 15/641,122, 16 pages.
Notice of Allowance mailed Oct. 12, 2017 in U.S. Appl. No. 15/641,122, 2 pages.
Non-Final Office Action mailed May 10, 2018 in U.S. Appl. No. 15/811,501, 6 pages.
Non-Final Office Action response filed Jul. 3, 2018 in U.S. Appl. No. 15/811,501, 16 pages.
Notice of Allowance mailed Aug. 16, 2018 in U.S. Appl. No. 15/811,501, 5 pages.
Non-Final Office Action response filed Jan. 23, 2020 in U.S. Appl. No. 16/195,785, 10 pages.
Non-Final Office Action mailed Jun. 2, 2020 in U.S. Appl. No. 16/195,785, 8 pages.
Non-Final Office Action response filed Oct. 30, 2020 in U.S. Appl. No. 16/195,785, 14 pages.
Notice of Allowance mailed Nov. 13, 2020 in U.S. Appl. No. 16/195,785, 6 pages.
Notice of Allowance mailed Feb. 24, 2021 in U.S. Appl. No. 16/195,785, 6 pages.
Restriction Requirement mailed Feb. 6, 2023 in U.S. Appl. No. 17/225,932, 6 pages.
Non-Final Office Action mailed Jun. 28, 2023 in U.S. Appl. No. 17/225,932, 7 pages.
Non-Final Office Action mailed Jul. 7, 2015 in U.S. Appl. No. 13/753,539, 29 pages.
Non-Final Office Action response filed Nov. 9, 2015 in U.S. Appl. No. 13/753,539, 28 pages.
Final Office Action mailed Feb. 12, 2016 in U.S. Appl. No. 13/753,539, 30 pages.
Non-Final Office Action mailed Sep. 1, 2017 in U.S. Appl. No. 15/641,145, 20 pages.
Non-Final Office Action response filed Nov. 29, 2017 in U.S. Appl. No. 15/641,145, 13 pages.
Final Office Action mailed Mar. 22, 2018 in U.S. Appl. No. 15/641,145, 20 pages.
Non-Final Office Action mailed Apr. 11, 2013 in U.S. Appl. No. 13/658,825, 20 pages.
Non-Final Office Action response filed Sep. 10, 2013 in U.S. Appl. No. 13/658,825, 17 pages.
Final Office Action mailed Apr. 3, 2014 in U.S. Appl. No. 13/658,825, 28 pages.
Final Office Action response filed Oct. 3, 2014 in U.S. Appl. No. 13/658,825, 26 pages.
Non-Final Office Action mailed Nov. 20, 2015 in U.S. Appl. No. 13/658,825, 51 pages.
Non-Final Office Action response filed Mar. 18, 2016 in U.S. Appl. No. 13/658,825, 23 pages.
Final Office Action mailed Jun. 30, 2016 in U.S. Appl. No. 13/658,825, 23 pages.
Anderle, Megan, "Verizon's new app aims to make phone recycling easy and profitable", Internet Article, May 1, 2014, XP093222792,

(56) References Cited

OTHER PUBLICATIONS retrieved from the Internet: URL: https://www.theguardian.com/sustainable-business/verizon-mobile-phone-recycling-cell-ecoatm.
Ex Parte Quayle Action mailed Oct. 2, 2025 in U.S. Appl. No. 18/939,299, pp. 11.
Final Office Action Response filed Dec. 26, 2013 in U.S. Appl. No. 13/113,497, 8 pages.
Grose, Thomas; "New Life for Old Phones," ASE Prism 22.3 (2012): 18.
Hassan, et al.; "A Novel Cascaded Deep Neural Network for Analyzing Smart Phone Data for Indoor Localization", Dec. 2019, vol. 101, pp. 760-769, Future Generation Computer Systems.
Hazelwood, et al.; "Life Extension of Electronic Products: A Case Study of Smartphones", Sep. 20, 2021, IEEE Access, vol. 9, pp. 144726-144739, DOI: 10.1109/ACCESS.2021.3121733.
Huang et al., "Construction of an Automatic Inspection system using capability of identifying Color Characteristics of Products," 2008, pp. 1-6 (Year 2006).
Kuriyan, et al.: "Review of Research on Rural PC Kiosks," Apr. 14, 2007, 22 pages, retrieved at http://research.microsoft.com/research/tem/kiosks.
Nithi et al., "Smart Power Management for Mobile Handsets".
Non Final Office Action mailed Nov. 8, 2024 in U.S. Appl. No. 18/442,067, pp. all.
Non-Final Office Action mailed Oct. 13, 2023 in U.S. Appl. No. 15/977,729, 60 pages.
Non-Final Office Action Response filed Mar. 13, 2024 in U.S. Appl. No. 15/977,729.
Notice of Allowance mailed Apr. 3, 2024 in U.S. Appl. No. 17/815,205, 9 pages.
Notice of Allowance mailed Aug. 7, 2024 in U.S. Appl. No. 17/815,205, 11 pages.
Notice of Allowance mailed Mar. 31, 2025 in U.S. Appl. No. 18/442,067, 34 pages.
Notice of Allowance mailed Sep. 24, 2024 in U.S. Appl. No. 18/462,213, pp. all.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
Park, et. al., "Ambiguous Surface Defect Image Classification of AMOLED Displays in Smartphones", Jan. 26, 2016, IEEE Transactions on Industrial Informatics, vol. 12, Issue 2, pp. 597-607, DOI: 10.1109/TII.2016.2522191.
Reply Brief filed May 2, 2025 in U.S. Appl. No. 18/051,512, pp. all.
Response to Non-Final Office Action filed Mar. 10, 2025 in U.S. Appl. No. 18/442,067, pp. all.
Shi, "The LOB Recreation Model: Predicting the Limit Order Book from TAQ History Using an Ordinary Differential Equation Recurrent Neural Network" 548-556. The Thirty-Fifth AAAI Conference on Artificial Intelligence. 2021; <DOI: 10.48550/arXiv.2103.01670> abstract; p. 551, 2nd column, 1st paragraph; p. 552, 1st column, 1st paragraph; fig. 3.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
Tuzun, "Usability testing of a 3D touch screen kiosk system for way-finding," Computers in Human Behavior vol. 61, Aug. 2016, pp. 73-79.
Watson; "Review: SanDisk iXpand Wireless Charger" Sep. 15, 2019, 4 pages retrieved at https://www.whatmobile.net/Reviews/article/review-sandisk-ixpand-wireless-charger.
Wiley Encyclopedia of Computer Science and Technology, Nov. 2008, 2362 pages, Wiley-interscience, ISBN-10: 0471383937, ISBN-13: 978-0471383932.
Wu, "Overview of Wireless Power and Data Communication" WPC/QI Developers Forum, Oct. 29, 2016, 21 pages.

* cited by examiner

KIOSKS FOR EVALUATING AND PURCHASING USED ELECTRONIC DEVICES AND RELATED TECHNOLOGY

APPLICATIONS INCORPORATED BY REFERENCE

The following patents and patent applications are incorporated herein by reference in their entireties:

- U.S. Provisional Application No. 61/102,304, titled "SECONDARY MARKET AND VENDING SYSTEM FOR DEVICES," filed on Oct. 2, 2008;
- U.S. Provisional Application No. 61/183,510, titled "SECONDARY MARKET AND VENDING SYSTEM FOR DEVICES," filed on Jun. 2, 2009;
- U.S. patent application Ser. No. 12/573,089, titled "SECONDARY MARKET AND VENDING SYSTEM FOR DEVICES," now U.S. Pat. No. 8,195,511, filed on Oct. 2, 2009;
- U.S. patent application Ser. No. 13/487,299, titled "SECONDARY MARKET AND VENDING SYSTEM FOR DEVICES," now U.S. Pat. No. 8,463,646, filed on Jun. 4, 2012;
- PCT Patent Application No. PCT/US2009/059461, titled "SECONDARY MARKET AND VENDING SYSTEM FOR DEVICES," filed on Oct. 2, 2009;
- U.S. patent application Ser. No. 12/727,624, titled "SECONDARY MARKET AND VENDING SYSTEM FOR DEVICES," now U.S. Pat. No. 7,881,965, filed on Mar. 19, 2010;
- U.S. patent application Ser. No. 13/017,560 titled "SECONDARY MARKET AND VENDING SYSTEM FOR DEVICES," now U.S. Pat. No. 8,239,262, filed on Jan. 31, 2011;
- U.S. patent application Ser. No. 13/562,292, titled "SECONDARY MARKET AND VENDING SYSTEM FOR DEVICES," now U.S. Pat. No. 8,423,404, filed on Jul. 30, 2012;
- PCT Patent Application No. PCT/US2011/028251, titled "APPARATUS AND METHOD FOR RECYCLING MOBILE PHONES, filed on Mar. 13, 2011;
- U.S. Provisional Application No. 61/347,635, titled "SECONDARY MARKET AND VENDING SYSTEM FOR PRINTER CARTRIDGES," filed on May 24, 2010;
- U.S. patent application Ser. No. 13/113,497, titled "SECONDARY MARKET AND VENDING SYSTEM FOR PRINTER CARTRIDGES," filed on May 23, 2011;
- U.S. patent application Ser. No. 12/785,465, titled "APPARATUS AND METHOD FOR RECYCLING MOBILE PHONES," now U.S. Pat. No. 8,200,533, filed on May 23, 2010;
- U.S. patent application Ser. No. 13/492,835, titled "APPARATUS AND METHOD FOR RECYCLING MOBILE PHONES," filed on Jun. 9, 2012;
- U.S. Provisional Application No. 61/472,611, titled "METHOD AND APPARATUS FOR RECYCLING MOBILE PHONES," filed on Apr. 6, 2011;
- U.S. patent application Ser. No. 13/438,924, titled "KIOSK FOR RECYCLING ELECTRONIC DEVICES," filed on Apr. 4, 2012; PCT Patent Application No. PCT/US2012/032042, titled "METHOD AND KIOSK FOR RECYCLING ELECTRONIC DEVICES," filed Apr. 4, 2012;
- U.S. Provisional Application No. 61/593,358, titled "APPARATUS AND METHOD FOR RECYCLING ELECTRONIC DEVICES," filed on Feb. 1, 2012;

- U.S. Provisional Application No. 61/607,572, titled "APPARATUS AND METHOD FOR DETECTING FAKE MOBILE PHONES," filed on Mar. 6, 2012;
- U.S. Provisional Application No. 61/607,548, titled "APPARATUS AND METHOD FOR RECYCLING ELECTRONIC DEVICES," filed on Mar. 6, 2012;
- U.S. patent application Ser. No. 13/753,539, titled "METHOD AND APPARATUS FOR RECYCLING ELECTRONIC DEVICES," filed on Jan. 30, 2013;
- PCT Patent Application No. PCT/US2013/023717, titled "METHOD AND APPARATUS FOR RECYCLING ELECTRONIC DEVICES," filed on Jan. 30, 2013;
- U.S. Provisional Application No. 61/551,410, titled "METHOD AND APPARATUS FOR RECYCLING ELECTRONIC DEVICES," filed on Oct. 25, 2011;
- U.S. Provisional Application No. 61/606,997, titled "METHOD AND APPARATUS FOR RECYCLING ELECTRONIC DEVICES," filed on Mar. 6, 2012;
- U.S. patent application Ser. No. 13/658,825, titled "METHOD AND APPARATUS FOR RECYCLING ELECTRONIC DEVICES," filed on Oct. 24, 2012;
- PCT Patent Application No. PCT/US2012/061587, titled "METHOD AND APPARATUS FOR RECYCLING ELECTRONIC DEVICES," filed Oct. 24, 2012;
- U.S. Provisional Application No. 61/583,232, titled "APPARATUS AND METHOD FOR RECYCLING ELECTRONIC DEVICES," filed on Jan. 5, 2012;
- U.S. Provisional Application No. 61/607,001, titled "APPARATUS AND METHOD FOR RECYCLING ELECTRONIC DEVICES," filed on Mar. 6, 2012;
- U.S. patent application Ser. No. 13/733,984, titled "METHOD AND APPARATUS FOR RECYCLING ELECTRONIC DEVICES," filed on Jan. 4, 2013;
- U.S. Provisional Application No. 61/570,309, titled "PRE-ACQUISITION AUCTION FOR RECYCLED ELECTRONIC DEVICES," filed on Dec. 14, 2011;
- U.S. Provisional Application No. 61/595,154, titled "PRE-ACQUISITION AUCTION FOR RECYCLED ELECTRONIC DEVICES," filed on Feb. 6, 2012;
- U.S. patent application Ser. No. 13/705,252, titled "PRE-ACQUISITION AUCTION FOR RECYCLED ELECTRONIC DEVICES,", filed on Dec. 5, 2012;
- U.S. patent application Ser. No. 13/658,828, filed "METHOD AND APPARATUS FOR RECYCLING ELECTRONIC DEVICES," filed on Oct. 24, 2012;
- U.S. patent application Ser. No. 13/693,032, titled "METHOD AND APPARATUS REMOVING DATA FROM A RECYCLED ELECTRONIC DEVICE," filed on Dec. 3, 2012;
- U.S. patent application Ser. No. 13/792,030, titled "MINI-KIOSK FOR RECYCLING ELECTRONIC DEVICES," filed on Mar. 9, 2013;
- U.S. patent application Ser. No. 13/794,814, titled "METHOD AND SYSTEM FOR REMOVING AND TRANSFERRING DATA FROM A RECYCLED ELECTRONIC DEVICE," filed on Mar. 12, 2013;
- U.S. patent application Ser. No. 13/794,816, titled "METHOD AND SYSTEM FOR RECYCLING ELECTRONIC DEVICES IN COMPLIANCE WITH SECOND HAND DEALER LAWS," filed on Mar. 12, 2013; and
- U.S. patent application Ser. No. 15/091,487, titled "KIOSKS FOR EVALUATING AND PURCHASING USED ELECTRONIC DEVICES AND RELATED TECHNOLOGY," filed on Apr. 5, 2016.

TECHNICAL FIELD

The present invention generally relates to recycling of electronic devices.

BACKGROUND

There has been a large increase in the number of electronic devices used by the typical consumer. These devices include cell phones, PDA's, MP3 players, GPS devices, cameras, beepers, remote controls, cordless phones, calculators, etc. The rapid pace at which new technology and models of electronic devices are introduced creates a situation where many consumers upgrade or replace one or more recyclable device on a frequent basis. Often, the consumer does not dispose of the prior electronic device, but rather just stops using it and begins using the new device. This may happen over several generations of such devices.

In addition to the electronic devices mentioned above, there are many other types of devices that have relatively high frequency replacement rates, including portable mobile electronic devices, such as cell phones, MP3 players, etc., and non-portable electronic devices, such as computers, printers, and the like. In addition to electronic devices, there are content based digital media such as games on CD, DVD, or cartridge, or entertainment mass storage items such as CDs, DVDs, BluRay, etc. There is a need for handling of such items in an ecologically friendly manner, both via recycling or by proper disposal procedures. It has not been convenient for owners of electronic devices to either recycle such devices or to properly dispose of such devices. There is currently little incentive for a device owner to "do the right thing" with a used device. When the owner just stops using a device and simply puts it in storage: the opportunity for recycling or re-use by another party is lost. If the owner just throws the device away in normal trash containers, the proper recycling or safe disposing of the device is thwarted.

One particular problem associated with this phenomenon can be illustrated by an example of mobile phones. There are more than 3.6 billion mobile phone users in the world with an annual growth of 10% per annum. The replacement rate of mobile handsets is roughly every 18 months as new models have more features and new standards evolve. Wireless carriers also offer new phones below cost, or free, as incentives to get customers to sign lucrative two-year service contracts ensuring a constant build-up of old mobile phones. Old mobile phones and other mobile devices (pagers, PDAs) present a growing threat to the environment. As of 2007, there are more than 750 million mobile phones waiting to be recycled in the US, either in drawers or already in the waste stream. Another 150+ million or so are added every year. Once in the waste stream, these devices may leak Lead, Mercury, Cadmium, Arsenic and other toxic substances into the water supply. Municipalities often incinerate their waste, instantly putting these toxic elements into the air, and they return to earth in rain water. A problem that needs to be solved is to make it easy and accessible for the public to recycle or resell their mobile phones and other recyclable devices. Two reasons why mobile phones are not being recycled or resold are difficult access to recycling or reselling facilities, and secondly security concerns about the information stored on the mobile phone. In addition to mobile phones, the same problems apply to many other electronic devices.

Technology has not yet provided a resolution to this problem. One invention is Bishop, U.S. Pat. No. 4,951,308 for Automated Vending Of Cellular Hand-Held Telephones And Cellular Telephone Services, which discloses a vending machine that dispenses cellular telephones purchased by consumers through the vending machine. Bishop essentially adds to the problem by making it easier to acquire mobile phones.

Taylor et al., U.S. Patent Publication Number 2009/0190142, for a Method And System For Connecting A Data Storage Device To A Kiosk, discloses a kiosk with a docking port and an optical recognition device for identifying a data port on a data storage device. Taylor is directed at printing digital images at a photo kiosk.

The prior art has failed to recognize the problems associated with recycling electronic devices in a manner that is enticing to a consumer yet financially rewarding to the recycler. Further, the prior art has failed to determine a means for establishing a market price for an electronic device.

SUMMARY

The invention allows for a process for a pre-acquisition auction to establish a purchase price for a recycled electronic device.

One aspect of the present invention a method for analysis of a mobile communication device and financial remuneration to a user for submission of the mobile communication device. The method comprises identifying a mobile communication device, soliciting bids for a used model of the mobile communication device and receiving bids for the used model of the mobile communication device from a plurality of bidders. The method further comprises setting a purchase price to pay for the used model of the mobile communication device based on the plurality of bids received from the plurality of bidders and identifying a used model of the mobile communication device at a recycling kiosk for the mobile communication device. The method further comprises verifying the integrity of the used model of the mobile communication device at the recycling kiosk and offering the purchase price for the used model of the mobile communication device at the kiosk. Additionally, the method comprises purchasing the used model of the mobile communication device. Preferably, the method further comprises automatically binning the mobile communication device after purchasing the used model of the mobile communication device. The method may further comprise instructing the user to erase the data of the used model of the mobile communication device prior to positioning the mobile communication device in the recycling kiosk.

The kiosk of the method comprises a housing, the housing comprising a user interface on an exterior surface of the housing for the user to input information, an upper dome and a lower dome, wherein the upper dome and the lower dome comprise a plurality of mirrors. The kiosk further comprises an upper chamber camera, a lower chamber camera and a transparent surface. The kiosk further comprises a processor within the housing and in communication with the at least one camera, the processor configured to identify the brand and model number of the mobile communication device based on at least one of the information from the user and the images from the at least one camera, the processor configured to determine a purchase price for the used model of the mobile communication device.

Another aspect of the present invention is a method for analysis of an electronic device and financial remuneration to a user for submission of the electronic device. The method comprises positioning an electronic device in an inspection area of a kiosk, the inspection area having a camera. The method further comprises imaging a screen shot of a about page of the electronic device, and inspecting the screen shot of the about page of the electronic device obtained by at least one camera disposed in the inspection area to determine if the electronic device has any defects. The method further comprises determining a value for electronic device. Lastly the method comprises determining a value for the electronic device.

Yet another aspect of the present invention is a method for analysis of an electronic device and financial remuneration to a user for submission of the electronic device. The method includes positioning an electronic device on a transparent plate for automatic transport to an inspection area of a recycling kiosk, the inspection area having at least one imaging component. The method also includes inspecting the electronic device within the inspection area at a remote location by an operator, the operator inspecting the electric device for visual analysis for identification and condition of the electronic device. The method also includes transferring data from the electronic device. The method also includes determining a value for the analyzed electronic device.

An additional aspect of the present invention is a kiosk for recycling electronic devices such as mobile phones, tablet computes. e-readers, MP3 players, and the like. The kiosk preferably has a housing with a touch screen display for user interaction. The kiosk also has an inspection area defined by an upper chamber, a lower chamber and a transparent plate for transporting an electronic device into the inspection area. The upper and lower chambers preferably have mirrors on interior surfaces along with imaging components such as cameras in order to obtain multi-angled views, or even a 3-D profile, of an electronic device within the inspection area. The kiosk also preferably has a carousel with multiple different electrical connectors in order to electrically connect to an electronic device. The kiosk also preferably has a mechanism for automatically binning the electronic device. The kiosk also has a processor configured to perform visual analysis for identification of the electrical device and to determine a condition of the electronic device, especially a LCD display of the electronic device. The processor is configured to perform an electrical analysis of the electronic device. Further, the processor is configured to erase or transfer data from electronic device.

Yet another aspect of the present invention a method for analysis of a mobile communication device and financial remuneration to a user for submission of the mobile communication device. The method comprises identifying a mobile communication device, soliciting bids for a used model of the mobile communication device and receiving bids for the used model of the mobile communication device from a plurality of bidders. The method further comprises setting a purchase price to pay for the used model of the mobile communication device based on the plurality of bids received from the plurality of bidders and identifying a used model of the mobile communication device at a recycling kiosk for the mobile communication device. The method further comprises verifying the integrity of the used model of the mobile communication device at the recycling kiosk and offering the purchase price for the used model of the mobile communication device at the kiosk. Additionally, the method comprises purchasing the used model of the mobile communication device. Preferably, the method further comprises automatically binning the mobile communication device after purchasing the used model of the mobile communication device. The method may further comprise instructing the user to erase the data of the used model of the mobile communication device prior to positioning the mobile communication device in the recycling kiosk.

The kiosk of the method comprises a housing, the housing comprising a user interface on an exterior surface of the housing for the user to input information, an upper dome and a lower dome, wherein the upper dome and the lower dome comprise a plurality of mirrors. The kiosk further comprises an upper chamber camera, a lower chamber camera and a transparent surface. The kiosk further comprises a processor within the housing and in communication with the at least one camera, the processor configured to identify the brand and model number of the mobile communication device based on at least one of the information from the user and the images from the at least one camera, the processor configured to determine a purchase price for the used model of the mobile communication device.

Yet another aspect of the present invention is a method for analysis of a mobile electronic device and financial remuneration to a user for submission of the mobile electronic device. The method includes identifying a mobile communication device and a predetermined condition of the mobile communication device. The method also includes soliciting bids for a used model of the mobile communication device in the predetermined condition. The method also includes receiving bids for the used model of the mobile communication device from a plurality of bidders. The method also includes setting a purchase price to pay for the used model of the mobile communication device based on the plurality of bids received from the plurality of bidders. The method also includes identifying a used model of the mobile communication device at a recycling kiosk for the mobile electronic device. The method also includes verifying the integrity of the used model of the mobile communication device at the recycling kiosk. The method also includes offering the purchase price for the used model of the mobile communication device at the kiosk. The method also includes purchasing the used model of the mobile communication device. The method also includes erasing or transferring data from the mobile communication device at the kiosk. The method also includes delivering the mobile communication device to a winning bidder.

Yet another aspect of the present invention is a method for analysis of a mobile electronic device and financial remuneration to a user for submission of the mobile electronic device. The method includes establishing a plurality of pre-acquisition purchase prices, each of the plurality of pre-acquisition purchase prices established for a recycled electronic device in a predetermined condition. Each of the pre-acquisition purchase prices established by a winning bid from a bidder of a plurality of bidders for a recycled electronic device. The method also includes positioning an electronic device in an inspection area of a kiosk, the inspection area having at least one camera. The method also includes imaging the electronic device. The method also includes analyzing the electronic device for identification of the electronic device and a condition of the electronic device. The method also includes erasing or transferring data from the mobile communication device at the kiosk. The method also includes selecting a matching pre-acquisition purchase price from the plurality of pre-acquisition purchase prices for the electronic device. The method also includes offering a consumer the pre-acquisition purchase price for the electronic device.

Another aspect of the present invention is a method for analysis of an electronic device and financial remuneration to a user for submission of the electronic device. The method comprises positioning an electronic device in an inspection area of a kiosk, the inspection area having a camera. The method further comprises imaging a screen shot of a about page of the electronic device, and inspecting the screen shot of the about page of the electronic device obtained by at least one camera disposed in the inspection area to determine if the electronic device has any defects. The method also includes erasing or transferring data from the mobile communication device at the kiosk. Lastly the method comprises determining a value for the electronic device.

The kiosk of the method comprises a housing, a user interface on an exterior surface of the housing for the user to input information, an upper dome and a lower dome, wherein the upper dome and the lower dome comprise a plurality of mirrors. The kiosk further comprises an upper chamber camera, a lower chamber camera and a transparent surface. The kiosk also comprises a processor within the housing and in communication with the at least one camera, the processor configured to identify the brand and model number of the electronic device based on at least one of the information from the user and the images from the at least one camera, the processor configured to determine a financial remuneration value for the electronic device. Preferably, the method further comprises comparing information derived from the barcode sticker to information derived from the about page.

In another aspect of the present invention, the invention comprises a method for analysis of an electronic device and financial remuneration to a user for submission of the electronic device. The method comprises positioning an electronic device in an inspection area of a recycling kiosk 100, wherein the inspection area has a plurality of mirrors. The method further comprises placing the electronic device in an illuminated mode wherein a LCD screen of the electronic device is illuminated to visually enhance the appearance of any defects in the LCD screen and inspecting an image of the LCD screen of the electronic device obtained by at least one camera disposed in the inspection area to determine if the LCD screen of the electronic device has any defects. The method further comprises defining an analyzed electronic device. The method also includes erasing or transferring data from the mobile communication device at the kiosk. Lastly, the method comprises determining a value for the analyzed electronic device.

In one embodiment of the present invention, the method further comprises performing an electrical analysis of the electronic device. In an alternative embodiment of the present invention, the method further comprises powering up the electronic the device. In yet another embodiment of the present invention the method further comprises measuring the luminescence from the LCD screen of the electronic device.

In one embodiment of the present invention, the method further comprises automatically binning the electronic device after a visual inspection and electrical inspection. Further, the method comprises completing the visual inspection and electrical inspection within an illumination period. The illumination period comprises the time from when the LCD of the phone is initially illuminated to the time the display screen transitions into an energy conserving mode, evidenced by the screen blacking out.

In yet another embodiment, the method comprises positioning an electronic device in an inspection area of a recycling kiosk 100, powering up the electronic device and inputting a term on the electronic device. The inputted term comprises a plurality of characters and the term is displayed on the LCD screen of the electronic device. The method further comprises inspecting an image of the LCD screen of the electronic device obtained by at least one camera disposed in the inspection area utilizing an optical character recognition program of the recycling kiosk to determine if the LCD screen of the electronic device has any defects. The term is preferably a telephone number, a word or number.

Having briefly described the present invention, the above and further objects, features and advantages thereof will be recognized by those skilled in the pertinent art from the following detailed description of the invention when taken in conjunction with the accompanying drawings.

DETAILED DESCRIPTION

The invention allows for a process for a pre-acquisition auction to establish a purchase price for a recycled electronic device. The pre-purchase auction is used in conjunction with a kiosk that uses automatic visual analysis of an electronic device to determine if the electronic device is damaged in order to ascertain a value for recycling the electronic device. The established purchase price is based on the condition of the electronic device, preferably a consumer electronic device such as a mobile phone, and the demand for such an electronic device. Thus, when a consumer goes to recycle an electronic device, the process has already established a price to be paid for the recycled electronic device.

The pre-acquisition auction identifies a recycled electronic device and a condition of the recycled electronic device. Bidders, preferably pre-qualified and online, bid on the recycled electronic device knowing that deliver of the recycled electronic device will be in the future since the recycled electronic device has not yet been acquired by the seller (the party conducting the auction) from a consumer. Once a purchase price is established, that purchase is used for purchasing the recycled electronic device from a consumer. The purchase price preferably includes a fee for the seller or costs of acquisition. Alternatively, the auction price is used as a base and a margin is added to generate a purchase price for the electronic device.

The process for a pre-acquisition auction to establish a purchase price for a recycled electronic device is preferably utilized with a system and method for analyzing an electronic device performed at a recycling kiosk.

Figure 1:
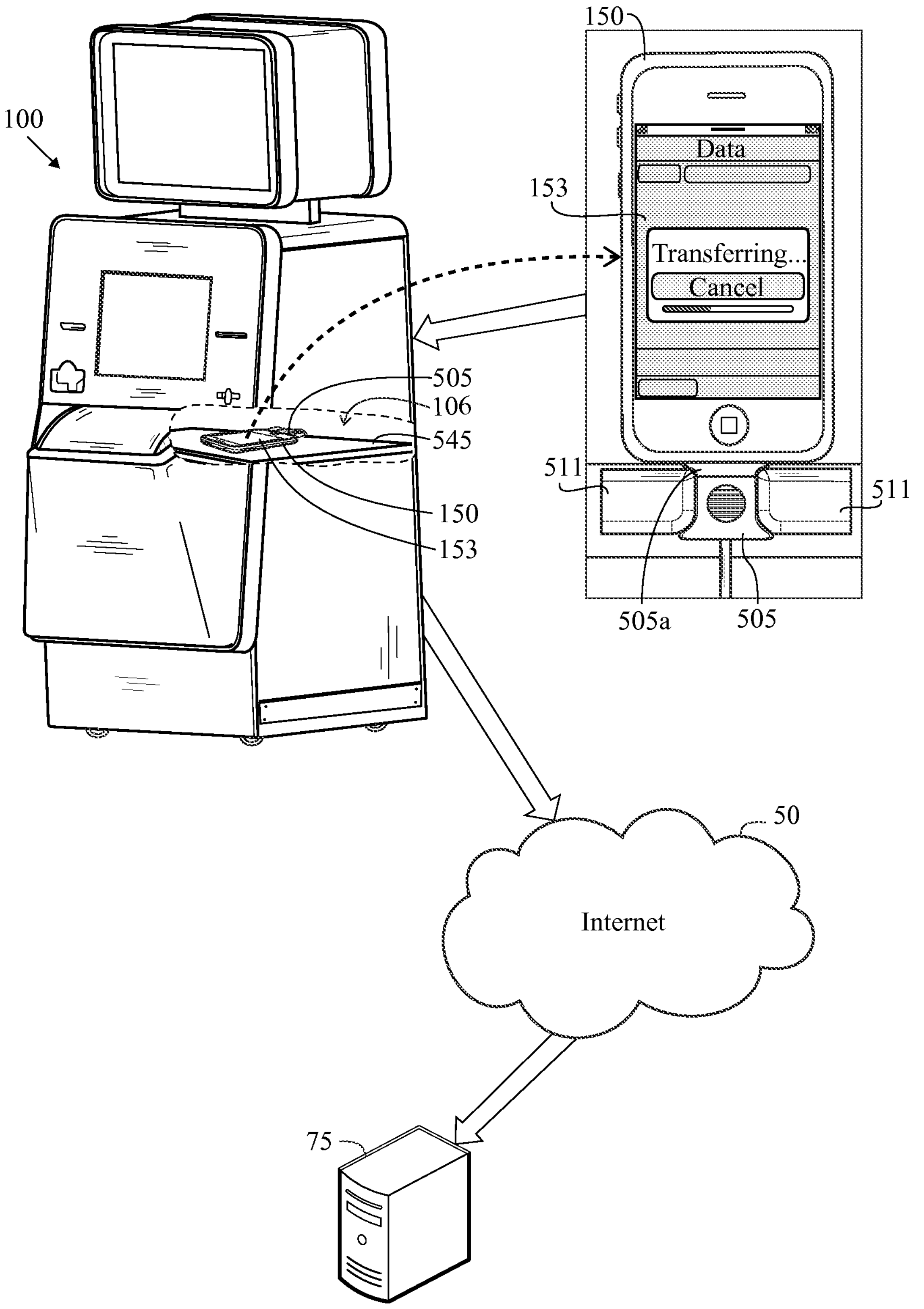
FIG. 1 is a block diagram of a system for data transfer from a recycled electronic device.
Figure 2:
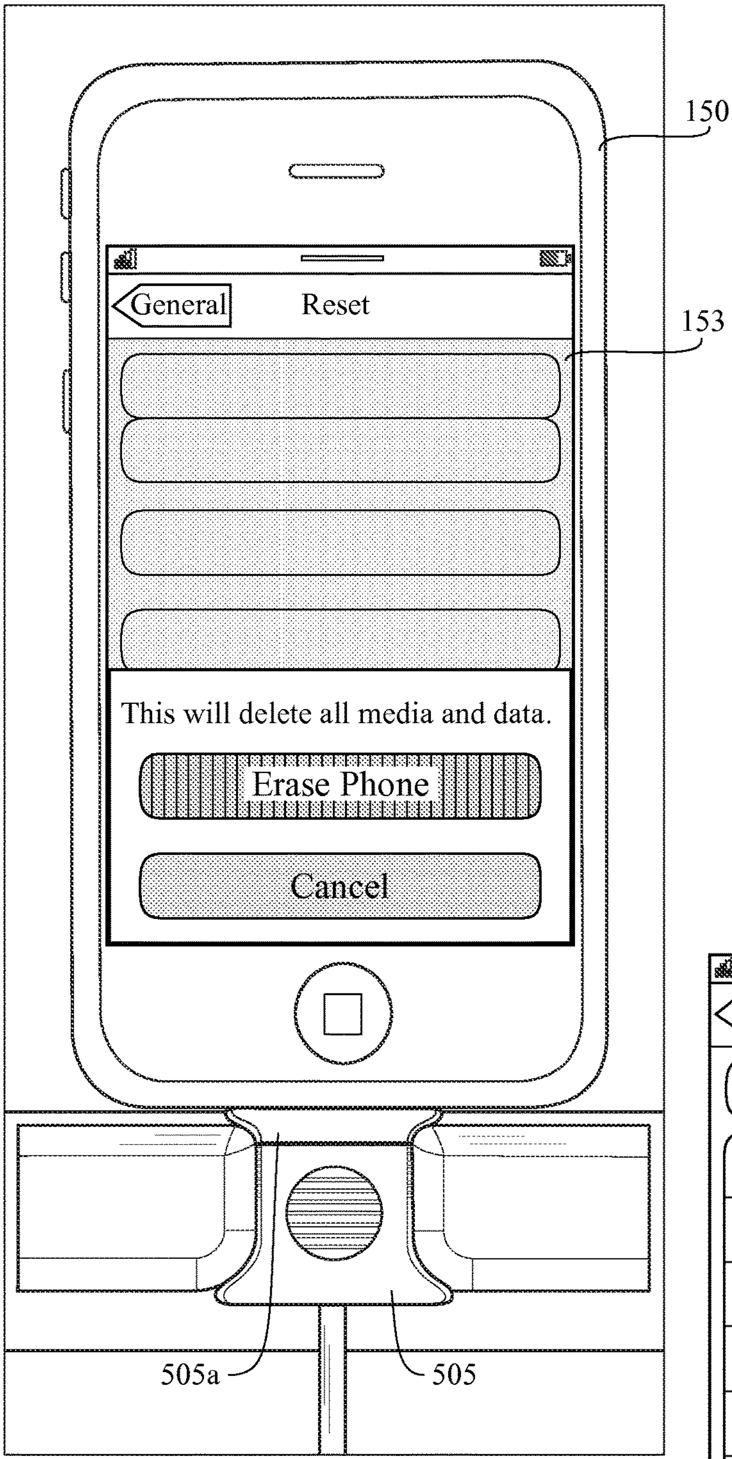
FIG. 2 is an isolated view of a mobile phone connected to an electrical connector for an erasure of data from the mobile phone.
Figure 3:
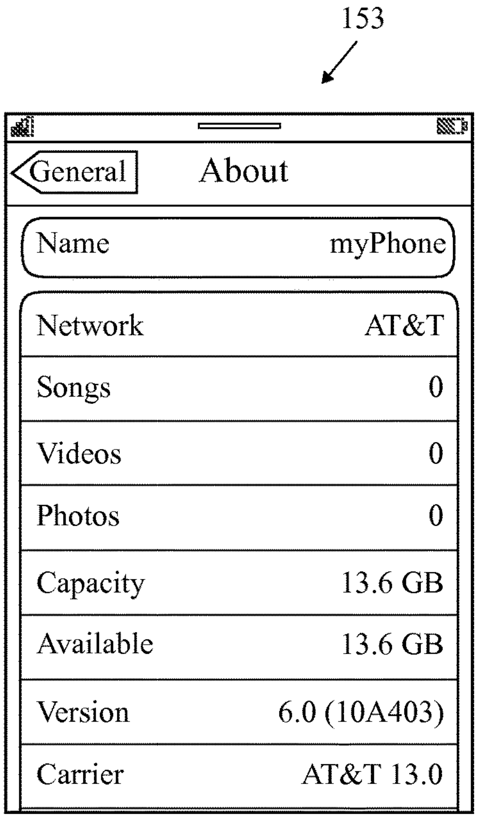
FIG. 3 is an isolated view of data stored on the mobile phone of FIG. 2.
Figure 4:
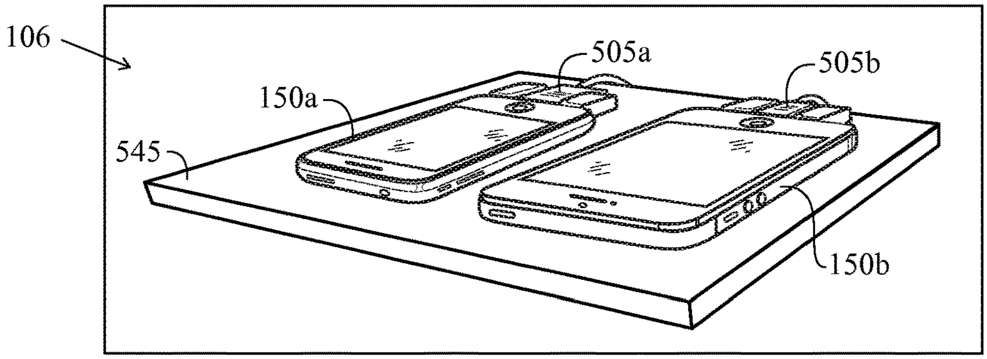
FIG. 4 is an isolated view of a transfer of data from a recycled electronic device to a new electronic device within an inspection area of a recycling kiosk.
Figure 5:
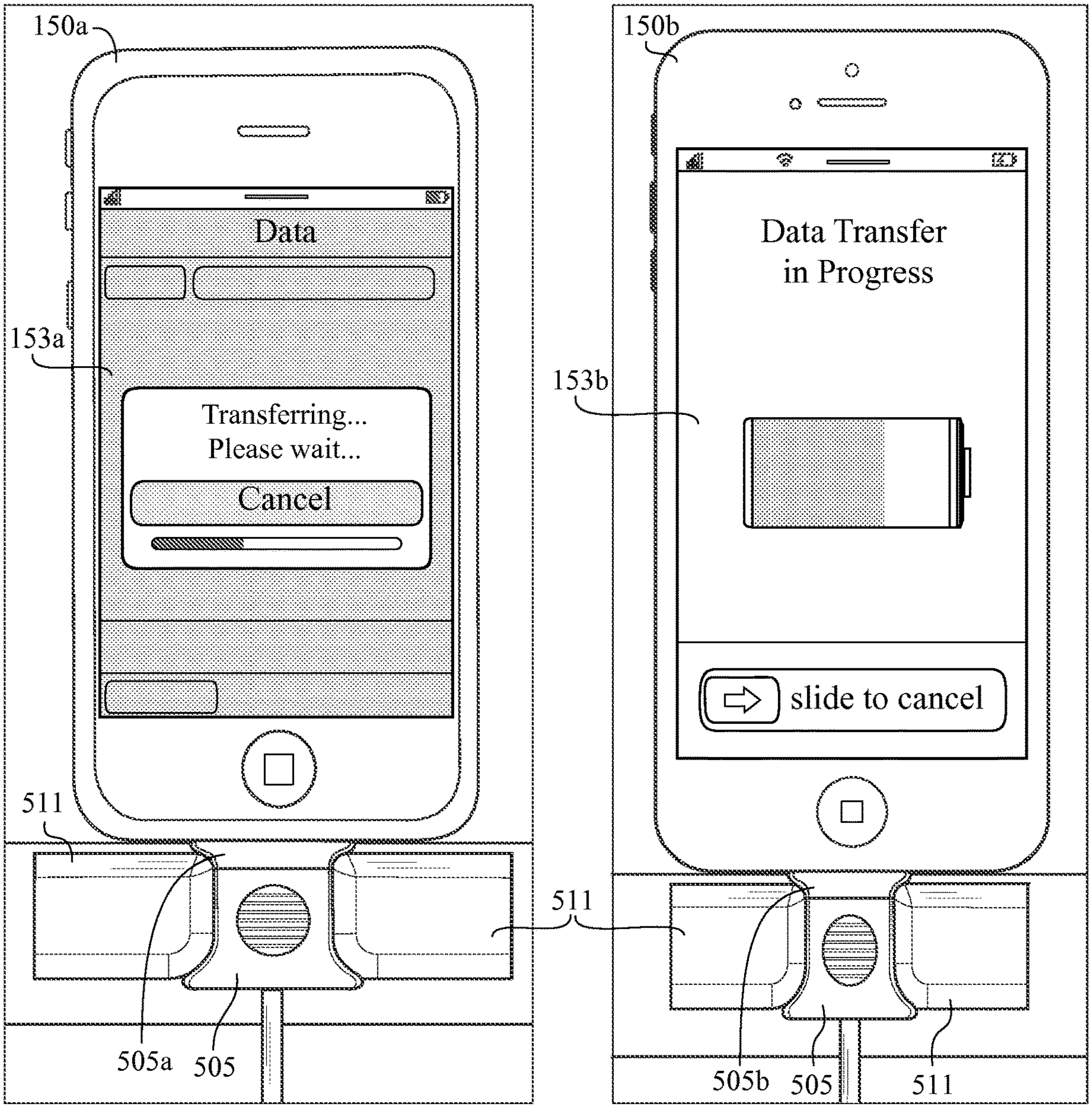
FIG. 5 is a view of a transfer of data from a recycled electronic device to a new electronic device within an inspection area of a recycling kiosk.

FIG. 1 is a block diagram of a system for data transfer from a recycled electronic device. A kiosk for recycling electronic devices and providing financial remuneration is generally designated 100. The electronic device 150 may be a Smart Phone, mobile phone, tablet computer, IPOD® device, MP3 Player, GPS device, e-reader, etc. Within an inspection area, the electronic device 150 is placed on a transparent plate 545 and connected to an electrical connector 505. Data from the electronic device 150 is either erased or transferred from the electronic device 150. If erased, as shown in FIG. 2, a processor of the kiosk 100 is configured to instruct the electronic device 150 to erase all personal data, such as shown in FIG. 3. Other data, such as operating software for the electronic device, is not erased. If the data is to be transferred, one embodiment includes a processor of the kiosk 100 configured to transfer the data from the electronic device 150, through the kiosk 100 over a network 50 to a server 75 for storage in a database for eventual retrieval by an end-user of the electronic device. In another embodiment, as shown in FIGS. 4 and 5, data is transferred from a recycled electronic device 150*a* to a new electronic device 150*b*. Both devices 150*a* and 150*b* are preferably placed on a transparent plate 545 within the inspection area 106 and connected to electrical connectors 505*a* and 505*b* respectively. The transfer is shown on the display screens 153*a* and 153*b* of the electronic devices 150*a* and 150*b*.

Figure 6:
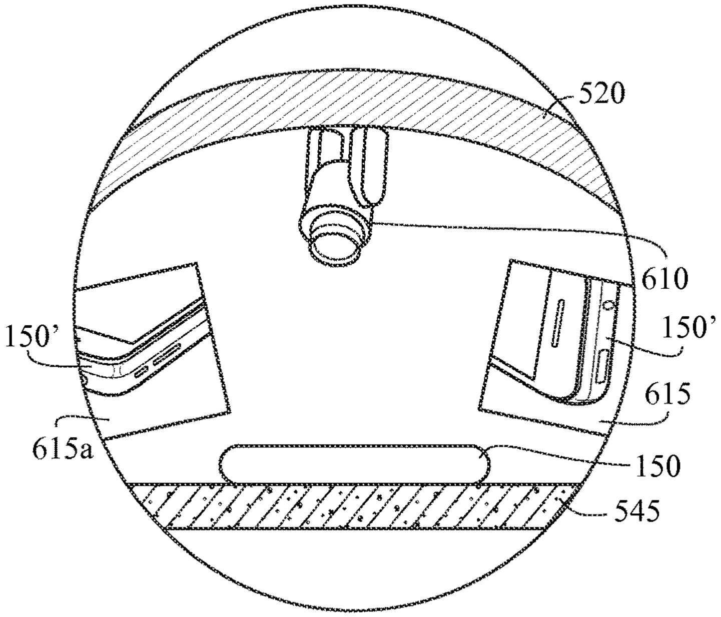
FIG. 6 is an isolated view of an imaging component within an inspection area of a recycling kiosk allowing for viewing of a mobile phone for analysis by a remote operator.
Figure 7:
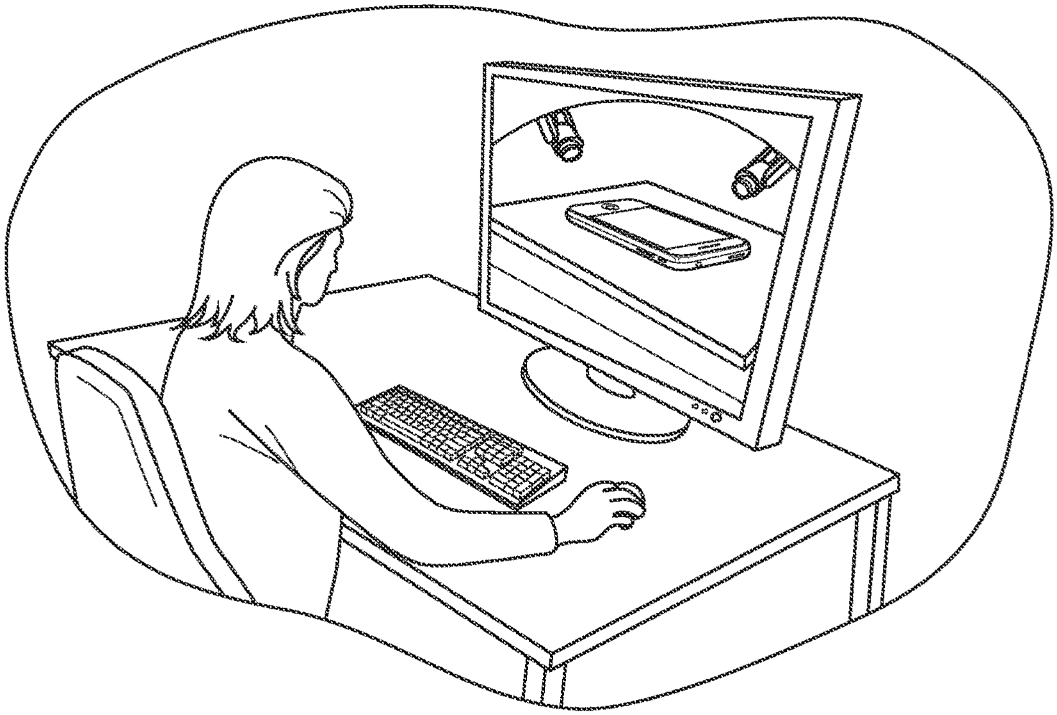
FIG. 7 is a perspective view of an operator viewing a display screen showing the image of a mobile phone within an inspection area of a recycling kiosk.
Figure 8:
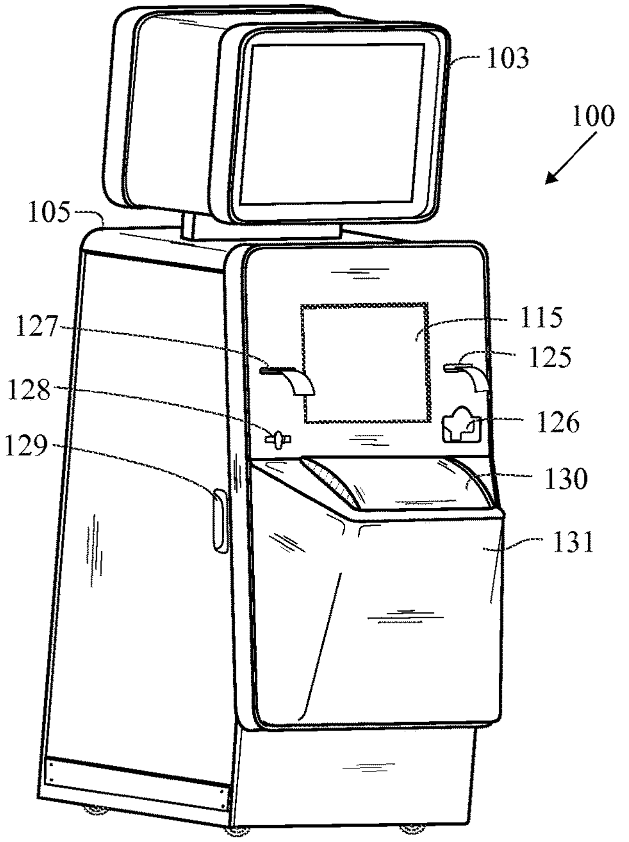
FIG. 8 is a perspective view of a recycling kiosk.
Figure 8A:
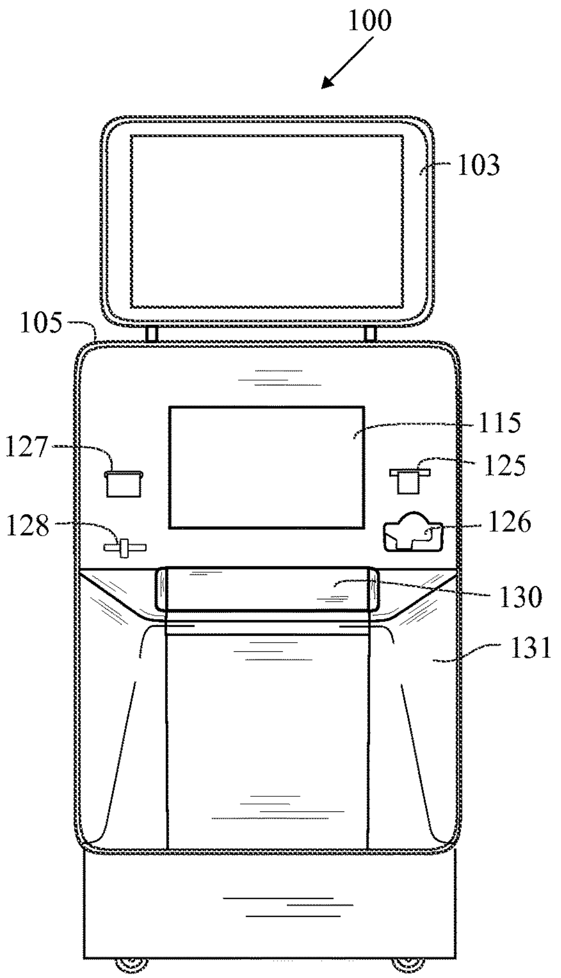
FIG. 8A is a front view of the recycling kiosk of FIG. 8.
Figure 8B:
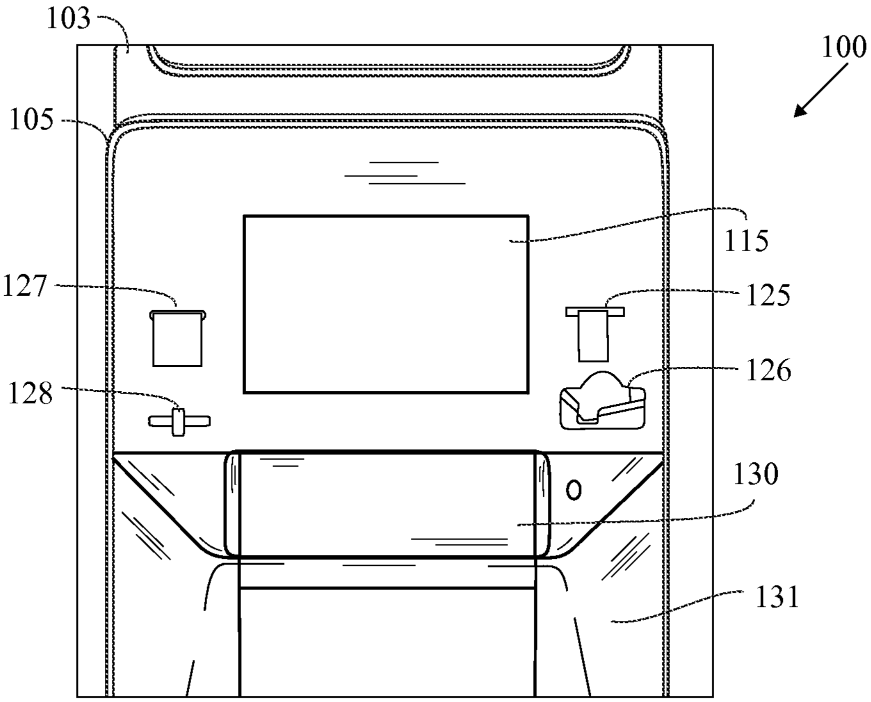
FIG. 8B is an isolated view of a front of the recycling kiosk of FIG. 8.
Figure 8C:
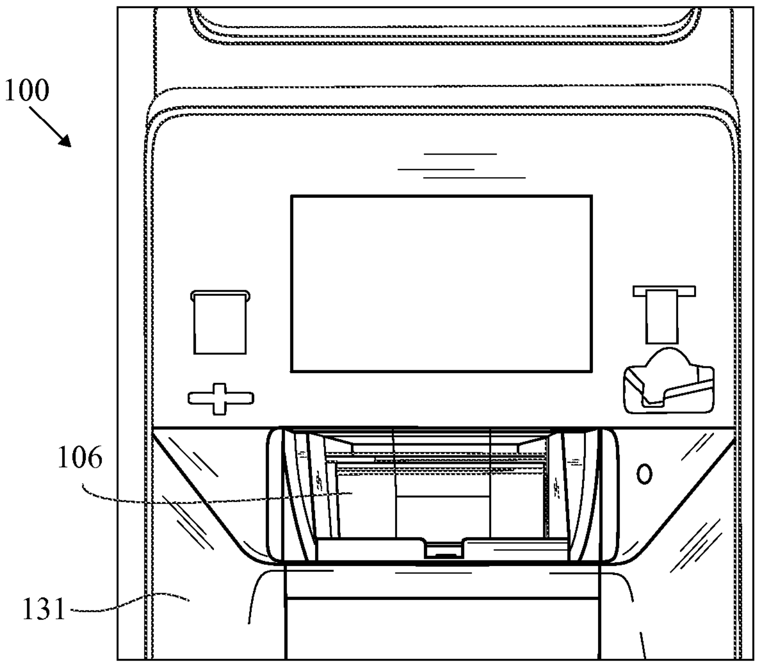
FIG. 8C is an isolated view of a front of the recycling kiosk of FIG. 8.

In yet another embodiment of the invention, as shown in FIGS. 6 and 7, an operator in a remote location visually inspects an electronic device 150 within an inspection area 106 of a kiosk 100 using at least one camera 610. The operator also receives data from an electrical analysis of the electronic device 150 as explained below. In this manner, the remote operator provides human interaction for an end-user attempting to recycle the electronic device 150.

As shown in FIGS. 8, 8A, 8B and 8C, the kiosk 100 has a housing 105 in a pseudo-rectangular cube shape. A header 103 allows for marketing and videos. An access door 130 in a front body area 131 provides access to an inspection area 106 for electronic devices. The front of the housing 105 has a display screen 115 for providing information to a user, and acts as a user interface in a touch screen embodiment. The exterior of the housing 105 also preferably has a label printer 125, a voucher dispenser 126, a receipt printer 127, and a cash or card dispenser 128. The exterior housing may also have a thumbprint reader.

The kiosk 100 allows for automatic visual analysis of an electronic device to identify the electronic device and to determine electronic device is damaged in order to ascertain a value for recycling the electronic device. Further, the kiosk 100 also allows for electrical analysis of the electronic device.

Figure 9:
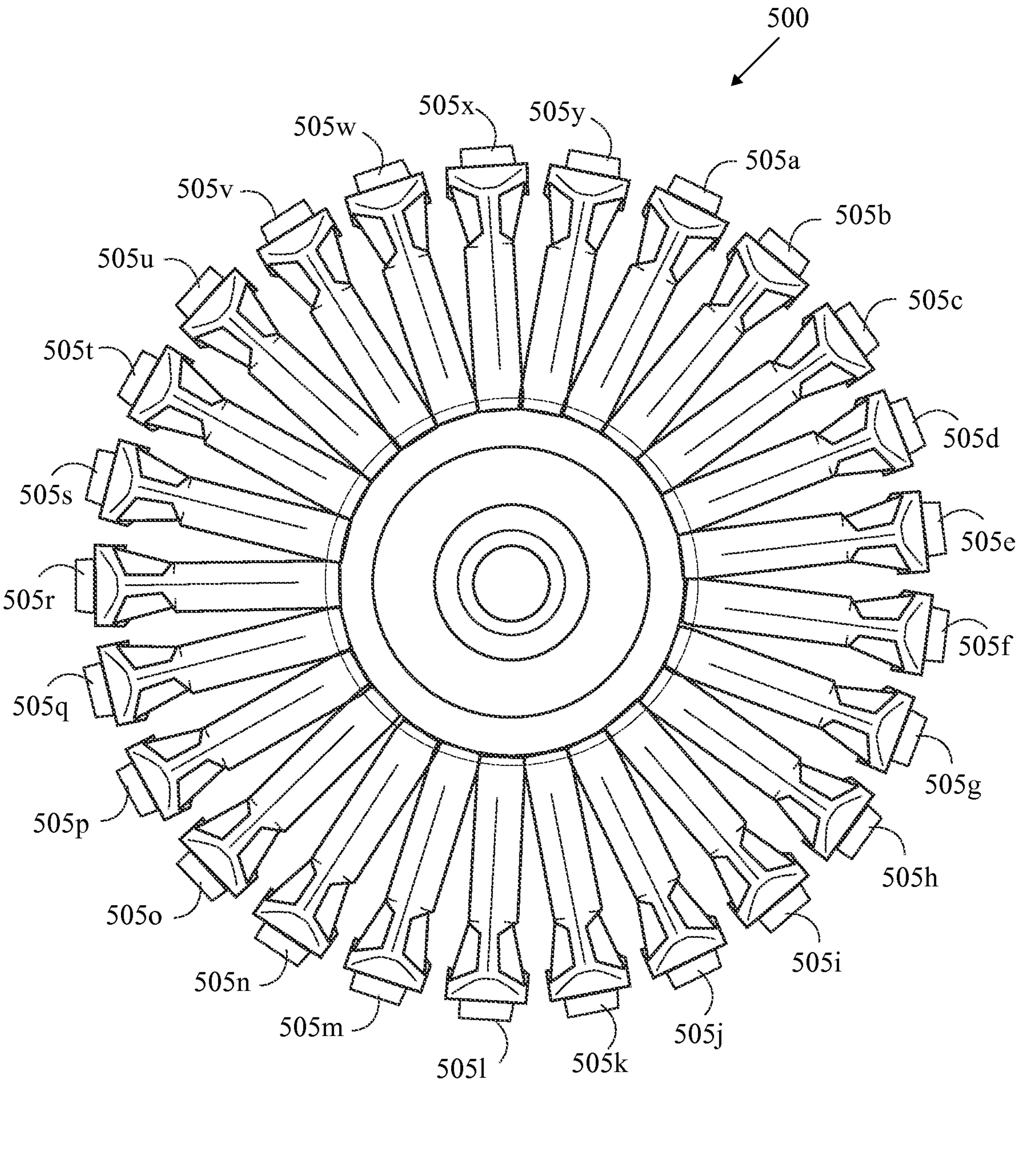
FIG. 9 is an isolated view of an electrical connector wheel.
Figure 9A:
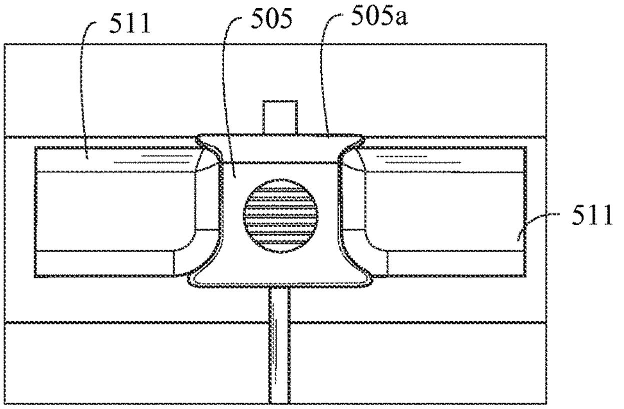
FIG. 9A is an isolated view of an electrical connector is a staging area.
Figure 9B:
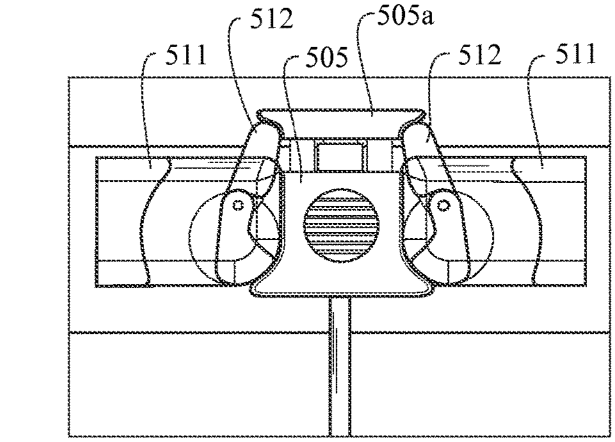
FIG. 9B is an isolated view of an electrical connector in a detached position.
Figure 9C:
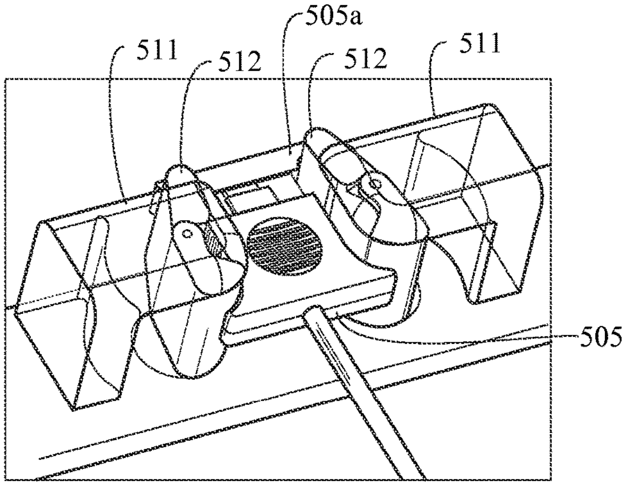
FIG. 9C is an isolated view of an electrical connector being detached.
Figure 9D:
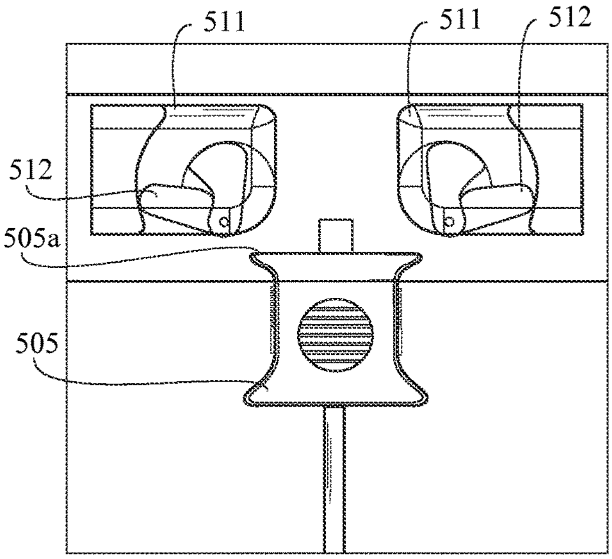
FIG. 9D is an isolated view of an electrical connector being retracted.
Figure 18:
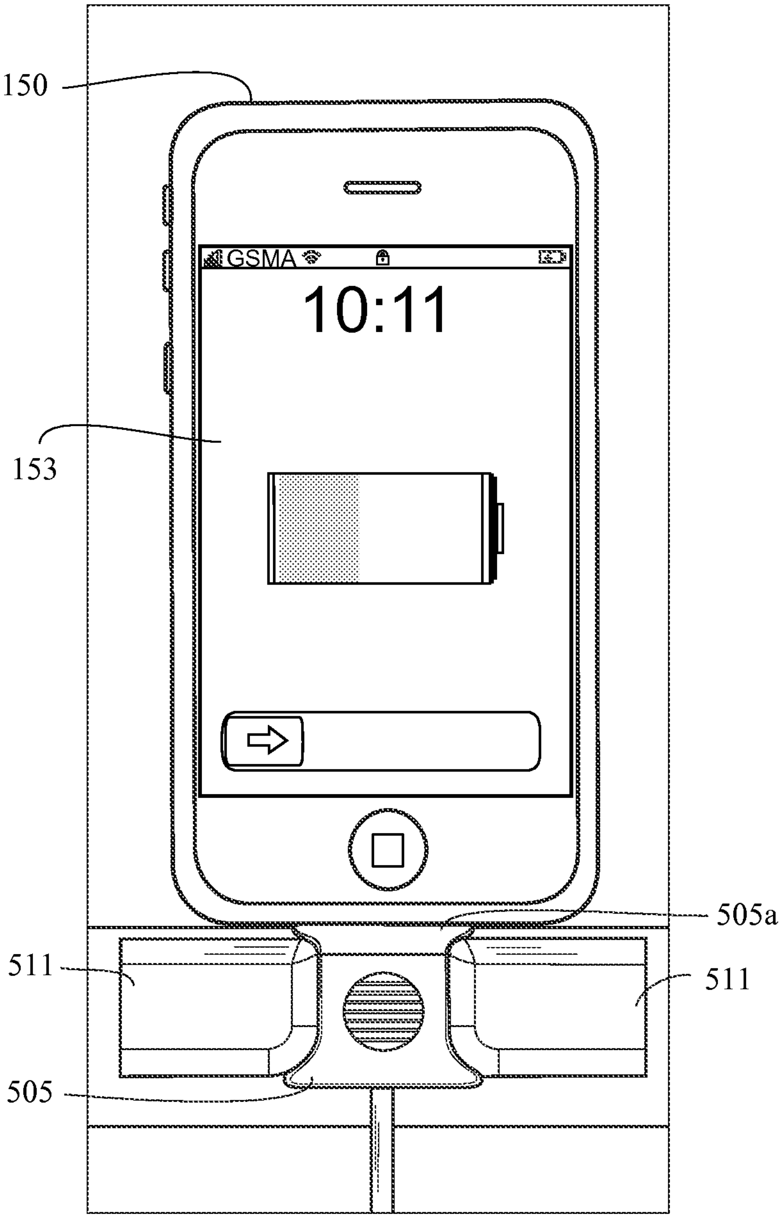
FIG. 18 is a front view of a phone connected to an electrical connector.

As shown in FIGS. 9, 9A, 9B, 9C and 9D, the kiosk 100 comprises a carousel 500 containing a plurality of electrical connectors 505*a*-505*y*. Each of the electrical connectors 505 has a unique connection plug for removable connection to an electronic device. Each of the electrical connectors 505*a*-505*y* has a cartridge removeably secured in the carousel 500. Thus, new electrical connectors 505 can be substituted for older electrical connectors 505. Further, the kiosk 100 is designed to allow for automatic removal of the electrical connector 505 using detachment mechanism 511. In FIG. 9A, the electrical connector 505 is in a staging area, where it would be connected to a port of an electrical device (as shown FIG. 18). Next, as shown in FIGS. 9B and 9C, hinged arms 512 of the detachment mechanism 511 engage a moveable member of the electrical connector 505 to force the outward movement of the moveable member and the disconnection of the electrical connector 505 from a port of an electronic device (as shown in FIG. 18). As shown in FIG. 9D, the electrical connector 505 is retracted by a cable from the detachment mechanism 511.

Figure 10:
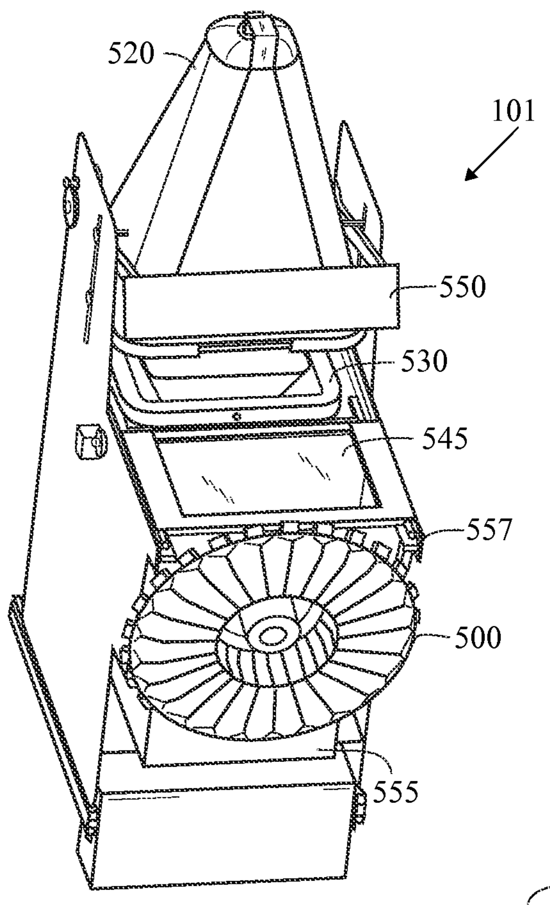
FIG. 10 is a perspective view of internal components of a kiosk.
Figure 10A:
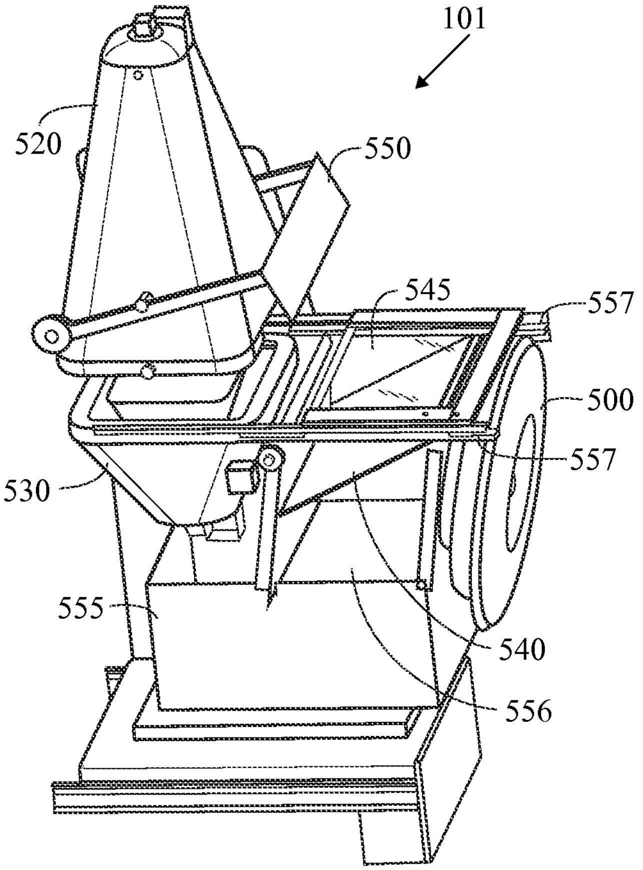
FIG. 10A is a perspective view of internal components of a kiosk.
Figure 10B:
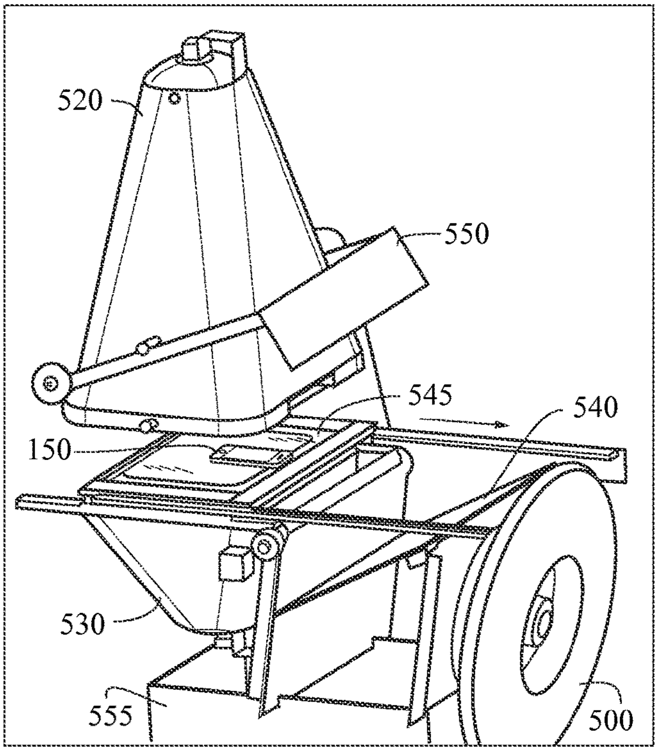
FIG. 10B is a perspective view of internal components of a kiosk.
Figure 10C:
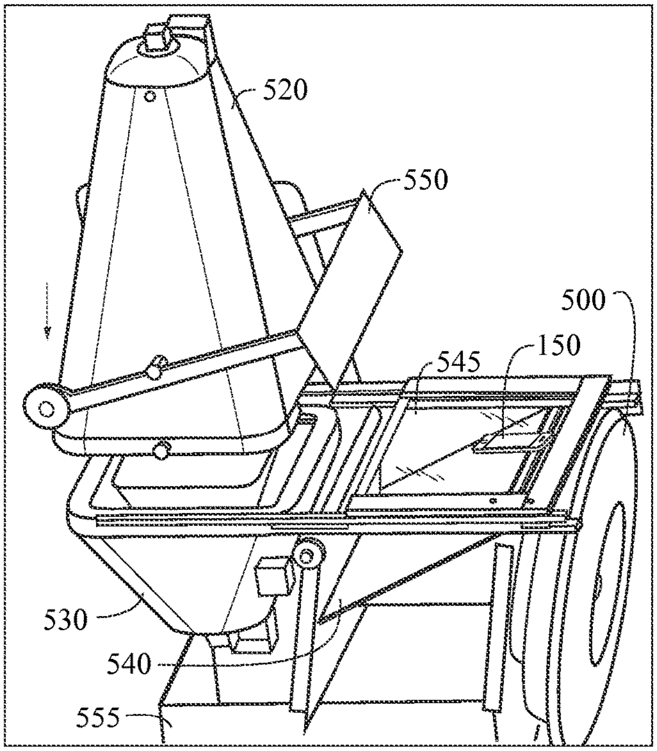
FIG. 10C is a perspective view of internal components of a kiosk.

As shown in FIGS. 10, 10A, 10B and 10C, the internal mechanism 101 of the kiosk 100 includes an upper chamber 520, a lower chamber 530, a binning plate 540, a transparent plate 545, a door 550, a bin 555 and the carousel 500. Preferably, the carousel 500 is able to hold approximately 25 electrical connectors 505, wherein the electrical connectors 505 are interchangeable to easily adapt to the variations in USB and other like connections. As shown in FIG. 10B, a mobile phone 150 is placed on the transparent plate 545 and transferred to an inspection area 106 within upper chamber 520 and lower chamber 530. Both the upper chamber and the lower chamber preferably have a bell-like shape. As shown in FIG. 10C, the mobile phone is moved between the upper chamber 520 and the lower chamber 530 for visual analysis. The transparent plate, preferably composed of glass of a transparent plastic material, allows for imaging components within the upper chamber 520 and lower chamber 530 to obtain multiple view images of the mobile phone 150. Preferably, a 3-D profile of the mobile phone is generated in order to provide visual analysis for identification and condition of the mobile phone. Once the visual analysis is complete, the transparent plate 545 moves out from between the upper chamber 520 and lower chamber 530.

Figure 11:
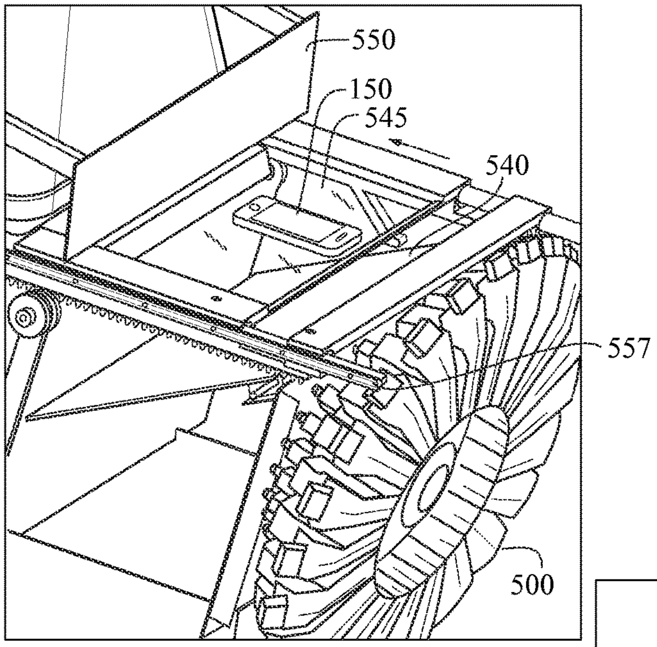
FIG. 11 is an isolated view of a phone an inspection plate of a kiosk.
Figure 11A:
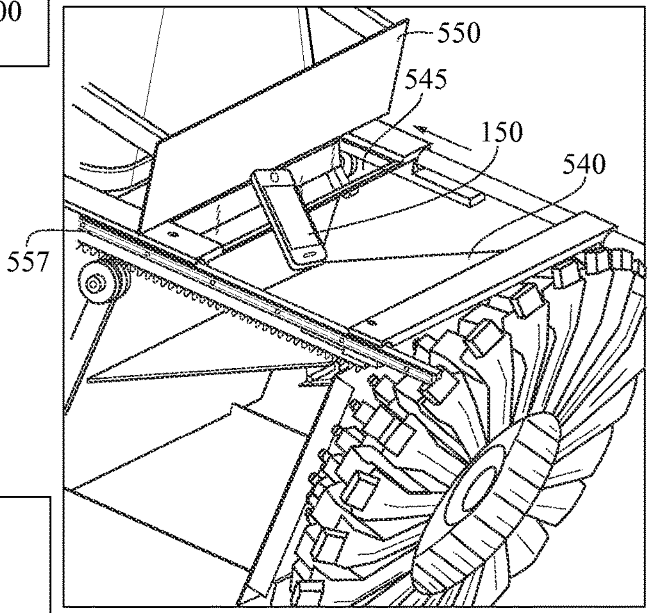
FIG. 11A is an isolated view of a phone being transferred in the kiosk.
Figure 11B:
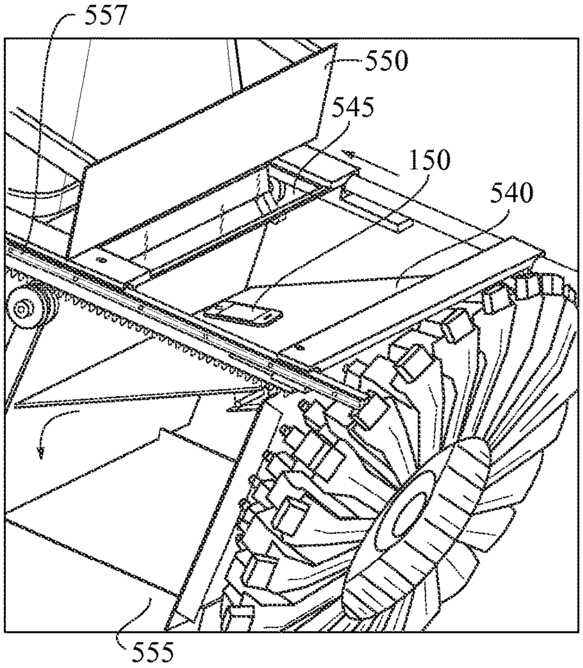
FIG. 11B is an isolated view of a phone being transferred in the kiosk.
Figure 11C:
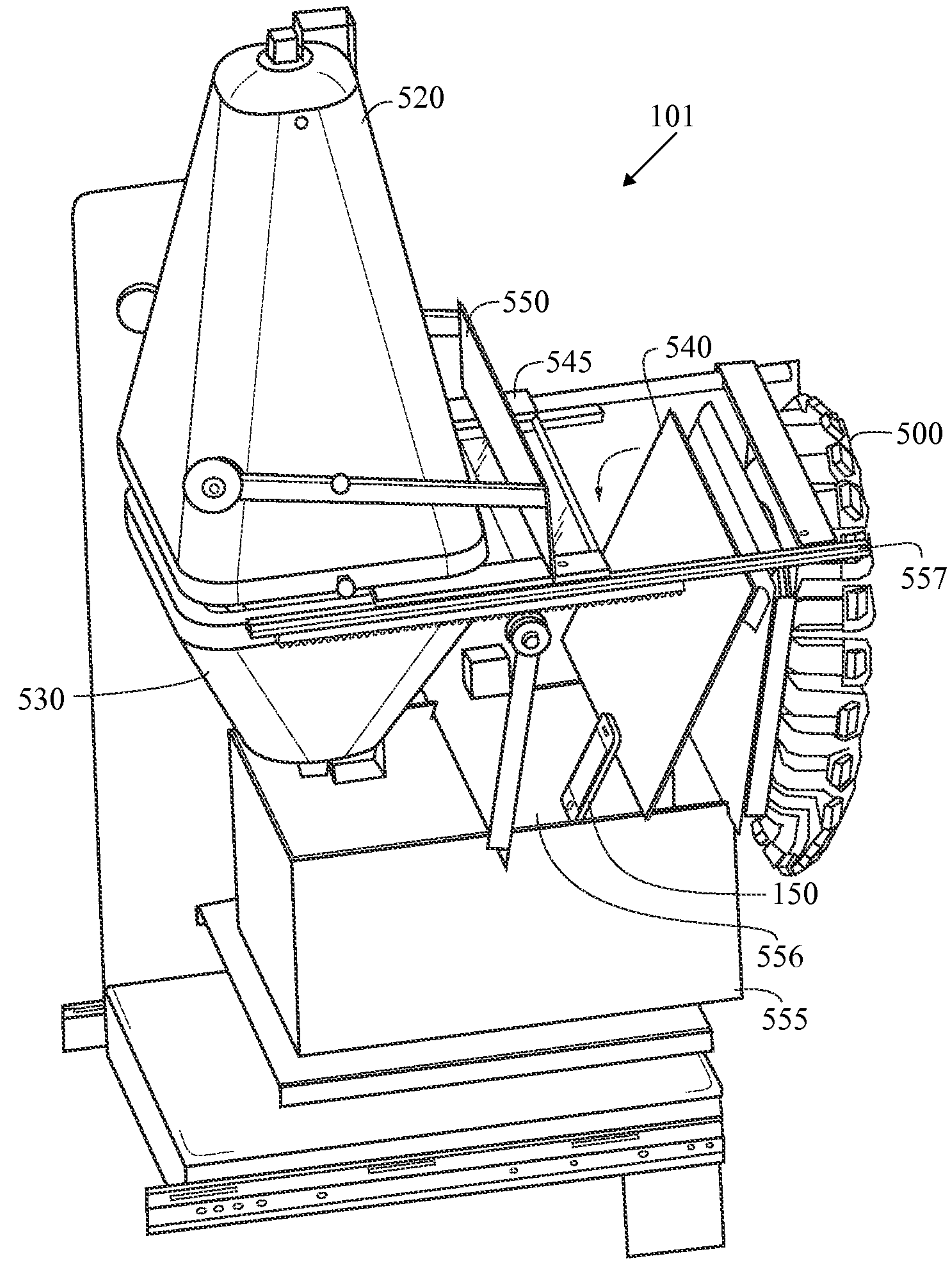
FIG. 11C is an isolated view of a phone being binned in the kiosk.

FIGS. 11, 11A, 11B, and 11C, show the automatic transport and binning of an electronic device 150 within the internal mechanism 101 of the kiosk 100. As shown in FIG. 11, the door 550 is lowered to reside above the transparent plate 545, which is then moved inward with the mobile phone 150 thereon. As shown in FIG. 11A, as the transparent plate 545 is moved inward, the mobile phone is blocked by the door 550 and engages binning plate 540 as the mobile phone begins to fall into an opening created by the inward movement of the transparent plate 545. As shown in FIG. 11B, once the mobile phone is on the binning plate 540, the binning plate 540 is slowly lowered on one side to open into the bin 555. As shown in FIG. 11C, the mobile phone 150 slowly falls through an opening 556 into the bin 555 to secure the mobile phone 150 and for collection at a later time. The entire process performed at a rate of speed to prevent damage to the electronic device being recycled.

The kiosk 100 is of a typical size and shape of a vending machine, such as a soda machine, coin changing machine, can recycling machine, or other vending machines. The housing 105 of the kiosk 100 protects the internal mechanism 101 and secures electronic devices submitted for recycling. The housing 105 is preferably constructed of a metal material, such as steel or aluminum, to prevent authorized access to the kiosk 100.

The inspection area 106 is preferably designed to permit a detailed visual inspection of an electronic device such as a mobile phone, tablet computer, e-reader, MP3 players, PDA. The walls of the inspection area are preferably white and/or mirrored to provide imaging of the electronic device.

The couplings from the kiosk 100 and to a remote computer are preferably a single coupling to a communications network such as the internet via wired LAN, wireless LAN, cellular or any other proprietary communications system. The Kiosk 100 preferably includes a processor 160 for processing the information obtained from the mobile phone and for controlling the components of the kiosk 100. Preferably, the processor 160 is a standard personal computer ("PC") or other type of embedded computer running any operating system such as Linux or MAC OS. The processor 160 is most preferably a small form factor PC with integrated hard disk drive ("HDD"), central processing unit ("CPU") and universal serial bus ("USB") ports to communicate with the other components of the kiosk 100. One most preferred CPU is a DELL PC OPTIPLEX 780. Alternatively, the processing means is a microprocessor with a standalone motherboard which interfaces to a discrete HDD, power supply and the other components of the kiosk 100. The kiosk 100 preferably includes a memory 161 or other storage device, such as a disk drive, that stores the executable applications, test software, databases and other software required to operate the recycling kiosk 100.

The external communication component for the kiosk 100 preferably includes a wired Ethernet to provide connection to the internet, or alternatively the external communication component includes a wireless modem such as GSM, CDMA, 3G and 4G technologies for data communications.

Figure 14:
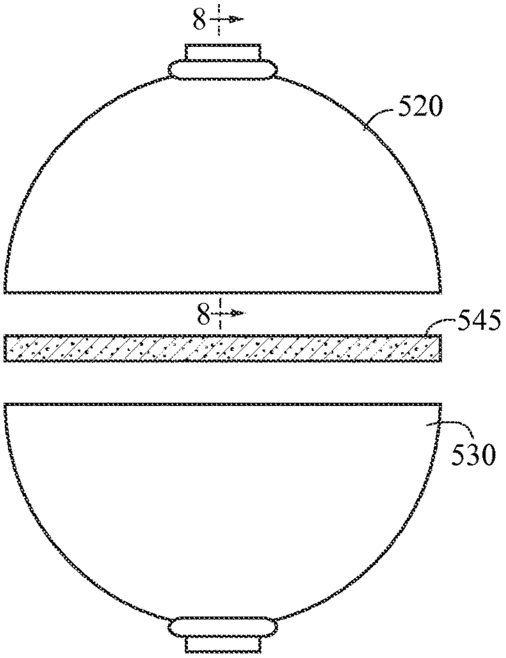
FIG. 14 is an isolated view of an inspection area of a kiosk.
Figure 15:
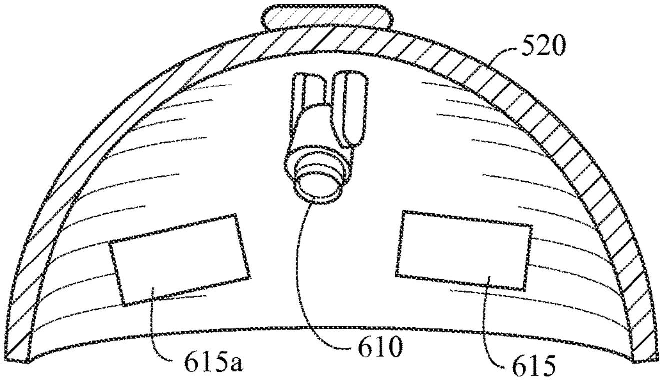
FIG. 15 is an isolated view of a camera in a dome of a kiosk.
Figure 16:
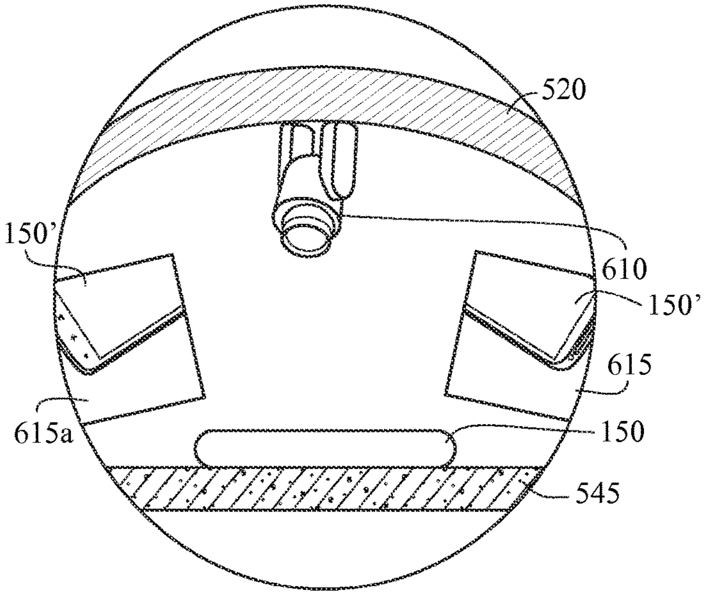
FIG. 16 is an isolated view of a phone in an inspection area of a kiosk.
Figure 17:
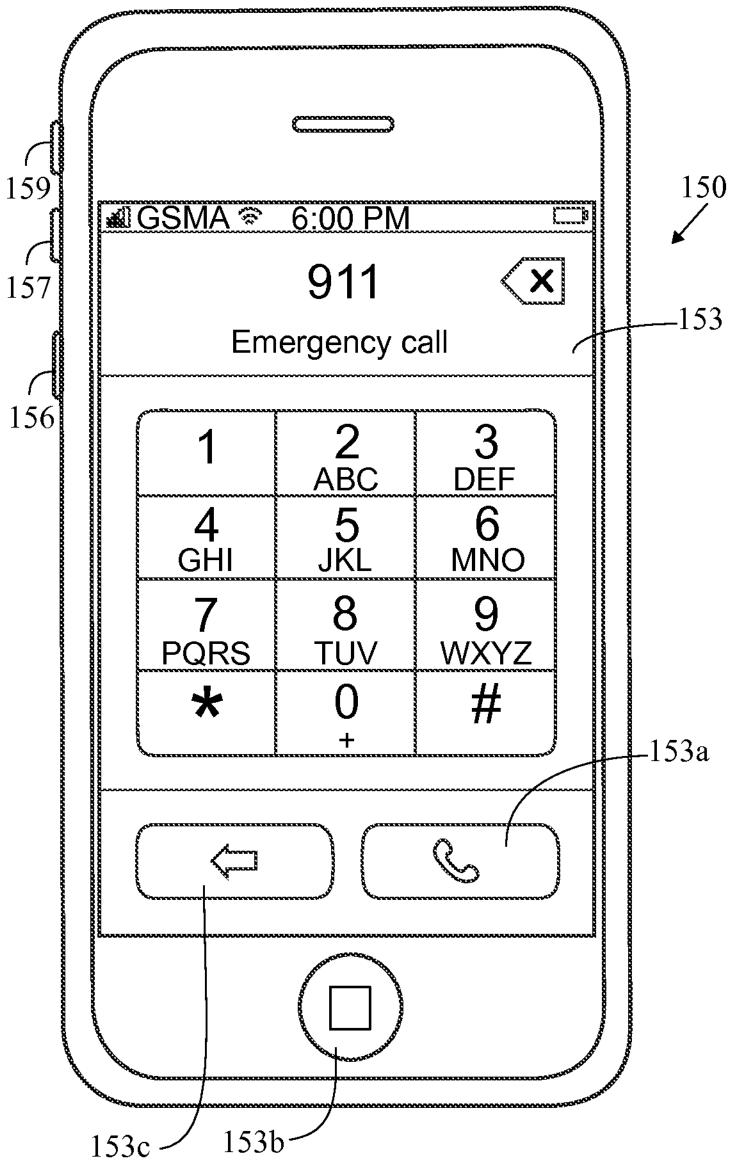
FIG. 17 is a front view of a phone.

As shown in FIGS. 14-16, the visual inspection of an electronic device such as a mobile phone 150 in the inspection area 106 is preferably performed by at least one camera 610 within the upper chamber 520. The lower chamber 530 also preferably has at least one camera or other imaging component such as a scanner. Alternatively, the visual inspection is performed by multiple cameras. A preferred camera 610 is a 1 megapixel machine vision camera. If a single camera 610 is utilized in the inspection area 106, the camera 610 preferably is movable to increase a field of view of the inspection area 106 to inspect the electronic device 150 such as a mobile phone placed on the transparent plate 545. The camera 161 is preferably movable. Preferably the camera 610 is positioned to image a LCD screen 153 of the electronic device 150 to determine if the LCD screen 153 is damaged. The interior surfaces of the upper chamber 520 and lower chamber 530 preferably include mirrors 615 in order to optimize viewing of an electronic device positioned within the inspection area 106. As shown in FIG. 16, a reflection 150' of a mobile phone 150 is illustrated. The camera 610 is also preferably movable to image a data port of the electronic device to determine the type of electrical connector 505 for the electronic device in order to perform an electrical analysis of the electronic device. Alternatively, the entire interior surfaces of the upper chamber 520 and the lower chamber 530 are mirrored for optimization of imaging of the electronic device. The camera(s) alternatively are CCD or CMOSS.

Also, time is of the essence when inspecting the electronic device. The analysis is completed within an illumination period of the electronic device, wherein the illumination device comprises the time from when the display screen of the electronic device is illuminated to the time the display screen converts to an energy conserving mode, evidences by the screen blacking out. During the inspection, the brightness of the illumination is also measured. The lighting preferably comprises LED based lighting with beam splitters, or alternatively UV lighting.

The transparent plate optionally operates as a weight scale to obtain a mass of the electronic device for use in determining a remuneration value. For example, if the mass of the electronic device 150 is less than set forth in a vendor specification for the electronic device, then one or more components of the electronic device may be missing, such as the battery for the electronic device 150.

Preferably, visual inspection and recognition software is utilized by the kiosk 100 to analyze an electronic device. In one preferred method, a recognition algorithm is applied to a specific make and model of a electronic device. The visual inspection and recognition software determines the borders of a electronic device 150 under inspection to determine the external dimensions of the electronic device 150. The external dimensions are utilized to determine a subset of possible mobile phones from a master database of mobile phones stored in the memory 161 of the kiosk 100 or available online to the kiosk 100 using external communications. The visual inspection and recognition software then preferably uses a set of secondary and tertiary features to further distinguish the electronic device 150. These secondary and tertiary features can include placement and size of the display screen, placements and size of the keyboard, unique buttons, placement of ports, and other distinguishing features. Once an exact make and model of the electronic device is determined, the visual inspection and recognition software subtracts an image of the electronic device 150 from an image of a perfect electronic device for the same make and model. The result of the subtraction is preferably a quantifiable number of pixels that are calibrated into categories of broken or missing parts, cracked screen, and low, medium or high wear.

Alternatively, the visual inspection is performed using neural network pattern recognition techniques to identify the mobile phone 150, then filter algorithms are utilized to determine defects such as cracked screens. Further, those skilled in the pertinent art will recognize that other visual inspection techniques may be employed without departing from the scope and spirit of the present invention.

The electrical analysis of an electronic device 150 is preferably performed using an electrical connector 505 connected to a data port of a electronic device 150 as discussed above in reference to FIGS. 2, 2A, 2B, 2C and 2D. Once the make and model of the electronic device 150 is determined, either by visual inspection or user input using a user interface such as touch screen display 115, the correct electrical connector 505 is dispensed by the carousel 500 for connection to the data port of the electronic device 150. The connection of the electrical connector 505 to the electronic device 150 is preferably performed automatically by the kiosk 100. Alternatively, the proper choice of electrical connector 505 is rotated into position on the carousel 500 and illuminated or in some other way presented to the consumer for manual connection of the electrical connector 505 to the data port of the electronic device 150. Electrical analysis software is preferably utilized by the kiosk 100 to interact with the electronic device 150. The electrical analysis preferably determines if the mobile phone is capable of activation, maintaining a charge, performing correctly, powering a display screen of the electronic device 150, providing make, model, serial number and other pertinent information about the electronic device 150, and other relevant information.

The touch screen display 115 preferably includes a keypad, user selection buttons, soft keys, and other similar components. The touch screen display 118 is used to enable quick and easy access to various features and functions of the recycling kiosk 100. The recycling kiosk 100 preferably dispenses various forms of payment, including cash, credit cards, debit cards, chip cards, gift cards from the kiosk's host location or other gift cards, and other magnetic striped cards or electronic payment methods. The kiosk 100 also uses the barcode reader to read the barcode identification on the inside of the battery pack. A UV detector is used for reading "invisible" barcodes in use by certain vendors such as Apple and others. The bar code reader, camera, and/or UV detector of the kiosk 100 is another technique used to identify the product model, IMEI #, and/or FCC ID. Alternatively, the kiosk 100 communicates with the electronic device 150 using wireless communications to test and if necessary erase data from the electronic device 150.

Figure 12:
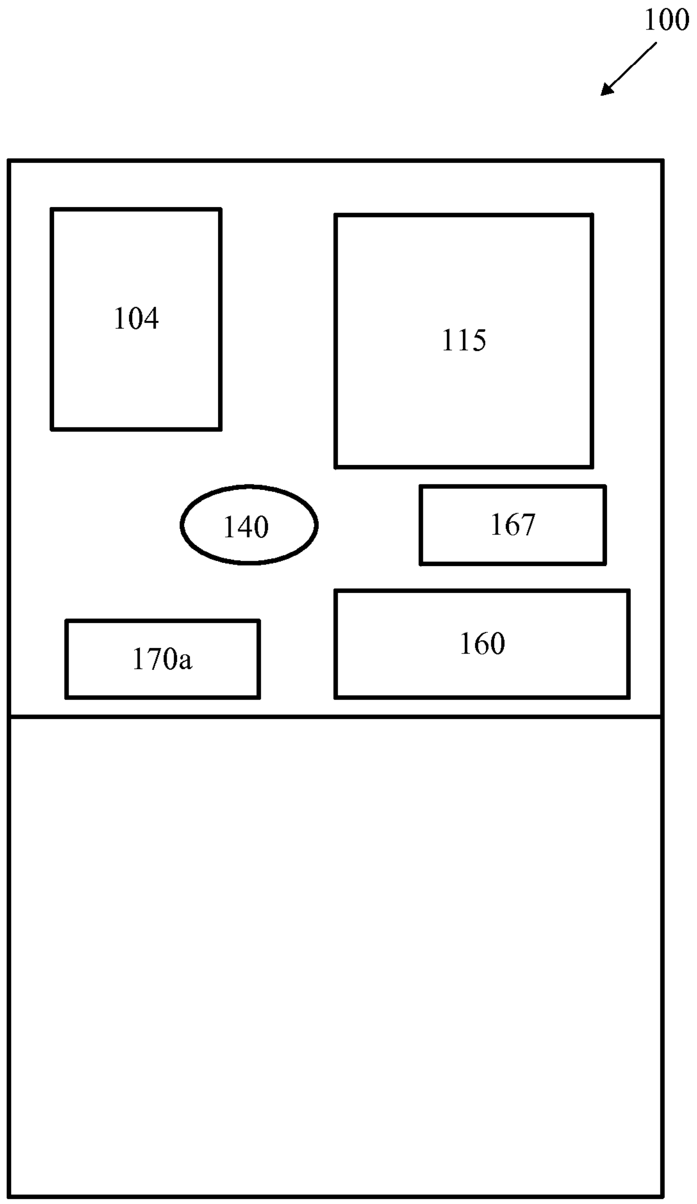
FIG. 12 is a block diagram of components of a recycling kiosk.
Figure 13:
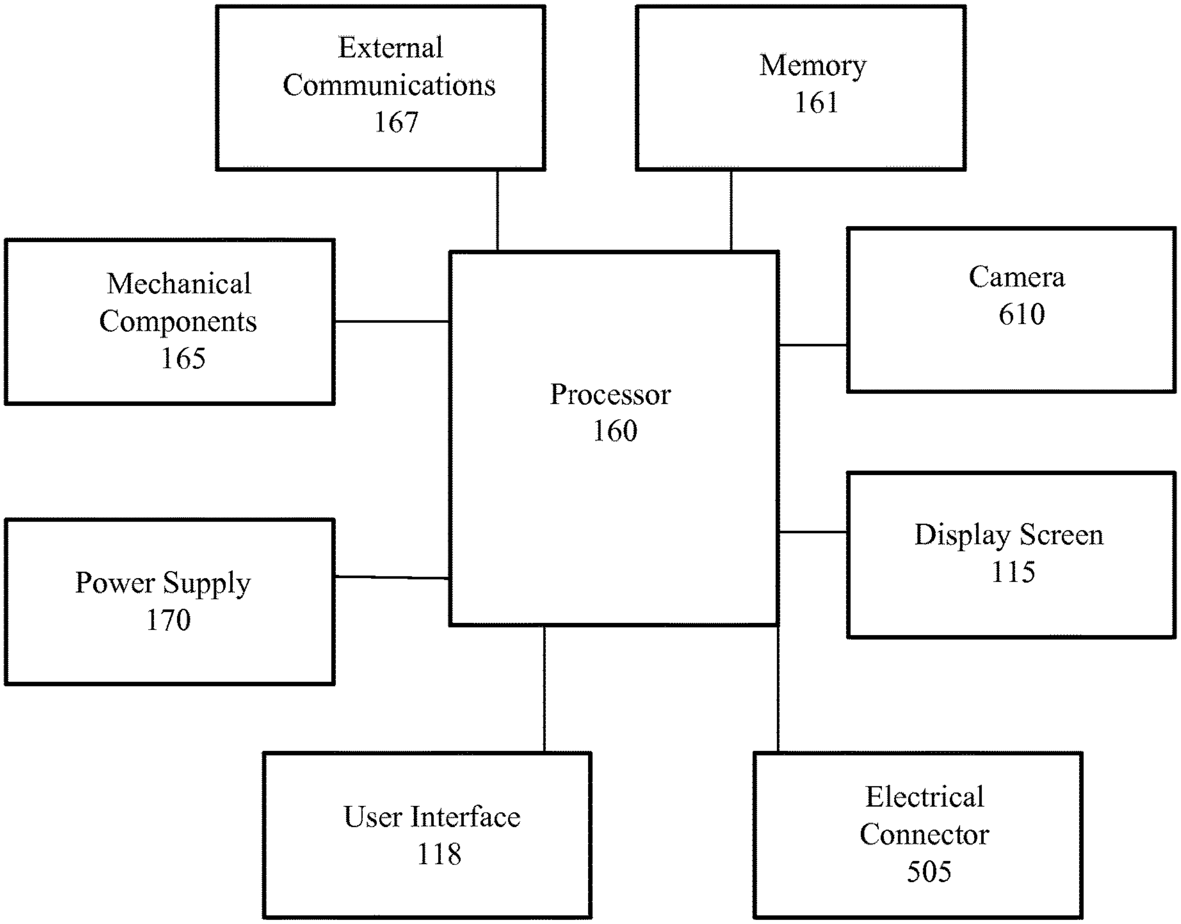
FIG. 13 is a block diagram of components of a recycling kiosk.

FIG. 13 is a block diagram of the main components of the kiosk 100. A processor 160 is preferably in communication with the other components of the kiosk 100. The memory 161 preferably contains a database of information on multiple mobile phones including images, physical characteristics, prices and other similar information. The external communications 167 preferably communicates through a wireless connection or Ethernet with a network to receive and transmit information to a remote site. The power supply 170 is preferably received through a plug-in connection to a wall outlet. The mechanical components 165 include the electrical connector carousel 500, the transparent plate 545, the binning plate 540, the door 550, and other similar components. The camera 610 or cameras, electrical connectors, and a user interface interact with the processor 160 as discussed above. FIG. 12 illustrates an internal back of a recycling kiosk 100. As shown a processor 160 is preferably a personal computer having a battery backup 170*a*, a wireless connection 167 for external communications, an electrical connection 140, a receipt dispenser 104 and a display screen 115.

The processor 160 identifies the electronic device 150 submitted for recycling using information from the visual inspection and user interface. The processor 160 also determines the proper electrical connector 505 for connection to the data port of the electronic device 150 using information obtained during the visual inspection or from the user interface. The processor 160 also directs and receives information from the electrical analysis of the electronic device 150 performed using the electrical connector 505 connected to the data port of the electronic device 150. The processor also preferably determines a financial remuneration for the submitted electronic device 150 based on the visual inspection, optionally the electrical analysis and data stored in the memory 161 of the kiosk or information provided externally through the external communication component 167.

Figure 19:
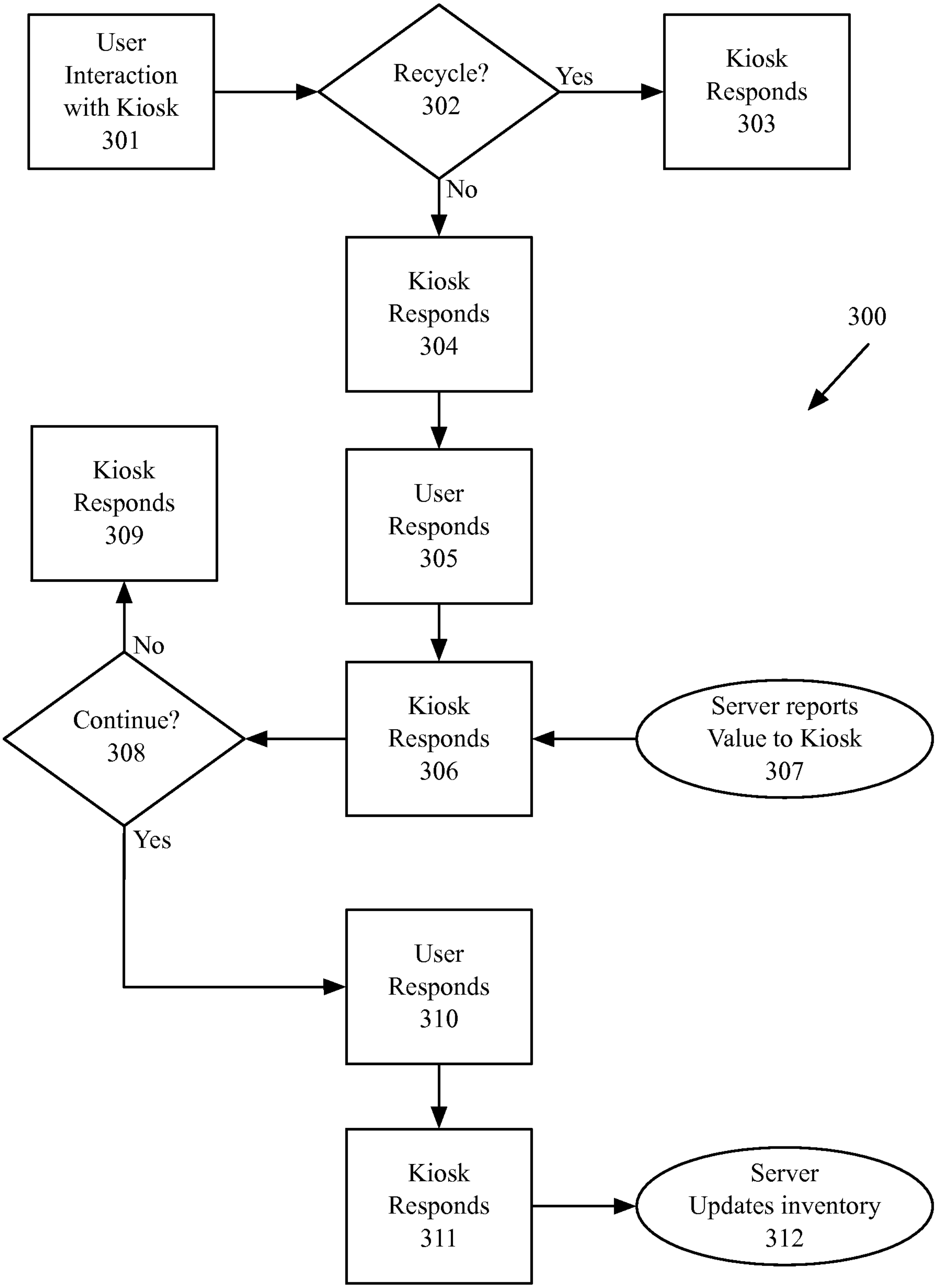
FIG. 19 is a flow chart for recycling an electronic device.

A flow chart for a preferred recycling method is shown in FIG. 19. At step 301 a customer elects to sell or recycle an electronic device. The customer checks to see if the electronic device is supported for sale/refurbishing from a list on the screen of the kiosk. The customer activates the on-screen menu system and either enters the phone model directly or goes through a series of menus to determine if the electronic device is eligible for sale or only for recycling. At decision block 302 it is determined if the electronic device is only available for recycling. If yes, (i.e. it is not on the list of electronic device available for reselling) the customer can insert the electronic device into receptacle at step 303 and the electronic device falls into bin 112 for recycling.

If the electronic device is supported for refurbishment/resale the customer is then encouraged to engage the testing/rating operation of the system. At step 304, the system has determined the correct connector to couple to the electronic device. Connectivity options and are not limited to cable, standard or proprietary connectors, hard docks, reading removable or external physical memory or other wireless methods like WiFi, Bluetooth, RFID, NFC, and the like. At step 305 the electronic device is connected and inserted into inspection area 106. If this has been done correctly, the customer is given some indication (e.g. a green light) and the system proceeds to step 306. At step 306 the electronic device is tested for operation using diagnostics and operating via, for example, the OMSI interface. The diagnostics preferably includes electrical and physical testing including testing the electronic device's battery, screen, memory, button functionality and structural integrity.

Preferably, the electronic device is imaged and analysis software is used to identify scratches, cracks, wear patterns, dents, broken or missing pieces, inclusion of features such as lenses, buttons, connectors, badges, labeling and/or branding. Identification may be done by image comparison or other similar methods where the image taken of the electronic device is normalized and compared to a reference image. Other inspection methods may be used in conjunction with visual and/or electrical testing including weighing to determine specific weight and use that data to further refine verification of manufacturer and verification of exact device model. In another embodiment, the photographic image is used to identify the correct manufacturer and model number/product number. Visual identification could include any combination of the following: calculations based upon measurement, physical (e.g., mm, inches), pixel count or other. Identification based upon electronic device dimensions, location/size of buttons, LCD and other physical characteristics. One camera or multiple cameras may be used to determine height, width, depth as needed. Identification based on OCR (Optical Character Recognition) of identifiers such as Carrier (for phone and tablet computers), brand, model, serial number, other identifiers. Identification based upon barcodes. Consumer may be asked to orient CE on its front, back, side and then asked to change orientation as needed. Consumer may even be asked to remove CE cover(s), batteries and the like in order to gain access to identifiable items, such alphanumeric or barcode data. The kiosk 100 provides a way to use visual inspection with electrical inspection to identify a device, determine its value, and reduce possible fraud.

In one embodiment, the kiosk 100 communicates with the carrier associated with a mobile phone to collect any information that could be germane to the device, including, for example, validation or authentication, registered ownership, account status, time in service, and the like. In some cases, when the customer's identification information does not match the registered owner information, the kiosk 100 automatically contacts the assumed owner in some manner (automated telephone call, email, text message, etc.) to alert the owner of the phone of the possible transaction.

Another feature of an embodiment of the kiosk 100 is to determine if there is personal information on the electronic device. This is determined by the presence of data in particular storage registers in the memory (e.g., quick-key stored numbers) or by looking at file types (jpegs, mp3's, etc.), or just assuming all non-default storage locations must contain personal data. The customer is offered the chance to erase the data from the phone. One option allows the customer to request that the data be first downloaded and then sent to a location designated by the customer (e.g., email address, website, etc.). In another embodiment, there is a slot for the customer to enter a memory card (e.g. USB drive, memory stick, etc.) whereupon the kiosk 100 uploads the data to the memory device. In still another embodiment, the kiosk 100 offers a web location from which the user retrieves the data at some later time if desired. In another embodiment, the user elects to have the data placed in another electronic device purchased by the customer at the kiosk 100 or in the location of the kiosk 100 or some other store. The customer preferably selects a user name and password to access the system provided storage location.

Once the value is determined, the value is provided at step 307 to the kiosk. The kiosk 100 then offers the customer a price or other remuneration for the phone that is typically less than the resale value. In other embodiments, the kiosk 100 offers the customer a price or remuneration that is at the current real-time market price. At step 308 it is determined if the user wishes to accept the offer. If not, the kiosk 100 proceeds to step 309 and opens the door and releases the electronic device back to the customer. If the user wishes to accept the offer, the kiosk 100 proceeds to step 310. At a point where the user accepts a price, the kiosk 100 may then lock down the inspection area to prevent further access to the electronic device by the user. The kiosk 100 then disconnects any cables that have been attached. At step 310, the user indicates acceptance of the decision by confirming on the keypad or touch-screen. At this point the kiosk 100 proceeds with deleting the personal data from the electronic device. In addition, once the transaction is confirmed, the kiosk 100 tags the electronic device with a transaction number that is associated with the diagnostic data and the transaction itself. This is preferably a printed adhesive label that is affixed physically to the phone and/or the loading of electronic data corresponding to the transaction number onto the phone itself for traceability purposes.

At step 311, the kiosk 100 completes any additional testing and diagnostics of the electronic device, disconnects the cable from the electronic device, and prints a receipt for the customer. Transfer of funds may be authorized via the kiosk 100 by crediting a customer credit card or account by dispensing cash, or by dispensing a voucher or coupon. At step 312 the kiosk 100 updates its inventory database and transmits the update via a communications network to a kiosk server.

Figure 20:
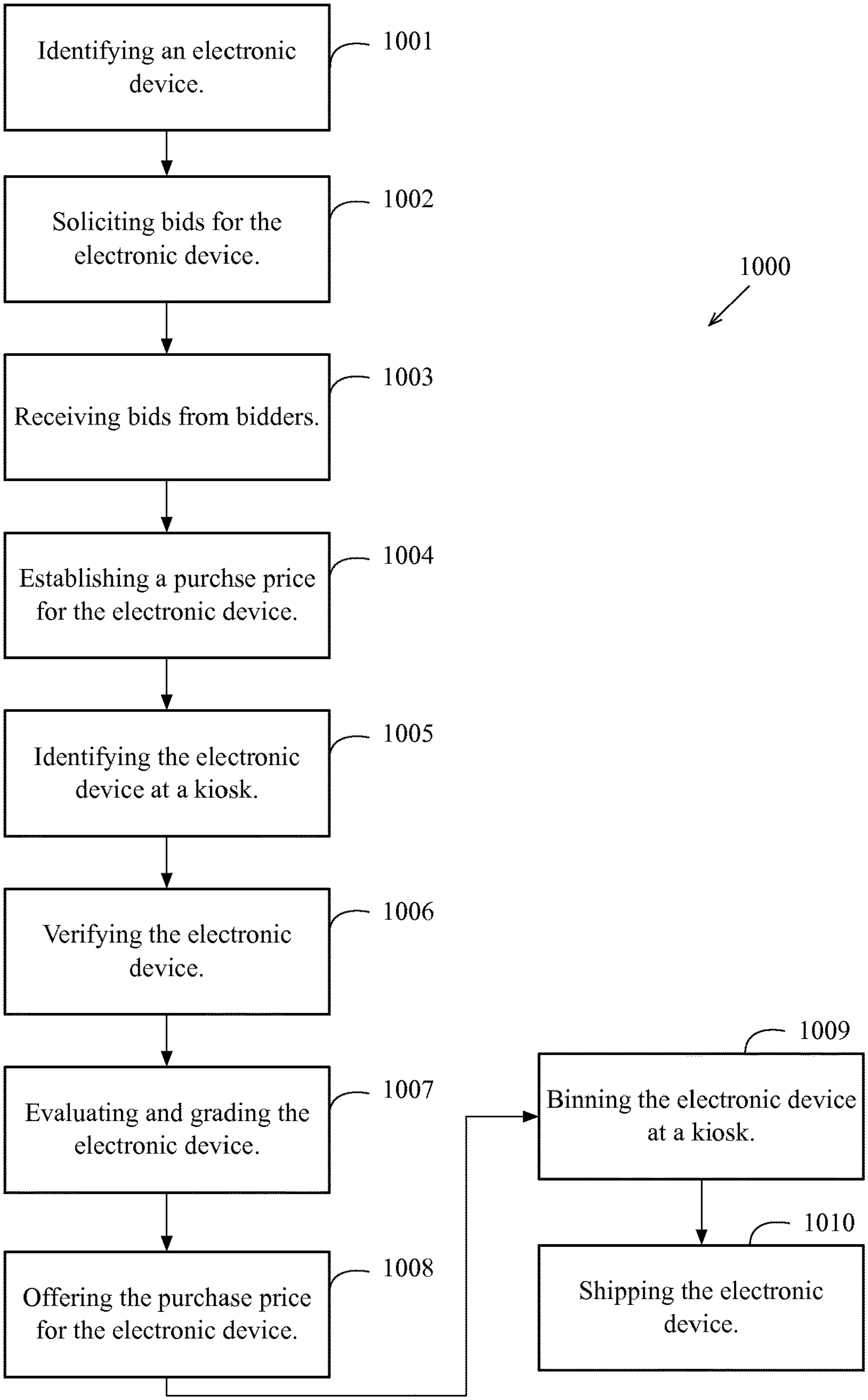
FIG. 20 is a flow chart for a pre-acquisition auction method.

One preferred method for a pre-acquisition auction is illustrated in the flow chart of FIG. 20. A method for analysis of an electronic device and financial remuneration to a user for submission of the electronic device is generally designated 1000. At block 1001, an electronic device is identified. At block 1002, bids are solicited for a used model of the electronic device in a predetermined condition. The bids are preferably solicited online through a website and the bidders are preferably pre-qualified. At block 1003, bids for the used model of the electronic device are received from a plurality of bidders. At block 1004, a purchase price to pay for the used model of the electronic device is set based on the plurality of bids received from the plurality of bidders. Typically, the purchase price is based on the winning bid. The shipping information for the winning bidder is preferably obtained at this time. At block 1005, a used model of the electronic device is identified at a recycling kiosk for the electronic device. Preferably, a consumer desires to recycle the electronic device. At 1006, the integrity of the used model of the electronic device is verified at the recycling kiosk. Preferably, the condition of the electronic device is established at the kiosk, with the kiosk determining any damage to the electronic device based on visual and electronic analysis of the electronic device. At block 1007, the electronic device is evaluated and graded. At block 1008, the purchase price for the used model of the electronic device is offered to a consumer at the kiosk. At block 1009, the electronic device is automatically binned after purchasing the used model of the electronic device from the consumer at the kiosk. At block 1010, the electronic device is shipped to the winning bidder.

Preferably, the kiosk 100 of the method comprises a housing 105, the housing 105 comprising a user interface on an exterior surface of the housing for the user to input information, an upper dome and a lower dome, wherein the upper dome and the lower dome comprise a plurality of mirrors. The kiosk 100 further comprises an upper chamber camera, a lower chamber camera and a transparent surface. The kiosk 100 further comprises a processor 160 within the housing and in communication with the at least one camera, the processor 160 configured to identify the brand and model number of the mobile communication device based on at least one of the information from the user and the images from the at least one camera, the processor 160 configured to determine a purchase price for the used model of the mobile communication device.

An alternative method for a pre-acquisition auction begins with a mobile communication device identified for acquisition. Bids are solicited for a used model of the mobile communication device. Bids for the used model of the mobile communication device are received from a plurality of bidders. A purchase price to pay for the used model of the mobile communication device is set based on the plurality of bids received from the plurality of bidders. A used model of the mobile communication device is identified at a recycling kiosk for the mobile communication device. The integrity of the used model of the mobile communication device is verified at the recycling kiosk. The purchase price for the used model of the mobile communication device is offered to a consumer at the kiosk. The mobile communication device is automatically binned after purchasing the used model of the mobile communication device from the consumer at the kiosk. The mobile communication device is shipped to the winning bidder.

Another alternative method for a pre-acquisition auction begins with establishing a plurality of pre-acquisition purchase prices. Each of the plurality of pre-acquisition purchase prices is established for a recycled electronic device in a predetermined condition. Each of the pre-acquisition purchase prices is established by a winning bid from a bidder of a plurality of bidders for a recycled electronic device. An electronic device is positioned in an inspection area of a kiosk. The inspection area has at least one camera. The electronic device or a portion thereof is imaged. The image of the electronic device obtained by the at least one camera disposed in the inspection area is inspected to determine if the electronic device has any defects. The electronic device is identified and a condition of the electronic device is determined. A matching pre-acquisition purchase price is selected from the plurality of pre-acquisition purchase prices for the electronic device. A consumer is offered the pre-acquisition purchase price for the electronic device.

Figure 21:
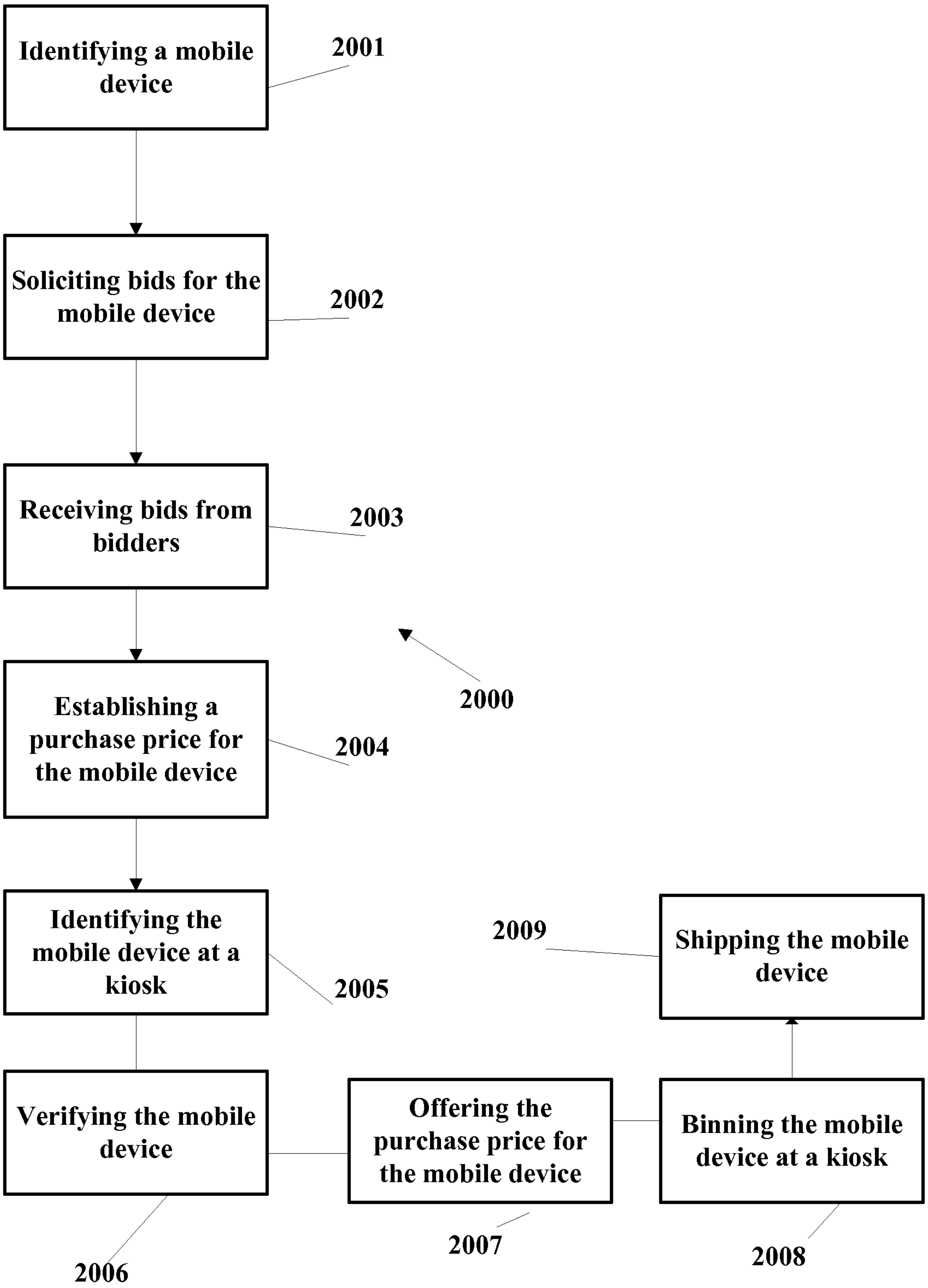
FIG. 21 is a flow chart of a method for analyzing an electronic device.

An alternative method of the present invention is illustrated in the flow chart of FIG. 21. A method for analysis of an electronic device and financial remuneration to a user for submission of a mobile communication device is generally designated 2000. At block 2001, a mobile communication device is identified. At block 2002, bids are solicited for a used model of the mobile communication device. At block 2003, bids for the used model of the mobile communication device are received from a plurality of bidders. At block 2004, a purchase price to pay for the used model of the mobile communication device is set based on the plurality of bids received from the plurality of bidders. At block 2005, a used model of the mobile communication device is identified at a recycling kiosk for the mobile communication device. At 2006, the integrity of the used model of the mobile communication device is verified at the recycling kiosk. At block 2007, the purchase price for the used model of the mobile communication device is offered to a consumer at the kiosk. At block 2008, the mobile communication device is automatically binned after purchasing the used model of the mobile communication device from the consumer at the kiosk. At block 2009, the mobile communication device is shipped to the winning bidder.

Alternatively, the method comprises imaging a screen shot of a known screen of a battery charging screen display of the electronic device and inspecting the screen shot of the known screen of the battery charging screen display of electronic device obtained by at least one camera.

The present invention further includes is a dome shaped apparatus, the dome shaped apparatus comprising an upper dome, a lower dome. The upper and lower dome comprises a plurality of walls, wherein the plurality of walls are composed of mirrors. The dome shaped apparatus further comprises a transparent surface and at least one camera, the camera capable of obtaining a 360 degree view of an electronic device placed within the dome shaped apparatus. The upper dome preferably comprises an upper chamber camera. The lower dome preferably comprises a lower chamber camera. Preferably, a combination of each of the upper dome and lower dome cameras and the plurality of mirrors allow for an image of the device placed on the transparent surface. Preferably, the combination of each of the upper dome and lower dome cameras and the plurality of mirrors allow for a 360 degree of the electronic device placed on the transparent surface. Preferably, each of the upper dome and lower dome cameras are moveable.

Alternatively, the mobile phone 150 positioned within an inspection area 106 of a kiosk 100. The mobile phone is powered up. A term is inputted into the mobile phone 150 for display on a LCD screen of the mobile phone 150. A preferred term is a telephone number for display on a LCD screen 153 as shown in FIG. 14. The term may also be a word, characters, or like inputs. The LCD screen 153 is inspected for damage such as cracks, pixel defects, discoloration and the like. The kiosk 100 inspects the LCD screen 153 for defects in the display of the telephone number or like term. Further, the luminescence of the LCD screen 153, particularly the telephone number, can also be measured to determine if the luminescence is performing at levels set forth by the manufacturer of the mobile phone 150. An optional electrical analysis is performed on the mobile phone 150 as discussed in more detail below. Lastly, the value of the mobile phone is determined as discussed in more detail below.

Figure 22:
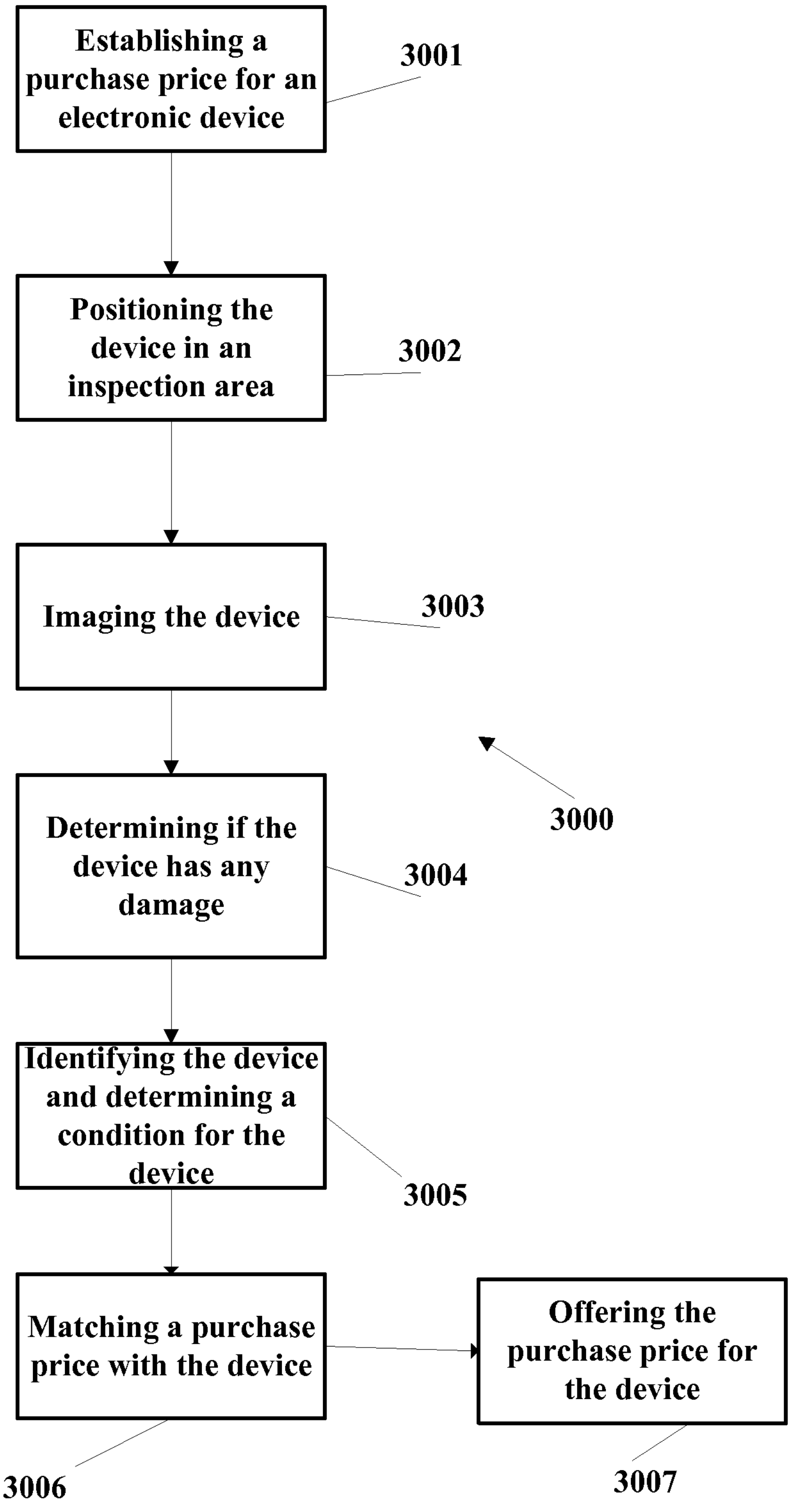
FIG. 22 is a flow chart of a method for analyzing an electronic device.

Yet another alternative method of the present invention is illustrated in the flow chart of FIG. 22. The method 3000 begins at block 3001 with establishing a plurality of pre-acquisition purchase prices. Each of the plurality of pre-acquisition purchase prices is established for a recycled electronic device in a predetermined condition. Each of the pre-acquisition purchase prices is established by a winning bid from a bidder of a plurality of bidders for a recycled electronic device. At block 3002, an electronic device is positioned in an inspection area of a kiosk. The inspection area has at least one camera. At block 3003, the electronic device or a portion thereof is imaged. At block 3004, the image of the electronic device obtained by the at least one camera disposed in the inspection area is inspected to determine if the electronic device has any defects. At block 3005, the electronic device is identified and a condition of the electronic device is determined. At block 3006, a matching pre-acquisition purchase price is selected from the plurality of pre-acquisition purchase prices for the electronic device. At block 3007, a consumer is offered the pre-acquisition purchase price for the electronic device.

Preferably, the method further comprises automatically binning the electronic device after determining the value of the electronic device. The method preferably comprises using the robotic finger to call a test phone number or alternatively to send a text a test phone number. The text preferably comprises each letter of the alphabet which allows determining the functionality of all letters of the keyboard. The method further comprises the text comprises a character string comprising the numbers 1 through 10, allowing determination of the functionality of all numbers on the keyboard. Further, the robotic finger may be used to send a text comprising each symbol on the keyboard. The method alternatively comprises using the robotic finger to active a camera mode of the electronic device such as disclosed in Bowles et al., U.S. patent application Ser. No. 13/658,828, filed on Oct. 24, 2012 for a Method And Apparatus For Recycling Electronic Devices, which is hereby incorporated by reference in its entirety, or such as disclosed in Bowles et al., U.S. patent application Ser. No. 13/658,825, filed on Oct. 24, 2012 for a Method And Apparatus For Recycling Electronic Devices, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A computer-implemented method for recycling an electronic device, the method comprising:

establishing a plurality of pre-acquisition purchase prices, each of the plurality of pre-acquisition purchase prices established for a recycled electronic device in a predetermined condition, each of the plurality of pre-acquisition purchase prices established by a winning bid from a bidder of a plurality of bidders for the recycled electronic device; and via a processor of a kiosk receiving, from at least one camera positioned within the kiosk, an image of an electronic device received from a user and positioned on an inspection surface within an inspection area of the kiosk, wherein the inspection surface is in a first position relative to the inspection area when it receives the electronic device and wherein, after receiving the electronic device, the processor causes the inspection surface to move into a second position relative to the inspection area to facilitate imaging the electronic device with the at least one camera;

inspecting the image of the electronic device;

determining an identity and/or a condition of the electronic device based at least in part on the inspection of the image;

selecting one of the pre-acquisition purchase prices from the plurality of pre-acquisition purchase prices for the electronic device based at least in part on the identity and/or the condition of the electronic device; and offering the selected pre-acquisition purchase price to the user for the electronic device.

2. The computer-implemented method of claim 1 wherein establishing the plurality of pre-acquisition purchase prices is performed by one or more computers remote from the kiosk.

3. The computer-implemented method of claim 1 wherein at least one of (1) receiving, from the at least one camera positioned within the kiosk, the image of the electronic device, (2) inspecting the image of the electronic device, (3) determining the identity and/or the condition of the electronic device based at least in part on the inspection of the image, or (4) selecting one of the pre-acquisition purchase prices from the plurality of pre-acquisition purchase prices for the electronic device based at least in part on the identity and/or the condition of the electronic device is performed by the processor of the kiosk.

4. The computer-implemented method of claim 1 wherein the electronic device is positioned in the inspection area in a first orientation, and wherein the method further comprises prompting the user, via a display screen of the kiosk, to move the electronic device from the first orientation to a second orientation, different than the first orientation.

5. The computer-implemented method of claim 4 wherein the electronic device includes a display screen, wherein the electronic device is positioned in the inspection area with the display screen of the electronic device facing a first direction, and wherein the method further comprises prompting the user to reposition the electronic device in the inspection area so that the display screen of the electronic device faces a second direction, opposite to the first direction.

6. The computer-implemented method of claim 1 wherein the electronic device has a front side including a display screen and a back side opposite the front side, and wherein the method further comprises prompting the user, via the kiosk, to position the electronic device on the back side in the inspection area.

7. The computer-implemented method of claim 1 wherein receiving the image includes receiving the image at a location remote from the kiosk for inspection.

8. The computer-implemented method of claim 7 wherein receiving the image includes receiving the image at a location remote from the kiosk for inspection by a remote operator.

9. The computer-implemented method of claim 1, further comprising receiving data from an electrical inspection of the electronic device at a location remote from the kiosk, wherein the identity and/or the condition of the electronic device is determined based at least in part on the data from the electrical inspection.

10. The computer-implemented method of claim 9 wherein receiving the data at the location remote from the kiosk includes receiving the data at the location remote from the kiosk for inspection by a remote operator.

11. The computer-implemented method of claim 1, further comprising:

receiving an acceptance of the offered purchase price from the user; and in response to receiving the acceptance, causing the kiosk to move the electronic device from the inspection area to a storage bin of the kiosk.

12. A computer-implemented method for recycling an electronic device, the method comprising:

establishing a plurality of pre-acquisition purchase prices for a plurality of recycled electronic devices; and via a processor of a kiosk receiving, from at least one camera positioned within the kiosk, an image of an electronic device positioned in an inspection position on an inspection surface within an inspection area of the kiosk, wherein at least a portion of the electronic device is facing the at least one camera;

obtaining an identifier associated with an identity of the electronic device from the image using optical character recognition;

using the identifier to determine the identity of the electronic device;

transmitting the image or another image of the electronic device to a human operator for a visual evaluation of a condition of the electronic device;

determining a purchase price for the electronic device, wherein the purchase price is selected from the plurality of pre-acquisition purchase prices based at least in part on the identity and/or the condition of the electronic device; and offering the purchase price to a user for the electronic device.

13. The computer-implemented method of claim 12 wherein establishing the plurality of pre-acquisition purchase prices is performed by one or more computers remote from the kiosk.

14. The computer-implemented method of claim 12 wherein the purchase price for the electronic device is selected from the plurality of pre-acquisition purchase prices based at least in part on the identity and/or the condition of the electronic device, and wherein the purchase price is selected, at least in part, by one more computers remote from the kiosk and communicatively coupled thereto.

15. The computer-implemented method of claim 12 wherein establishing the plurality of pre-acquisition purchase prices for the plurality of recycled electronic devices includes conducting a pre-acquisition auction to establish a winning bid for each of the plurality of recycled electronic devices.

16. The computer-implemented method of claim 12 wherein establishing the plurality of pre-acquisition purchase prices includes establishing the plurality of pre-acquisition purchase prices for the plurality of recycled electronic devices in different states of condition.

17. The computer-implemented method of claim 12:

wherein receiving the image of the electronic device includes receiving an image of a display screen of the electronic device, and wherein determining the identity and/or the condition of the electronic device includes determining the identity and/or the condition of the electronic device based at least in part on an inspection of the image of the display screen.

18. The computer-implemented method of claim 12:

wherein receiving the image of the electronic device includes receiving an image of a display screen of the electronic device, wherein the method further comprises inspecting the image of the display screen to determine a condition of the display screen, and wherein determining the purchase price for the electronic device includes selecting the purchase price based at least in part on the condition of the display screen.

19. The computer-implemented method of claim 18 wherein inspecting the image includes inspecting the image at a location remote from the kiosk.

20. The computer-implemented method of claim 12:

wherein receiving the image of the electronic device includes receiving an image of a display screen of the electronic device with the display screen powered on, wherein the method further comprises inspecting the image of the display screen to determine a condition of the display screen, and wherein determining the purchase price for the electronic device includes selecting the purchase price based at least in part on the condition of the display screen.

21. The computer-implemented method of claim 20 wherein inspecting the image includes inspecting the image at a location remote from the kiosk.

22. The computer-implemented method of claim 12:

wherein receiving the image of the electronic device includes receiving an image of an about page displayed on a display screen of the electronic device, and wherein determining the identity and/or the condition of the electronic device includes determining the identity and/or the condition of the electronic device based at least in part on information obtained from the about page.

23. The computer-implemented method of claim 22 wherein determining the identity and/or the condition of the electronic device includes inspecting the image of the about page at a location remote from the kiosk.

24. The computer-implemented method of claim 12:

wherein receiving the image of the electronic device includes receiving an image of an about page of the electronic device displayed on a display screen of the electronic device, wherein the method further comprises inspecting the image of the about page to determine at least one of a make, model or unique number associated with the electronic device, and wherein determining the purchase price for the electronic device includes selecting the purchase price based at least in part on at least one of the make, model or unique number associated with the electronic device.

25. The computer-implemented method of claim 24 wherein inspecting the image of the about page includes inspecting the image of the about page at a location remote from the kiosk.

26. The computer-implemented method of claim 12 wherein the kiosk further includes an access door that provides access to the inspection area, and a storage bin; wherein receiving, from the at least one camera positioned within the kiosk, the image of the electronic device includes receiving, from the at least one camera, an image of the electronic device taken with the access door closed; and wherein the method further comprises:

receiving, via a display screen of the kiosk, an acceptance or a rejection of the offered purchase price from the user; and if the user accepts the offered purchase price, moving the electronic device from the inspection area into the storage bin, or if the user rejects the offered purchase price, opening the access door to enable the user to retrieve the electronic device.

27. The computer-implemented method of claim 12 wherein the electronic device is positioned in the inspection area in a first orientation, and wherein the method further comprises prompting the user, via the kiosk, to move the electronic device from the first orientation to a second orientation, different from the first orientation.

28. The computer-implemented method of claim 1 wherein the electronic device received from the user is a mobile phone.

29. The computer-implemented method of claim 12 wherein the electronic device positioned in the inspection area of the kiosk is a mobile phone.

* * * * *